(12) United States Patent
Zhou et al.

(10) Patent No.: US 12,726,755 B2
(45) Date of Patent: Sep. 1, 2026

(54) SENSING DEVICES

(71) Applicant: SHENZHEN SHOKZ CO., LTD., Shenzhen (CN)

(72) Inventors: Wenbing Zhou, Shenzhen (CN); Wenjun Deng, Shenzhen (CN); Yongshuai Yuan, Shenzhen (CN); Yujia Huang, Shenzhen (CN); Xin Qi, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 423 days.

(21) Appl. No.: 18/349,120

(22) Filed: Jul. 7, 2023

(65) Prior Publication Data

US 2023/0349862 A1 Nov. 2, 2023

Related U.S. Application Data

(63) Continuation of application No. PCT/CN2022/088598, filed on Apr. 22, 2022.

(30) Foreign Application Priority Data

Apr. 23, 2021 (CN) ........................ 202110445739.3

(51) Int. Cl.
*H04R 1/22* (2006.01)
*G01H 11/08* (2006.01)
(Continued)

(52) U.S. Cl.
CPC ............ *H04R 1/222* (2013.01); *G01H 11/08* (2013.01); *G01N 29/036* (2013.01); (Continued)

(58) Field of Classification Search
CPC . H04R 1/222; H04R 1/08; H04R 1/20; H04R 17/02; H04R 17/10; H04R 19/04; (Continued)

(56) References Cited

U.S. PATENT DOCUMENTS 9,661,411 B1 5/2017 Han et al.
2013/0069181 A1 3/2013 Zhou
(Continued)

FOREIGN PATENT DOCUMENTS

CN 101294824 A 10/2008
CN 104393736 A 3/2015
(Continued)

OTHER PUBLICATIONS

Experimental Group of Hull Professional Structure, Acceleration Vibration Pickup Made of Semiconductor Strain Gauge, Journal of Dalian Institute of Technology, 1976, 33 pages.
(Continued)

*Primary Examiner* — Tarun Sinha
(74) *Attorney, Agent, or Firm* — METIS IP LLC

(57) ABSTRACT

The present disclosure provides a sensing device, comprising: a housing, an accommodation cavity being provided inside the housing; a transduction unit, including a vibration-pickup structure used to pick up vibration of the housing to generate an electrical signal, wherein the transduction unit divides the accommodation cavity into a front cavity and a rear cavity located on opposite sides of the vibration-pickup structure, at least one of the front cavity or the rear cavity is filled with liquid, and the liquid is in contact with the vibration-pickup structure; and one or more pipeline structures, each pipeline structure being configured to connect the accommodation cavity to an outside of the housing, the liquid being at least partially located in the one or more pipeline structures.

20 Claims, 29 Drawing Sheets

(51) Int. Cl.

| | |
|---|---|
| ***G01N 29/036*** | (2006.01) |
| ***G01N 29/24*** | (2006.01) |
| ***G01P 1/02*** | (2006.01) |
| ***H04R 1/08*** | (2006.01) |
| ***H04R 1/20*** | (2006.01) |
| ***H04R 17/02*** | (2006.01) |
| ***H04R 17/10*** | (2006.01) |
| ***H04R 19/04*** | (2006.01) |

(52) U.S. Cl.
CPC ..... *G01N 29/2406* (2013.01); *G01N 29/2437* (2013.01); *G01P 1/023* (2013.01); *H04R 1/08* (2013.01); *H04R 1/20* (2013.01); *H04R 17/02* (2013.01); *H04R 17/10* (2013.01); *H04R 19/04* (2013.01); *G01N 2291/014* (2013.01); *G01N 2291/022* (2013.01)

(58) Field of Classification Search
CPC ........ H04R 1/083; G01H 11/08; G01H 11/00; G01N 29/036; G01N 29/2406; G01N 29/2437; G01N 2291/014; G01N 2291/022; G01P 1/023; G01P 15/097; G01P 15/0802; G01P 15/09; G01P 15/125
See application file for complete search history.

(56) References Cited

U.S. PATENT DOCUMENTS

| | | | | |
|---|---|---|---|---|
| 2015/0350792 | A1 | 12/2015 | Grosh et al. | |
| 2017/0089943 | A1 | 3/2017 | Chen et al. | |
| 2018/0179048 | A1* | 6/2018 | Schenk | B81C 1/00158 |
| 2018/0317021 | A1 | 11/2018 | Dehe et al. | |
| 2021/0044890 | A1 | 2/2021 | Zhang et al. | |
| 2023/0362524 | A1 | 11/2023 | Yuan et al. | |

FOREIGN PATENT DOCUMENTS

| | | | | |
|---|---|---|---|---|
| CN | 104602168 | A | 5/2015 | |
| CN | 208638709 | U | 3/2019 | |
| CN | 110631759 | A | 12/2019 | |
| CN | 111295894 | A * | 6/2020 | H04R 31/00 |
| CN | 111556419 | A | 8/2020 | |
| CN | 211702391 | U | 10/2020 | |
| CN | 211930871 | U | 11/2020 | |
| CN | 112019982 | A | 12/2020 | |
| CN | 112399313 | A | 2/2021 | |
| GB | 1546521 | A | 5/1979 | |
| WO | 2021143084 | A1 | 7/2021 | |

OTHER PUBLICATIONS

International Search Report in PCT/CN2022/088598 mailed on Jun. 27, 2022, 8 pages.
First Office Action in Chinese Application No. 202210429609.5 mailed on Mar. 28, 2025, 10 pages.
First Office Action in Chinese Application No. 202280007747.2 mailed on Jun. 27, 2025, 16 pages.

* cited by examiner 200
210
220
270
230
250
260
240

3000

3010 3030

3020

3040

3021

3050

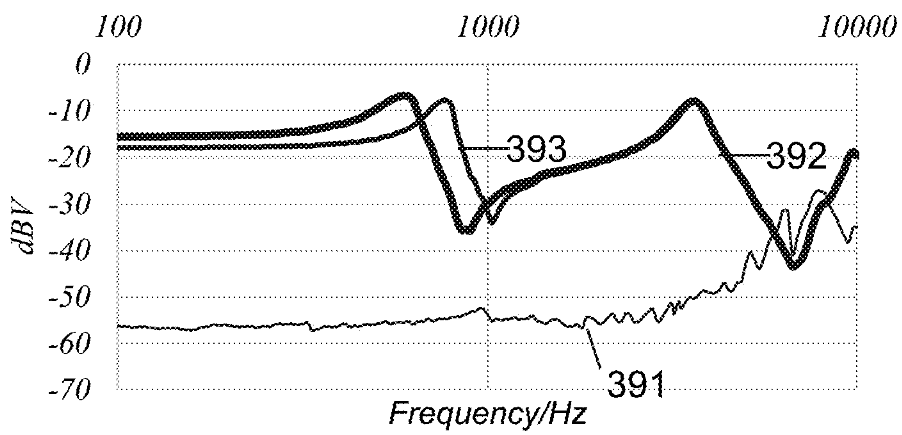

Frequency response of sensing device with liquid and pipeline structure and the pipeline structure having no constraint on the liquid Frequency response of sensing device with liquid and pipeline structure and the pipeline structure having a small constraint on the liquid Frequency response curve of sensing device without liquid and pipeline structure

FIG. 39

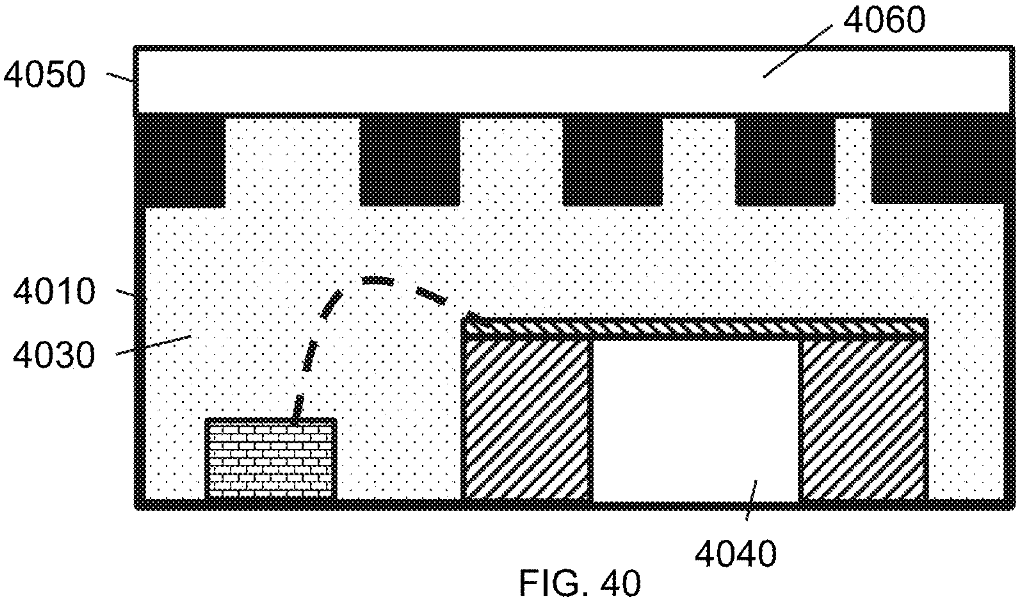

FIG. 40

SENSING DEVICES

CROSS-REFERENCE TO RELATED APPLICATIONS

This application is a Continuation of International Application No. PCT/CN2022/088598, filed on Apr. 22, 2022, which claims priority of Chinese Patent Application No. 202110445739.3, filed on Apr. 23, 2021, the contents of which are hereby incorporated by reference to its entirety.

TECHNICAL FIELD

The present disclosure relates to the field of sensors, and in particular, to a sensing device.

BACKGROUND

The sensing device is a device that receives an external vibration signal and converts the external vibration signal into an electrical signal through a transduction unit. The vibration-pickup effect of the sensing device often depends on a response capability of the transduction unit to the vibration signal. Although the transduction unit is capable of providing an inherent resonance frequency closely related to its structure, material and other physical properties, the inherent resonance frequency is often not within an ideal frequency range, thus limiting the application of the sensing device in different application scenarios. For example, in some application scenarios, the sensing device may be required to provide a higher response capability for vibration signals within a certain frequency range or provide different response capabilities for different frequencies of vibration signals, but the inherent resonance frequency of the transduction unit can hardly meet these requirements.

SUMMARY

Embodiments of the present disclosure provide a sensing device, comprising: a housing, an accommodation cavity being provided inside the housing; a transduction unit, including a vibration-pickup structure used to pick up vibration of the housing to generate an electrical signal, wherein the transduction unit divides the accommodation cavity into a front cavity and a rear cavity located on opposite sides of the vibration-pickup structure, at least one of the front cavity or the rear cavity is filled with liquid, and the liquid is in contact with the vibration-pickup structure; and one or more pipeline structures, each pipeline structure being configured to connect the accommodation cavity to an outside of the housing, the liquid being at least partially located in the one or more pipeline structures.

In some embodiments, a resonance system corresponding to the one or more pipeline structures causes the sensing device to generate at least one resonance peak and at least one resonance valley.

In some embodiments, the vibration pick-up structure has a first resonance frequency and at least one resonance frequency of the resonance system corresponding to the one or more pipeline structures is less than the first resonance frequency.

In some embodiments, the one or more pipeline structures include multiple pipeline structures, the multiple pipeline structures having different cavity volumes.

In some embodiments, a gas-liquid interface is formed between the liquid in the one or more pipeline structures and gas on the outside of the housing.

In some embodiments, the sensing device includes a first membrane structure, wherein the first membrane structure is located between the liquid in the one or more pipeline structures and the gas on the outside of the housing.

In some embodiments, the vibration-pickup structure includes a piezoelectric membrane, and the transduction unit further includes a base part, the base part being a structural body with an opening, the piezoelectric membrane covering the opening of the base part, one end of the base part away from the piezoelectric membrane being connected to the housing.

In some embodiments, the vibration-pickup structure includes multiple piezoelectric beams, and the transduction unit further includes a base part, the base part being a structural body with an opening, each piezoelectric beam being connected to the base part and extending toward a center of the opening, respectively.

In some embodiments, the multiple piezoelectric beams have same structures and are symmetrically distributed along a geometric center of the opening.

In some embodiments, the sensing device includes a blocking structure, wherein the blocking structure fills or covers gaps between the multiple piezoelectric beams.

In some embodiments, a gap between two adjacent piezoelectric beams in the multiple piezoelectric beams is not greater than 20 μm.

In some embodiments, the transduction unit further includes a base part, the base part being a structural body with an opening; the vibration pick-up structure includes multiple piezoelectric beams and a second membrane structure, the multiple piezoelectric beams being disposed at intervals at the opening; the second membrane structure covering the opening of the base part, one end of the base part away from the second membrane structure being connected to the housing.

In some embodiments, vibrations of the multiple piezoelectric beams generate resonance peaks of different frequencies.

In some embodiments, the transduction unit includes a capacitive transducer, the capacitive transducer including at least a perforated backplate and a diaphragm.

In some embodiments, the capacitive transducer further includes a gasket, the gasket being disposed between the backplate and the diaphragm to dispose the backplate and the diaphragm at intervals.

In some embodiments, the liquid is capable of permeating into a space between the perforated backplate and the diaphragm through a hole in the perforated backplate.

In some embodiments, an air domain exists between the perforated backplate and the diaphragm.

In some embodiments, the housing further includes a first gas cavity, one of the front cavity and the rear cavity being filled with the liquid, the first gas cavity being connected to the cavity that is filled with the liquid.

In some embodiments, the housing further includes a second gas cavity, one of the front cavity and the rear cavity being filled with the liquid, the second gas cavity being connected to the cavity that is not filled with the liquid.

In some embodiments, one of the front cavity and the rear cavity is filled with the liquid, and a housing corresponding to the cavity that is not filled with the liquid is provided with an air hole.

In some embodiments, the air hole is covered with a third membrane structure.

BRIEF DESCRIPTION OF THE DRAWINGS

FIG. 39 is a frequency response curve illustrating a sensing device according to some embodiments of the present disclosure;

FIG. 40 is a schematic diagram illustrating a structure of a sensing device according to some embodiments of the present disclosure;

DETAILED DESCRIPTION

Figures 1, 2:
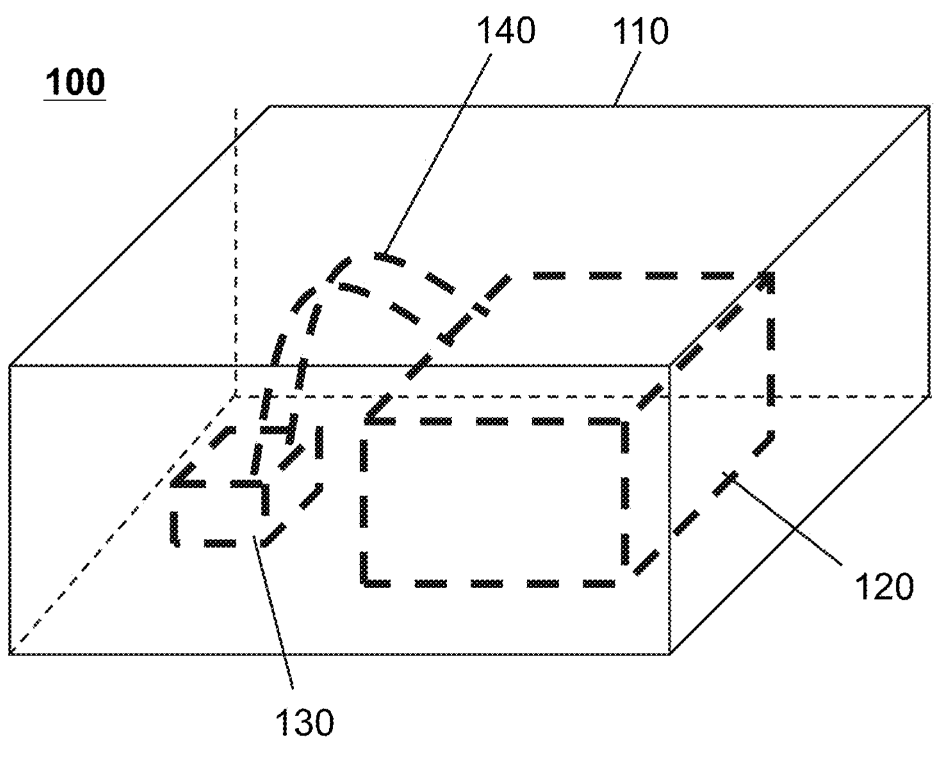
FIG. 1 is a schematic diagram illustrating an exemplary sensing device according to some embodiments of the present disclosure.
FIG. 2 is a schematic diagram illustrating a structure of an exemplary microphone according to some embodiments of the present disclosure.

In order to more clearly illustrate the technical solutions of the embodiments of the present disclosure, the following briefly introduces the drawings that need to be used in the description of the embodiments. Obviously, the accompanying drawings in the following description are only some examples or embodiments of the present disclosure, and those skilled in the art may also apply the present disclosure to other similar scenarios. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts or assemblies of different levels. However, the words may be replaced by other expressions if other words may achieve the same purpose.

As used in the disclosure and the appended claims, the singular forms "a," "an," and "the" include plural referents unless the content clearly dictates otherwise. Generally speaking, the terms "including" and "comprising" only suggest the inclusion of clearly identified steps and elements, and these steps and elements do not constitute an exclusive list, and the method or device may also contain other steps or elements.

Figure 25:
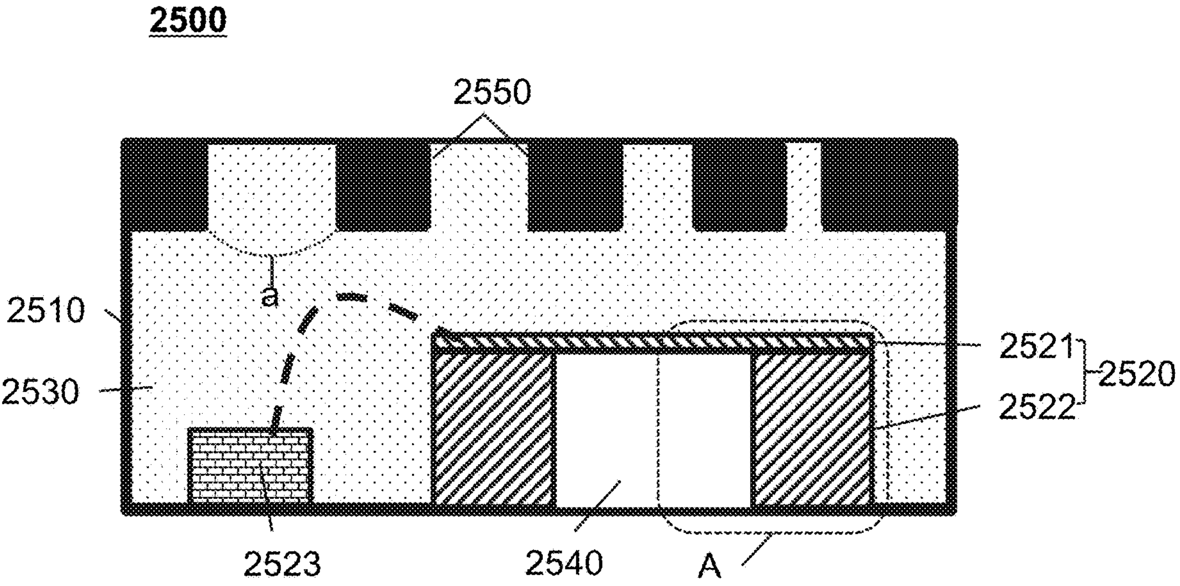
FIG. 25 is a schematic diagram illustrating a structure of a sensing device according to some embodiments of the present disclosure.

Embodiments of the present disclosure provide a sensing device. In some embodiments, the sensing device may include a housing, and an accommodation cavity may be provided inside the housing. In some embodiments, the sensing device may also include a transduction unit, and the transduction unit may include a vibration-pickup structure used for picking up vibration of the housing to generate an electrical signal. The transduction unit may receive the vibration of the housing and convert the vibration to an electrical signal for outputting. In some embodiments, the transduction unit may divide the accommodation cavity into a front cavity and a rear cavity located on opposite sides of the vibration-pickup structure, at least one of the front or rear cavities may be filled with liquid, and the liquid may be in contact with the vibration-pickup structure. In some embodiments, the sensing device may also include one or more pipeline structures, each of which may be configured to connect the accommodation cavity to an outside of the housing, and the liquid may be at least partially located in the one or more pipeline structures. For ease of understanding, the housing and the transduction unit may be considered as a sensor, vibration of the vibration-pickup structure has a first resonance frequency, i.e., the frequency response curve of the vibration-pickup structure has a first resonance peak at the first resonance frequency. Liquid in a fluid region corresponding to each pipeline structure (including a fluid region inside a cavity of a pipeline structure and a fluid region near the pipeline structure, as can be seen in FIG. 25 and related descriptions) and the outside of the housing to which the pipeline structure is connected (e.g., an air outside the housing) may be approximated as a resonance system attached to a sensor, such that the frequency response curve of the sensing device has an additional resonance peak and resonance valley in addition to the first resonance peak. In some embodiments, resonance frequencies corresponding to the resonance peak and resonance valley are less than the first resonance frequency, resulting in a significant improvement in the response of the sensing device in a frequency range prior to the first resonance peak on the frequency response curve. In some embodiments, when multiple pipeline structures are provided, the multiple pipeline structures may correspond to multiple resonance systems, and the multiple resonance systems may additionally provide multiple additional resonance peaks and resonance valleys for the sensor. In some embodiments, at least one of the resonance frequencies corresponding to the multiple resonance peaks and resonance valleys is less than the first resonance frequency. In some embodiments, the resonance system corresponding to the pipeline structure may be applied to different types of sensors (e.g., a piezoelectric sensor, a capacitive sensor, an electrodynamic sensor, an eddy current sensor, an inductive sensor), so that the frequency response curve of the sensor has multiple resonance peaks and resonance valleys, which in turn improves a frequency response of the sensor in a frequency range less than the first resonance frequency. Further, by setting different pipeline structures, a large difference between multiple resonance peaks and valleys may be obtained, i.e., Q is large. In this way, when the sensing device collects a vibration signal, it presents different sensitivities for different frequency components, and the generated electrical signal appears as a fusion of multiple "sub-band" signals. In a back-end circuit or algorithm, even a low-order filter can also be used to extract sub-band signals with steeper boundaries. In some embodiments, the sensing device involved in the present disclosure may be applied as an inertial sensor. In some embodiments, the sensing device may be applied to common scenarios of the inertial sensor such as an accelerometer, an energy harvester, a gyroscope, etc. In some embodiments, the sensing device may also be applied to audio devices such as a bone conduction microphone, a speaker, and a hearing aid to enhance the sensitivity of the audio devices. In some embodiments, the sensing device may also be applied to electronic devices with audio capabilities (e.g., a headphone, glasses, a smart helmet, a speaker, a tablet, a cell phone, etc.).

FIG. 1 is a schematic diagram illustrating an exemplary sensing device according to some embodiments of the present disclosure.

The sensing device 100 may generate a deformation and/or a displacement based on an external signal, such as a mechanical signal (e.g., pressure, mechanical vibration), an acoustic signal (e.g., sound waves), an electrical signal, an optical signal, a thermal signal, etc. The deformation and/or displacement may be further converted to a target signal by a transducer component of the sensing device 100. In some embodiments, the target signal may be an electrical signal, a mechanical signal (e.g., mechanical vibration), an acoustic signal (e.g., sound waves), an optical signal, a thermal signal, etc. In some embodiments, the sensing device 100 may be a microphone (e.g., an air-conduction microphone or a bone conduction microphone), a speaker (e.g., an air-conduction speaker or a bone-conduction speaker), an accelerometer, a pressure sensor, a hydrophone, an energy harvester, a gyroscope, etc. The air-conduction microphone or air-conduction speaker is a microphone or speaker in which sound waves are conducted through air. The bone conduction microphone or bone-conduction speaker is a microphone or speaker in which sound waves are conducted in a solid (e.g., bone) by means of mechanical vibration.

Exemplarily, as shown in FIG. 1, the sensing device 100 may include a housing 110, a transduction unit 120, and a processor 130 (e.g., an integrated circuit (IC)).

The housing 110 may be a regular or irregular three-dimensional structure, inside which an accommodation cavity (i.e., a hollow portion) is provided, for example, the housing 110 may be a hollow frame structural body including, but not limited to, a regular shape such as a rectangular frame, a circular frame, a square polygon frame, and any irregular shape. The housing 110 may be used to accommodate the transduction unit 120 and/or the processor 130. In some embodiments, the housing 110 may be encapsulated in one or more of plastic encapsulation, metal encapsulation, etc. In some embodiments, the accommodation cavity of the housing 110 may contain one or more of gas, liquid, solid, etc. In some embodiments, the accommodation cavity may also be a vacuum structure.

The transduction unit 120 may be located in the accommodation cavity of the housing 110 or at least partially suspended in the accommodation cavity of the housing 110. The transduction unit 120 may be used to convert an external signal to a target signal. Taking a bone conduction microphone (also called a vibration sensing device) as an example, the external signal is a mechanical vibration signal and the target signal is an electrical signal. The transduction unit 120 may include a vibration-pickup structure. The vibration-pickup structure may have a certain elasticity. For example, the vibration-pickup structure may be a vibration rod (such as a cantilever beam), a vibration membrane (such as a piezoelectric membrane), a vibration block, etc. The vibration-pickup structure may generate a deformation and/or displacement in response to a mechanical vibration signal. The transduction unit 120 may convert the deformation and/or displacement into a target signal (e.g., an electrical signal). In some embodiments, the transduction unit 120 may include a piezoelectric transducer, an acoustic transducer, an electromagnetic transducer, a capacitive transducer, etc. In some embodiments, the transduction unit 120 may be electrically connected to the processor 130 via a lead wire 140.

The processor 130 may be configured to process data and/or signals. In some embodiments, the processor 130 may include one or more of a bipolar integrated circuit (e.g., a logic gate circuit, an emitter-coupled logic circuit, etc.), a unipolar integrated circuit (e.g., a field effect transistor integrated circuit, an n-channel field effect transistor integrated circuit, etc.), etc.

In some embodiments, the processor 130 may be disposed in the accommodation cavity of the housing 110 or at least partially suspended in the accommodation cavity of the housing 110. In some embodiments, the processor 130 may also be disposed outside of the accommodation cavity of the housing 110. For example, the processor 130 may be disposed on an outer surface of the housing 110, which may be signally connected to the transduction unit 120 via a lead wire. In some embodiments, the processor 130 may process the target signal. Continuing with the bone conduction microphone as an example, the processor 130 may convert the target signal to voice data or send the target signal or voice data corresponding to the target signal to a cloud and/or other terminal device. In some embodiments, the transduction unit 120 and the processor 130 may be arranged side by side (as shown in FIG. 1), arranged an up and down, or integrated internally, etc.

In some embodiments, the sensing device 100 may also include the lead wire 140. The lead wire 140 may be used to signally connect the transduction unit 120 to the processor 130. For example, the lead wire 140 may transmit the target signal or other signals (e.g., a configuration instruction, an acquisition instruction, etc.). In some embodiments, the lead wire 140 may not be necessary and its function may be achieved by other connections. For example, the transduction unit 120 and the processor 130 may be arranged in a stacked up and bottom arrangement, and the transduction unit 120 and the processor 130 may transmit data through direct contact between two ports to replace the function of the lead wire 140.

FIG. 2 is a schematic diagram illustrating a structure of an exemplary microphone according to some embodiments of the present disclosure.

As shown in FIG. 2, the microphone 200 may include a housing 210, a transduction unit 220, a processor 230, and a printed circuit board (PCB) 240.

The PCB 240 may be a phenolic PCB paper substrate, a composite PCB substrate, a fiberglass PCB substrate, a metal PCB substrate, a laminate multilayer PCB substrate, etc. In some embodiments, the PCB 240 may be a glass fiber PCB substrate with a FR-4 grade made of epoxy glass fiber cloth. The PCB 240 may be provided (e.g., by a laser etching, a chemical etching, etc.) with a circuit and other components of the microphone 200. In some embodiments, the PCB 240 may also be a flexible printed circuit board (FPC). In some embodiments, the transduction unit 220 and the processor 230 are fixedly connected to the PCB 240 by a fixing adhesive 250 of the transduction unit and a fixing adhesive 260 of the processor, respectively. In some embodiments, the fixing adhesive 250 of the transduction unit and/or the fixing adhesive 260 of the processor may be a conductive adhesive (e.g., a conductive silver adhesive, a copper powder conductive adhesive, a nickel-carbon conductive adhesive, a silver-copper conductive adhesive, etc.). The conductive adhesive may be a conductive glue, a conductive adhesive membrane, a conductive adhesive ring, a conductive adhesive tape, etc. The transduction unit 220 and/or the processor 230 are electrically connected to other components through circuits arranged on the PCB 240, respectively. The transduction unit 220 and the processor 230 may be directly connected to each other via a wire 270 (e.g., a gold wire, a copper wire, an aluminum wire, etc.).

The housing 210 may be a regular or irregular three-dimensional structure, inside which an accommodation cavity (i.e., a hollow portion) is provided, for example, the housing 210 may be a hollow frame structural body including, but not limited to, a regular shape such as a rectangular frame, a circular frame, a square polygon frame, and any irregular shape. The housing 210 is covered above the PCB 240 to seal the transduction unit 220, the processor 230, the PCB 240, and the circuits and other components provided thereon. The housing 210 may be made of metal (e.g., stainless steel, copper, etc.), plastic (e.g., polyethylene (PE), polypropylene (PP), polyvinyl chloride (PVC), polystyrene (PS), and acrylonitrile-butadiene-styrene co-polymer (ABS), etc.), composite material (e.g., metal matrix composite or non-metal matrix composite), etc. In some embodiments, material used for the housing 210 is brass.

The transduction unit 220 may convert the external vibration signal into an electrical signal. Taking a bone conduction microphone as an example, the transduction unit 220 may include a base part structure, a laminated structure (i.e., a vibration-pickup structure), and at least one damping structure layer. In some embodiments, the base part structure and the laminated structure may be located in the housing 210 of the bone conduction microphone, the base part structure is fixedly connected to an inner wall of the housing 210 and the laminated structure is carried on the base part structure. In some embodiments, at least a portion of the laminated structure is physically connected to the base part structure. The "connection" in the present disclosure may be understood as a connection between different parts of the same structure, or a fixed connection of separate parts or structures by welding, riveting, clamping, bolting, adhesive bonding, etc., after preparing the separate components or structures respectively, or that a first component or structure is deposited on a second component or structure by physical deposition (e.g., physical vapor deposition) or chemical deposition (e.g., chemical vapor deposition) during the preparation process. In some embodiments, at least a portion of the laminated structure may be fixed to an upper or lower surface of the base part structure, and the at least a portion of the laminated structure may also be fixed to a side wall of the base part structure. For example, the laminated structure may be a cantilever beam (also referred to as a piezoelectric beam), which may be a plate-like structural body, one end of the cantilever beam is connected to an upper surface of the base part structure, a lower surface of the base part structure, or a side wall where a cavity of the base part structure is located, and the other end of the cantilever beam is not connected to or in contact with the base part structure such that the other end of the cantilever beam is suspended in the cavity of the base part structure. As another example, the bone conduction microphone may include a vibration membrane layer (also referred to as a suspension membrane structure), the suspension membrane structure is fixedly connected to the base part structure, and the laminated structure is disposed on an upper surface or a lower surface of the suspension membrane structure. As another example, the laminated structure may include a mass element and one or more support arms, the mass element is fixedly connected to the base part structure by the one or more support arms, one end of the support arm is connected to the base part structure and the other end of the support arm is connected to the mass element such that a portion of the mass element and the support arms is suspended in the cavity of the base part structure. It should be noted that "located in the cavity" or "suspended in the cavity" in the present disclosure may mean suspended inside, below or above the cavity.

In some embodiments, the laminated structure may include a vibration unit and a signal conversion unit (which may also be referred to as an acoustic transduction unit). The vibration unit is a portion of the laminated structure that is susceptible to deformation by an external force, and the vibration unit may be used to transfer the deformation caused by the external force to a signal conversion unit. The signal conversion unit is a portion of the laminated structure that converts the deformation of the vibration unit into an electrical signal. Specifically, the base part structure may generate vibration based on an external vibration signal, and the vibration unit deforms in response to the vibration of the base part structure; the signal conversion unit generates an electrical signal based on the deformation of the vibration unit. It should be known that the description of the vibration unit and the signal conversion unit herein is only for the purpose of facilitating the introduction of the working principle of the laminated structure, and does not limit the actual composition and structure of the laminated structure. In some embodiments, the vibration unit may not be necessary and its function may be fully implemented by the signal conversion unit. The signal conversion unit may generate an electrical signal directly in response to the vibration of the base part structure. For example, the signal conversion unit may be a piezoelectric cantilever beam.

In some embodiments, the vibration unit and the signal conversion unit overlap to form a laminated structure. The signal conversion unit may be located on an upper layer of the vibration unit, and the signal conversion unit may also be located on a lower layer of the vibration unit.

In some embodiments, the signal conversion unit may include at least two electrode layers (e.g., a first electrode layer and a second electrode layer) and a piezoelectric layer, and the piezoelectric layer may be disposed between the first electrode layer and the second electrode layer. The piezoelectric layer is a structure that may generate a voltage at its two end surfaces when subjected to an external force. In some embodiments, the piezoelectric layer may generate a voltage under the action of a deformation stress of the vibration unit, and the first electrode layer and the second electrode layer may collect the voltage (electrical signal).

Taking a bone conduction microphone as an example, the vibration unit may include at least one elastic layer. The signal conversion unit may include a first electrode layer, a piezoelectric layer, and a second electrode layer disposed in sequence from top to bottom, and the elastic layer is disposed on a surface of the first electrode layer or the second electrode layer, the elastic layer may deform during vibration, the piezoelectric layer may generate an electrical signal based on the deformation of the elastic layer, and the first electrode layer and the second electrode layer may collect the electrical signal. By way of illustration only, the vibration unit may include a first elastic layer and a second elastic layer disposed in sequence from top to bottom. The first elastic layer and the second elastic layer may be a plate structure made of semiconductor material. In some embodiments, the semiconductor material may include silicon dioxide, silicon nitride, gallium nitride, zinc oxide, silicon carbide, etc. In some embodiments, the materials of the first elastic layer and the second elastic layer may be the same or different.

In some embodiments, the piezoelectric layer may be a piezoelectric polymer membrane obtained by a deposition process of semiconductor (e.g., magnetron sputtering, MOCVD). In some embodiments, material of the piezoelectric layer may include piezoelectric crystal material and piezoelectric ceramic material. The piezoelectric crystal refers to a piezoelectric single crystal. In some embodiments, the piezoelectric crystal material may include crystals, sphalerite, aragonite, tourmaline, rhodochrosite, GaAs, barium titanate and its derivative structural crystals, $KH_2PO_4$, $NaKC_4H_4O_6 \cdot 4H_2O$ (Rochelle salt), or any combination thereof. The piezoelectric ceramic material is a piezoelectric polycrystal formed by an irregular collection of microfine grains obtained by solid-phase reaction and sintering between different material powder grains. In some embodiments, the piezoelectric ceramic material may include barium titanate (BT), lead zirconate titanate (PZT), lead barium lithium niobate (PBLN), modified lead titanate (PT), aluminum nitride (AlN), zinc oxide (ZnO), etc., or any combination thereof. In some embodiments, the piezoelectric layer material may also be piezoelectric polymer material, e.g., polyvinylidene fluoride (PVDF), etc. In some embodiments, the first electrode layer and the second electrode layer are conductive material structures. Exemplary conductive materials may include metals, alloy materials, metal oxide materials, graphene, etc., or any combination thereof. In some embodiments, the metal and alloy material may include nickel, iron, lead, platinum, titanium, copper, molybdenum, zinc, or any combination thereof. In some embodiments, the alloy material may include copper-zinc alloy, copper-tin alloy, copper-nickel-silicon alloy, copper-chromium alloy, copper-silver alloy, etc., or any combination thereof. In some embodiments, the metal oxide material may include $RuO_2$, $MnO_2$, $PbO_2$, NiO, etc., or any combination thereof.

The damping structure layer may refer to a structural body having a damping property. In some embodiments, the damping structure layer may be a membrane-like structure or a plate-like structure. Further, at least one side of the damping structure layer may be connected to the base part structure. In some embodiments, the damping structure layer may be disposed on the upper and/or lower surfaces of the laminated structure or between multiple layers of the laminated structure. For example, when the laminated structure is a cantilevered beam, the damping structure layer may be located on an upper surface and/or a lower surface of the cantilevered beam. As another example, when the laminated structure is a support arm and a mass element, the damping structure layer may be located on a lower surface of the mass element and/or an upper surface of the support arm when the mass element protrudes downward relative to the support arm. In some embodiments, for a macro-sized laminated structure and a base part structure, the damping structure layer may be bonded directly at the base part structure or the laminated structure. In some embodiments, for a microelectromechanical systems (MEMS) device, the damping structure layer may be connected to the laminated structure and the base part structure using a semiconductor process, e.g., vapor deposition, spin coating, micro-assembly, etc. In some embodiments, the damping structure layer may have a regular shape such as a circle, an ellipse, a triangle, a quadrilateral, a hexagon, an octagon, etc. or an irregular shape. In some embodiments, an output effect of the electrical signal of the bone conduction microphone may be improved by selecting material, a size, a thickness, etc. of the damping structure layer.

When the housing 210 of the bone conduction microphone is vibrated by an external force (for example, when the human body speaks, vibration of a face drives the housing 210 to vibrate), the vibration of the housing 210 drives the base part structure to vibrate. Since the laminated structure and the housing structure (or the base part structure) have different properties, movement between the laminated structure and the housing 210 is not be completely consistent, thereby generating a relative motion, which in turn causes the vibration unit of the laminated structure to deform. Further, when the vibration unit is deformed, the piezoelectric layer of the signal conversion unit is subjected to the deformation stress of the vibration unit to generate a potential difference (voltage). At least two electrode layers (e.g., a first electrode layer and a second electrode layer) located on the upper and lower surfaces of the piezoelectric layer respectively in the signal conversion unit may collect the potential difference to convert the external vibration signal into an electrical signal.

A damping of the damping structure layer differs in different stress (deformation) states, for example, the damping structure layer presents a large damping at high stress or large amplitude. Due to the characteristics of the laminated structure with a small amplitude in a non-resonance region and a large amplitude in a resonance region, by increasing the damping structure layer, a quality factor Q may be reduced in the resonance region while less reducing the sensitivity of the bone conduction microphone in the non-resonance region, so that the frequency response of the bone conduction microphone is flat throughout the frequency band. The bone conduction microphone may be used in a headphone (e.g., a bone-conduction headphone or an air-conduction headphone), glasses, a virtual reality device, a helmet, etc. The bone conduction microphone may be placed on the human head (e.g., the face), the neck, near the ears, and on top of the head, etc. The bone conduction microphone may pick up vibration signal from the bones when a person speaks and converts the vibration signal into an electrical signal to achieve sound acquisition. It should be noted that the base part structure is not limited to a separate structure relative to the housing 210 of the bone conduction microphone, and in some embodiments, the base part structure may also be a portion of the housing 210 of the bone conduction microphone.

The processor 230 may obtain the electrical signal from the transduction unit 220 and perform signal process. In some embodiments, the signal process may include frequency modulation process, amplitude modulation process, filtering process, noise reduction process, etc.

Figure 3:
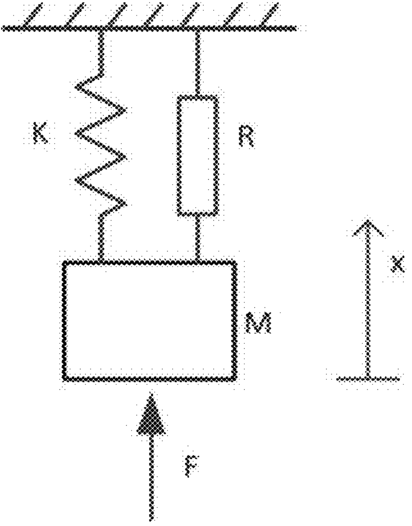
FIG. 3 is a schematic diagram illustrating an exemplary equivalent vibration model of a transduction unit according to some embodiments of the present disclosure.

FIG. 3 is a schematic diagram illustrating an exemplary equivalent vibration model of a transduction unit according to some embodiments of the present disclosure.

The transduction unit 120 may be simplified and equated to a mass-spring-damping system as shown in FIG. 3. The mass-spring-damping system is forced to vibrate under the action of an excitation force F. The motion of the system may be described by the following differential equation:

$$M\frac{d^2x}{dt^2} + R\frac{dx}{dt} + Kx = F\cos\omega t \quad (1)$$

Where M is the system mass, R is the system damping, K is the system elasticity coefficient, F is the drive force amplitude, x is the system displacement, and w is the external force circular frequency. Solving the above equation for the steady-state displacement yields:

$$x = x_a \cos(\omega t - \theta) \tag{2}$$

where $$x_a = \frac{F}{\omega|Z|} = \frac{F}{\omega\sqrt{R^2 + (\omega M - K\omega^{-1})^2}}.$$

When the sensing device 100 actually works, x corresponds to a deformation amount of a vibration-electric signal conversion module of the transduction unit 120, and the magnitude of x ultimately corresponds to the magnitude of the output electric signal. The displacement-amplitude ratio (normalized) is:

$$A = \frac{x_a}{x_{a0}} = \frac{Q_m}{\sqrt{\frac{\omega^2}{\omega_0} + \left(\frac{\omega^2}{\omega_0} - 1\right)^2 Q_m^2}} \tag{3}$$

$$\omega_0 = \sqrt{\frac{K}{M}}, \tag{4}$$

where $Q_m = \frac{\omega_0 M}{R}$, is the mechanical quality factor;

$$x_{a0} = \frac{F}{K}$$

is the static displacement amplitude (or displacement amplitude at $\omega=0$); $\omega_0$ is the resonance frequency of the system.

Figure 4:
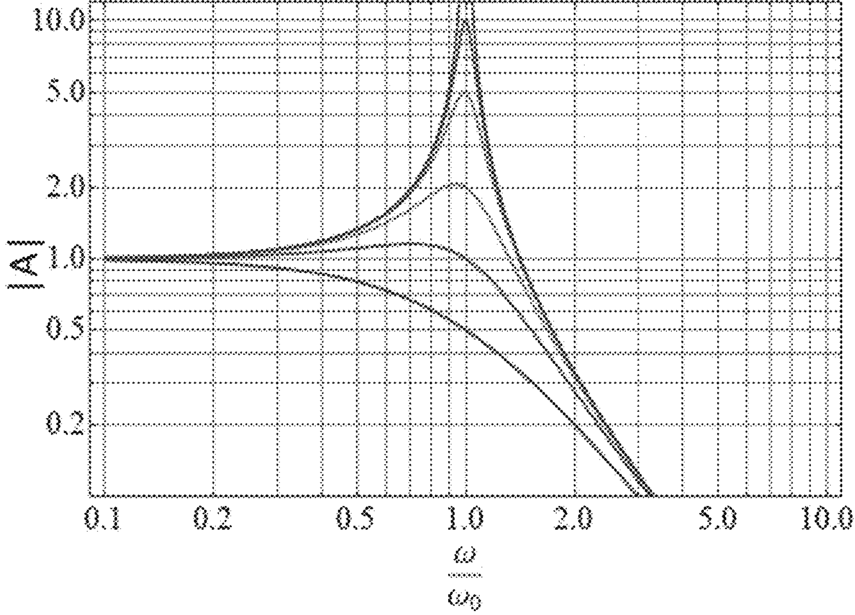
FIG. 4 is a schematic diagram illustrating a displacement resonance curve of an exemplary sensing device according to some embodiments of the present disclosure.

FIG. 4 is a schematic diagram illustrating a displacement resonance curve of an exemplary sensing device according to some embodiments of the present disclosure. The normalized displacement resonance curve of the sensing devices composed of transduction units with different parameters (elastic coefficient, mass, damping) is shown in FIG. 4. The horizontal axis corresponds to the ratio $$\frac{\omega}{\omega_0}$$

of a frequency of the external force (or vibration) to the resonance frequency of the system, and the vertical axis corresponds to the A in equation (3). It can be seen that for different sensing devices with different transduction units, the mechanical quality factor $Q_m$ are different, which corresponds to different curves in the figure, and displacement A are different. When the ratio $$\frac{\omega}{\omega_0}$$

between the frequency of the external force (or vibration) and the resonance frequency of the system is 1, the system resonates, and the displacement change is the largest at this time. The larger the $Q_m$ of the transduction unit is, the larger the A is and the steeper the curve is, while the smaller the $Q_m$ of the transduction unit is, the smaller the A is and the flatter the curve is, so the A may be adjusted by adjusting the quality factor $Q_m$ of the transduction unit 120 (for example, changing structure of the transduction unit).

The principle that the microphone generates a voltage signal is generating a relative displacement of the vibration-electric signal conversion module (i.e., the transduction unit) and the microphone housing (e.g., an electret microphone generates a voltage signal by deformation of the diaphragm and changing a distance from the substrate; a cantilevered beam bone conduction microphone produces a piezoelectric effect through deformation of a cantilevered vibration device to generate an electrical signal), and the larger the displacement is, the larger the output signal is. It is clearly that the vibration-electrical signal conversion module of the microphone perfectly fits the displacement resonance curve as in FIG. 4.

When decreasing $$\frac{K}{M},$$

the resonance frequency of the system decreases. When the resonance frequency is changed, the sensitivity of the frequency signal before the resonance frequency is increased, but the sensitivity of a period of frequency signal after the resonance frequency decreases. When adjusting the sensitivity by adjusting the resonance frequency of the sensing device 100, the frequency range needs to be taken into account. In some embodiments, the resonance frequency of the sensing device 100 is within a range of 1500 Hz-6000 Hz. In some embodiments, the resonance frequency of the sensing device 100 is within a range of 1500 Hz-3000 Hz. In some embodiments, the resonance frequency of the sensing device 100 is within a range of 2000 Hz-2500 Hz.

Figure 5:
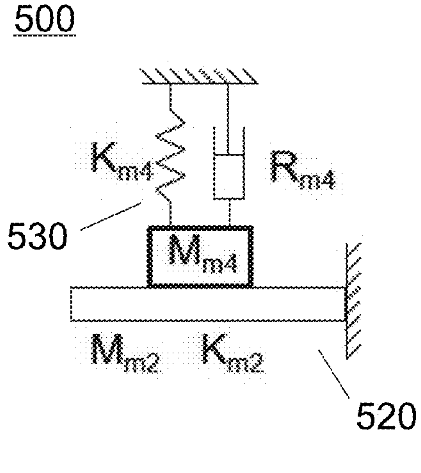
FIG. 5 is a schematic diagram illustrating a mechanical equivalent of an exemplary sensing device according to some embodiments of the present disclosure.

FIG. 5 is a schematic diagram illustrating a mechanical equivalent of an exemplary sensing device according to some embodiments of the present disclosure.

In some embodiments, the sensing device 500 may include a transduction unit 520 and an additional resonance system 530 (also referred to as a first resonance system 530). In some embodiments, the sensing device 500 may be considered as adding the first resonance system 530 on the basis of the transduction unit 520. Exemplarily, in this embodiment, the first resonance system 530 may be a spring ($K_{m4}$)-mass ($M_{m4}$)-damping ($R_{m4}$) system. The first resonance system 530 may be coupled between the housing (not shown in the figure) and the transduction unit 520. Due to the effect of the first resonance system 530, when the housing receives an external vibration signal, the external vibration signal is transmitted to the transduction unit 520 through a housing region connected to the transduction unit 520 and a housing region connected to the first resonance system 530, respectively. As a result, mechanical response of the sensing device 500 is changed compared to the sensing device 100. Correspondingly, electrical, acoustic, and/or thermal response of the sensing device 500 is changed compared to the sensing device 100.

In some embodiments, the first resonance system 530 may be formed by filling the accommodation cavity of the housing with liquid. For example, the liquid fills the accommodation cavity inside the housing and the transduction unit 520 is encased in the liquid.

Figure 6:
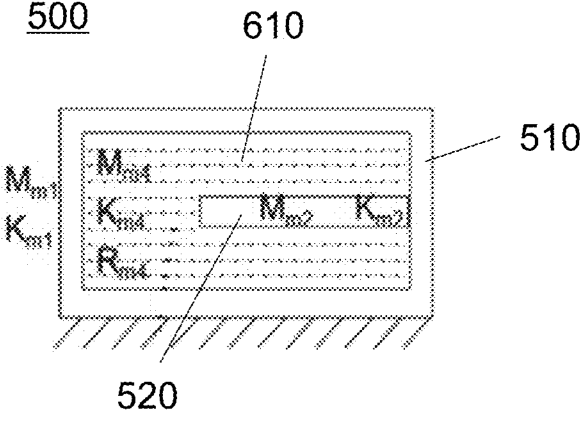
FIG. 6 is a schematic diagram illustrating a sensing device filled with liquid according to some embodiments of the present disclosure.

FIG. 6 is a schematic diagram illustrating a sensing device filled with liquid according to some embodiments of the present disclosure. As shown in FIG. 6, the liquid 610 may be liquid having safety performance (e.g., non-flammable and non-explosive), stability performance (e.g., not volatile, not subject to high temperature deterioration, etc.). For example, the liquid 610 may include oil (such as silicone oil, glycerin, castor oil, motor oil, lubricating oil, hydraulic oil (such as aviation hydraulic oil), etc.), water (such as pure water, aqueous solutions of other inorganic or organic substances, etc. (such as salt water)), oil-water emulsion, or other liquids that meet their performance requirements, or any combination thereof.

A density and a kinematic viscosity of the liquid 610 are within a certain density range and a certain kinematic viscosity range, respectively. In some embodiments, the density range and kinematic viscosity range may be set by the user or determined based on the performance of the sensing device 500 (e.g., sensitivity, bottom noise level, resonance peak-to-peak value, frequency range where the resonance peak is located, peak-to-valley value, and/or quality factor Q, etc.). In some embodiments, the liquid 610 may be silicone oil. The silicone oil has the characteristics of high temperature resistant, non-volatile, and a wide viscosity range, a density of which is about 0.94 kg/$m^3$ and an optional range of kinematic viscosities of which is wide (e.g., 0.1-1000 centistokes (cst)).

The liquid 610 may be injected into the housing 510 into the accommodation cavity of the housing 510 in a particular manner. For a specific description of the injection of liquid 610 into the accommodation cavity of housing 510, please refer to other parts of the present disclosure, such as FIG. 11 and its related description.

In some embodiments, the frequency response curve of the sensing device 500 includes at least two resonance peaks. The at least two resonance peaks include a first resonance peak and a second resonance peak. A resonance frequency corresponding to the first resonance peak is mainly related to the properties of the transduction unit 520 (e.g., shape, material, structure, etc.). The second resonance peak is a resonance peak generated by the action of the first resonance system 530, and its corresponding resonance frequency is mainly related to one or more mechanical parameters of the first resonance system 530 (e.g., the equivalent spring ($K_{m4}$), equivalent mass ($M_{m4}$), equivalent damping ($R_{m4}$), etc. of the resonance system). In order to make the sensing device 500 applicable to different scenarios, different relationships may be satisfied between the resonance frequency corresponding to the first resonance peak (also called the first resonance frequency) and the resonance frequency corresponding to the second resonance peak (also called the second resonance frequency). For example, the second resonance frequency may be less than, equal to, or greater than the first resonance frequency.

For illustrative purposes only, the frequency response curve of the sensing device 500 is enhanced in the lower and middle frequency bands where speech information is more abundant due to the presence of the second resonance peak corresponding to the first resonance system 530, resulting in increase in its sensitivity. In addition, because the first resonance system 530 acts on the transduction unit 520, a vibration property of the sensing device 500 is changed compared to the sensing device without the first resonance system 530. Specifically, the first resonance system 530 acts on the transduction unit 520 to affect the mass, stiffness, and/or damping of the sensing device 500, which has the effect of causing the Q of the first resonance peak of the sensing device 500 to change (e.g., the Q value decreases) relative to the Q of the sensing device without connecting the first resonance system 530. For a more specific description of the frequency response curve of the sensing device 500 and the first resonance peak, and the second resonance peak, please refer to other description in the present disclosure, such as FIGS. 9 and 10 and their related descriptions.

In some embodiments, the first resonance system 530 may reduce an external impact on the transduction unit 520 to protect the transduction unit 520. For example, if the first resonance system 530 is liquid 610 that fills the accommodation cavity of the sensing device 500, the reliability of the sensing device 500 when receiving an external impact load (e.g., a bone conduction microphone requires to resist an impact of 10,000 g acceleration without damage) may be improved due to the viscous effect of the liquid 610 and the stiffness of the liquid 610 being smaller relative to the device material. Specifically, due to the viscous effect of the liquid 610, some of the impact energy may be absorbed and consumed, making the impact load on the transduction unit 520 therein significantly reduce.

In addition, the sensing device 100 is often subject to device deformation, such as bending (along the length, width), twisting, etc., due to the stresses during processing, especially in a cantilever beam device. However, the cantilever beam structure is a common structure for sensing devices such as a bone conduction microphone and an acceleration device. The sensing device 500 may use the gravity, surface tension, viscous force, etc. of the liquid 610 to correct the device deformation because the housing is filled with the liquid 610, making the device deformation smaller, more stable output, closer to the actual design effect.

Figure 7:
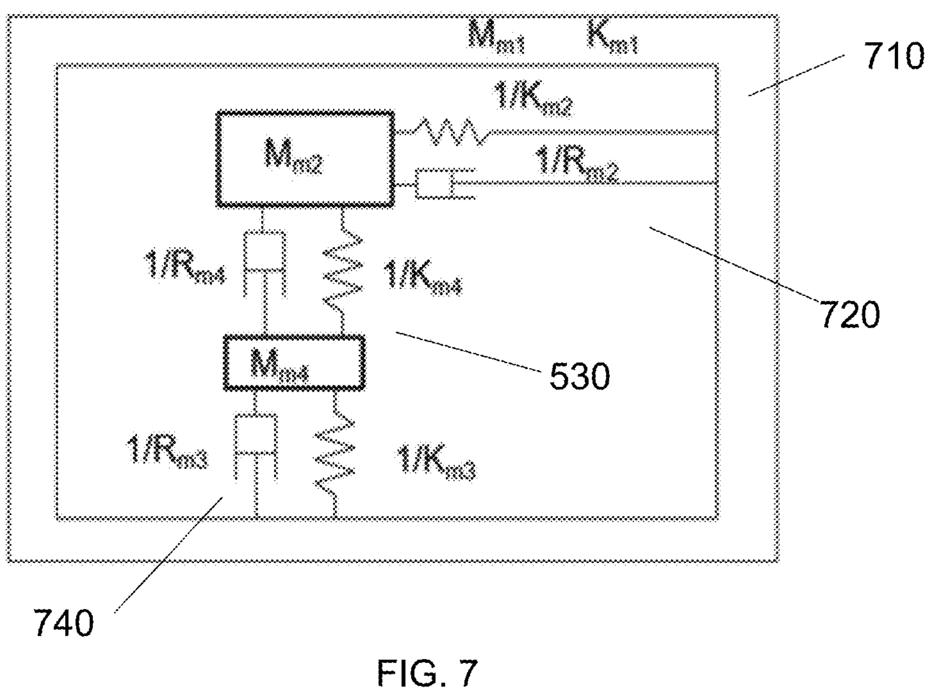
FIG. 7 is a schematic diagram illustrating a mechanical equivalent of an exemplary sensing device according to some embodiments of the present disclosure.

FIG. 7 is a schematic diagram illustrating a mechanical equivalent of an exemplary sensing device according to some embodiments of the present disclosure. As shown in FIG. 7, the sensing device 700 may include a transduction unit 720 and a second resonance system 740. In some embodiments, the sensing device 700 may be considered as adjusting the first resonance system 530 to form the second resonance system 740 on the basis of the transduction unit 720. Exemplarily, in this embodiment, the second resonance system 740 has a spring ($K_{m3}$) and a damping ($R_{m3}$) compared to the first resonance system 530. The second resonance system 740 may be disposed between the housing 710 and the transduction unit 720. For example, as shown in FIG. 7, the spring ($K_{m3}$)-damping ($R_{m3}$) of the second resonance system 740 may be connected in series with the spring ($K_{m4}$)-mass ($M_{m4}$)-damping ($R_{m4}$) of the first resonance system 530, and indirectly act on the transduction unit 720. As another example, the spring ($K_{m3}$)-damping ($R_{m3}$) of the second resonance system 740 may be connected in series with the spring ($K_{m4}$)-mass ($M_{m4}$)-damping ($R_{m4}$) of the first resonance system 530 and directly act on the transduction unit 720. Due to the second resonance system 740, when the housing 710 receives an external vibration signal, the external vibration signal is transmitted to the transduction unit 720 via a housing region connected to the transduction unit 720 and a housing region connected to the second resonance system 740 via the second resonance system 740, respectively. As a result, the mechanical response of the sensing device 700 is changed compared to the sensing device 500. Accordingly, the electrical, acoustic and/or thermal response of the sensing device 700 is changed compared to the sensing device 500. At the same time, the vibration property (e.g., stiffness-damping, etc.) of the sensing device 700 is changed compared to the sensing device 500 due to the spring ($K_{m3}$) and the damping ($R_{m3}$) of the second resonance system 740.

In some embodiments, the second resonance system 740 may be formed by filling the accommodation cavity of the sensing device 700 with a different medium. For example, the accommodation cavity of the sensing device 700 is partially filled with liquid to form the second resonance system 740 in which liquid and bubbles (which may also be referred to as a gas cavity) coexist within the accommodation cavity. In this case, the liquid in the accommodation cavity may be equivalent to the spring ($K_{m4}$)-mass ($M_{m4}$)-damping ($R_{m4}$), and the bubbles may be equivalent to the spring ($K_{m3}$) and damping ($R_{m3}$). As another example, the accommodation cavity of the sensing device 700 may be filled with liquid, and the sensing device 700 may also include a pipeline structure connecting the accommodation cavity to the outside of the housing, the liquid being at least partially located in one or more of the pipeline structures. In this case, the liquid in the accommodation cavity may be equivalent to the spring ($K_{m4}$)-mass ($M_{m4}$)-damping ($R_{m4}$), and the liquid in the fluid region corresponding to the pipeline structure and the air corresponding to that pipeline structure may be equivalent to the spring ($K_{m3}$) and damping ($R_{m3}$). As another example, the second resonance system 740 may be formed by filling the accommodation cavity of the sensing device 700 with immiscible liquids with different densities. In some embodiments, the medium filled into the accommodation cavity of the sensing device 700 may be set by the user or determined based on the performance of the sensing device 700 (e.g., sensitivity, bottom noise level, resonance peak-to-peak value, frequency range where the resonance peak is located, peak-to-valley value, and/or quality factor Q, etc.).

Figure 8:
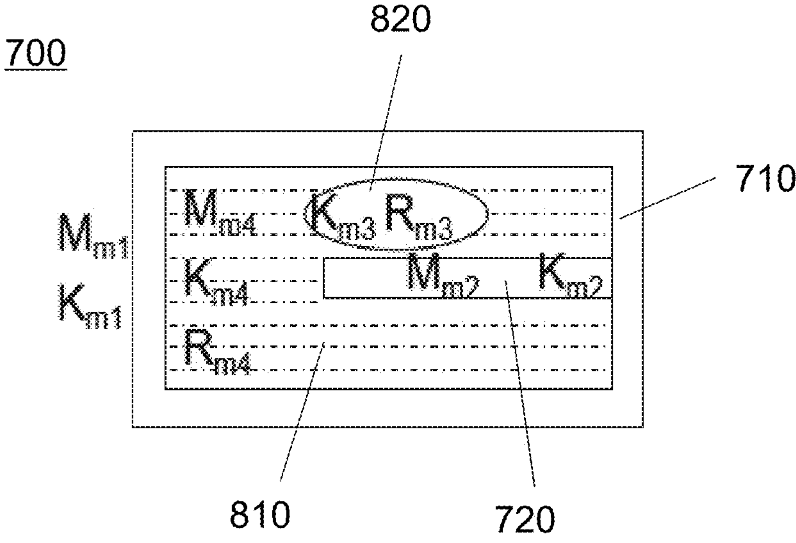
FIG. 8 is a schematic diagram illustrating a sensing device filled with liquid and bubbles according to some embodiments of the present disclosure.

FIG. 8 is a schematic diagram illustrating a sensing device filled with liquid and bubbles according to some embodiments of the present disclosure. As shown in FIG. 8, in the sensing device 700, the accommodation cavity of the housing 710 is filled with liquid 810 and bubbles 820. The liquid 810 in the sensing device 700 may be of the same or different type of liquid as the sensing device 500. For example, both the sensing device 700 and the sensing device 500 are filled with silicone oil with the same kinematic viscosity. As another example, the sensing device 700 and the sensing device 500 are filled with different types of liquid 810 or the same type of liquid 810 with different kinematic viscosities (e.g., silicone oil with kinematic viscosities of 0.65 cst and 200 cst, respectively). The liquid 810 and bubbles 820 may be injected into or formed in the accommodation cavity of the housing 710 in a particular manner. For more information about the manner of injecting or forming the liquid 810 and bubbles 820 in the accommodation cavity of the housing 710, please refer specifically to the description elsewhere in the present disclosure, such as FIG. 11 and its related description.

In some embodiments, the frequency response curve of the sensing device 700 includes at least two resonance peaks. The at least two resonance peaks include a third resonance peak and a fourth resonance peak. The third resonance peak is a resonance peak corresponding to the transduction unit 720, and the fourth resonance peak is a resonance peak generated by the action of the second resonance system 740.

In some embodiments, a different relationship may be satisfied between the third resonance frequency (the resonance frequency corresponding to the third resonance peak) and the fourth resonance frequency (the resonance frequency corresponding to the fourth resonance peak) of the sensing device 700. Exemplarily, when the second resonance system 740 is formed by the liquid 810 and the bubbles 820 together, the sensing device 700 may have a resonance frequency located in the low or low-medium frequency band due to a large compressible amplitude (compared to the case of the liquid 810) and a small stiffness of the bubbles 820. For example, the fourth resonance frequency is low or low-medium frequency, and the third resonance frequency may be greater than the fourth resonance frequency, for example, the third resonance frequency is in a high frequency band. As another example, the third resonance frequency and the fourth resonance frequency are both low-medium frequency. The low frequency, low-medium frequency, and high-medium frequency are frequencies whose frequency values are within a certain range. For example, the low frequency or low-medium frequency or medium-high frequency corresponds to a frequency range of 7000 Hz or less, 5000 Hz or less, 3000 Hz or less, 1000 Hz or less, 500 Hz or less, etc. For example, the high frequency band corresponds to a frequency range of 2000 Hz or more, 5000 Hz or more, 8000 Hz or more, etc. The third resonance frequency is a high frequency compared to the fourth resonance frequency. In some embodiments, the difference between the third resonance frequency and the fourth resonant frequency is within a range of 100-6000 Hz. When the sensing device 700 has resonant frequencies in the low frequency or low-medium frequency band, sensitivity of the sensing device 700 is higher at low frequency compared to the sensing device without the second resonance system 740. When the sensing device 700 further has resonance frequency in the high frequency or high-medium frequency, a frequency response curve of the sensing device 700 is also flatter in the range between the third resonance peak and the fourth resonance peak, which is more conducive to achieving the acquisition of effective voice signals in this frequency band.

In addition, since the second resonance system 740 acts on the transduction unit 720, the vibration property of the sensing device 700 is changed compared to that of the sensing device without the second resonance system 740. Exemplarily, the second resonance system 740 acting on the transduction unit 720 may affect the stiffness and/or damping, etc., of the sensing device 700, which has an effect equivalent to causing the Q of the third resonance peak of the sensing device 700 to change (e.g., the Q decreasing) relative to the sensing device without the second resonance system 740. For more information about the frequency response curve of the sensing device 700 and the third resonance peak and the fourth resonance peak, please refer to relevant description in the present disclosure, such as FIGS. 9 and 10 and their related descriptions.

In some embodiments, the second resonance system 740 may reduce the external impact on the transduction unit 720 to protect the transduction unit 720. For example, if liquid 810 and bubbles 820 are introduced into the accommodation cavity of the housing 710, the impact reliability of the sensing device 700 when receiving the external impact load is improved. Due to the viscous effect of the liquid 810 and the large compressibility of the gas, some of the impact energy may be absorbed and consumed to make the impact load on the transduction unit 720 significantly reduced.

In addition, the sensing device 700 is often deformed during processing due to the stress. By injecting the liquid 810 and bubbles 820 into the cavity, the gravity, surface tension, and viscous force of the liquid 810 may be used to correct the deformation of the device, making the sensing device 700 less deformed and more stable output, which is closer to the actual design effect.

It should be noted that the above description of the sensing device 700 is only exemplary and does not limit the present disclosure to the scope of the embodiment. It can be understood that for those skilled in the art, after understanding the principle of the system, they may, without departing from this principle, make any combination of its structure, modules, or form subsystems to connect with other modules.

Figure 9:
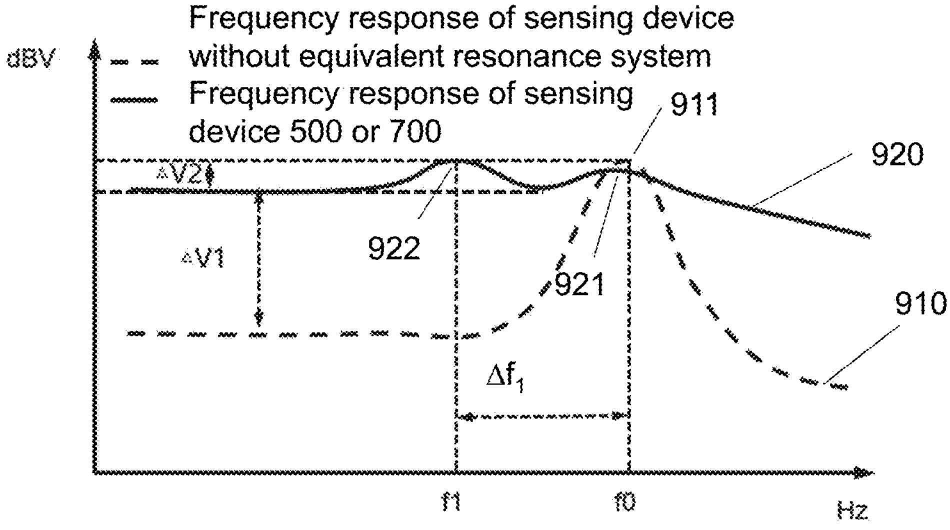
FIG. 9 is an exemplary frequency response curve of a sensing device 500 or 700 according to some embodiments of the present disclosure.

FIG. 9 is an exemplary frequency response curve of a sensing device 500 or 700 according to some embodiments of the present disclosure.

Exemplarily, as shown in FIG. 9, the dashed line 910 represents a frequency response curve of the sensing device without an equivalent resonance system, and the solid line 920 represents the frequency response curve of the sensing device 500 or 700. The horizontal coordinate indicates the frequency, a unit of which is Hz and the vertical coordinate indicates the sensitivity, a unit of which is dB V. A frequency response curve 910 includes a resonance peak 911. A frequency response curve 920 includes a first (or third) resonance peak 921 and a second (or fourth) resonance peak 922. For the sensing device 500, the first resonance peak 921 corresponds to the first resonance frequency, and the second resonance peak 922 is formed by the action of the first resonance system 530 and corresponds to the second resonance frequency. For the sensing device 700, the third resonance peak 921 corresponds to the third resonance frequency, and the fourth resonance peak 922 is formed by the action of the second resonance system 740 and corresponds to the fourth resonance frequency.

It should be noted that the second (or fourth) resonance peak 922 shown in the figure is on the left side of the first (or third) resonance peak 921, i.e., a frequency corresponding to the second (or fourth) resonance peak 922 is less than a frequency corresponding to the first (or third) resonance peak. In some embodiments, the frequency corresponding to the second (or fourth) resonance peak 922 may be made greater than the frequency corresponding to the first (or third) resonance peak 921 by changing mechanical parameters of the transduction unit or the first (or second) resonance system, i.e., the second (or fourth) resonance peak 922 is on the right side of the first (or third) resonance peak 921 transduction unit. For example, for the sensing device 500 filled with liquid inside, the second (or fourth) resonance peak 922 may be on the left or right side of the first (or third) resonance peak 921, and the position of the resonance peak may be related to the properties of the filled liquid (e.g., density, kinematic viscosity, volume, etc.). For example, if the density of the liquid becomes less or the kinematic viscosity becomes greater, its resonance peak is shifted toward the higher frequency.

In some embodiments, a frequency corresponding to the resonance peak 911 is within a range of 100 Hz-12000 Hz. In some embodiments, the frequency corresponding to the resonant peak 911 is within a range of 100 Hz-10000 Hz. In some embodiments, the frequency corresponding to the resonance peak 911 is within a range of 500 Hz-10000 Hz. In some embodiments, the frequency corresponding to the resonance peak 911 is within a range of 1000 Hz-7000 Hz. In some embodiments, the frequency corresponding to the resonance peak 911 is within a range of 1500 Hz-5000 Hz. In some embodiments, the frequency corresponding to the resonance peak 911 is within a range of 2000 Hz-5000 Hz. In some embodiments, the frequency corresponding to the resonance peak 911 is within a range of 2000 Hz-4000 Hz. In some embodiments, the frequency corresponding to the resonance peak 911 is within a range of 3000 Hz-4000 Hz.

In some embodiments, a frequency corresponding to the first (or third) resonance peak 921 is within a range of 100 Hz-12000 Hz. In some embodiments, the frequency corresponding to the first (or third) resonance peak 921 is within a range of 500 Hz-10000 Hz. In some embodiments, the frequency corresponding to the first (or third) resonance peak 921 is within a range of 1000 Hz-10,000 Hz. In some embodiments, the frequency corresponding to the first (or third) resonance peak 921 is within a range of 1500 Hz-7000 Hz. In some embodiments, the frequency corresponding to the first (or third) resonance peak 921 is within a range of 1500 Hz-5000 Hz. In some embodiments, the frequency corresponding to the first (or third) resonance peak 921 is within a range of 2000 Hz-5000 Hz. In some embodiments, the frequency corresponding to the first (or third) resonance peak 921 is within a range of 2000 Hz-4000 Hz. In some embodiments, the frequency corresponding to the first (or third) resonance peak 921 is within a range of 3000 Hz-4000 Hz.

In some embodiments, the resonance frequency corresponding to the first (or third) resonance peak 921 (first resonance frequency or third resonance frequency) is different from the resonance frequency corresponding to the resonance peak 911. For example, for the sensing device 500 in which the accommodation cavity of the housing 110 is filled with liquid, the liquid acts as the first resonance system 530, and since the liquid is not easily compressible, resulting in a greater stiffness of the first resonance system, the first frequency corresponding to the first resonance peak 921 becomes greater than the resonance frequency corresponding to the resonance peak 911, i.e. the first resonance peak 921 is shifted to the right with respect to the resonance peak 911.

In some embodiments, a frequency corresponding to the second (or fourth) resonance peak 922 is within a range of 50 Hz-12000 Hz. In some embodiments, the frequency corresponding to the second (or fourth) resonance peak 922 is within a range of 50 Hz-10000 Hz. In some embodiments, the frequency corresponding to the second (or fourth) resonance peak 922 is within a range of 50 Hz-6000 Hz. In some embodiments, the frequency corresponding to the second (or fourth) resonance peak 922 is within a range of 100 Hz-5000 Hz. In some embodiments, the frequency corresponding to the second (or fourth) resonance peak 922 is within a range of 500 Hz-5000 Hz. In some embodiments, the frequency corresponding to the second (or fourth) resonance peak 922 is within a range of 1000 Hz-5000 Hz. In some embodiments, the frequency corresponding to the second (or fourth) resonance peak 922 is within a range of 1000 Hz-3000 Hz. In some embodiments, the frequency corresponding to the second (or fourth) resonance peak 922 is within a range of 1000 Hz-2000 Hz. In some embodiments, the frequency corresponding to the second (or fourth) resonance peak 922 is within a range of 1500 Hz-2000 Hz.

In some embodiments, the fourth resonance frequency is lower than the second resonance frequency. For the sensing device 500 in which accommodation cavity of the housing 510 is filled with liquid, the liquid acts as the first resonance system 530, in contrast, for the sensing device 700 in which the accommodation cavity of the housing 710 contains liquid and bubbles, the liquid and bubbles act as the second resonance system 740, the overall stiffness of which is lower than the liquid, so the fourth resonance frequency is lower than the second resonance frequency.

In some embodiments, the frequency response curve 920 is made to relative flat between the two resonance peaks 921 and 922 by adjusting the structure and the material of the transduction unit and one or more mechanical parameters (e.g., type of filling fluid, bubble size, etc.) of the first (or second) resonance system, so as to improve the output quality of the sensing device 500 or 700. In some embodiments, a sensitivity difference between a valley between the resonance peaks 921 and 922 and a peak of a higher peak in the resonance peaks 921 and 922 is no more than 30 dBV, and a ratio of the sensitivity difference to the peak value of the higher peak is no more than 0.2. In some embodiments, the sensitivity difference between the valley between the resonance peaks 921 and 922 and the peak value of the higher peak in the resonance peaks 921 and 922 is no more than 20 dBV, and the ratio of the sensitivity difference to the peak value of the higher peak is no more than 0.15. In some embodiments, the sensitivity difference between the valley between the resonance peaks 921 and 922 and the peak value of the higher peak in the resonance peaks 921 and 322 is no more than 15 dBV, and the ratio of the sensitivity difference to the peak value of the higher peak is no more than 0.12. In some embodiments, the sensitivity difference between the valley between the resonance peaks 921 and 922 and the peak value of the higher peak in the resonance peaks 921 and 322 is no more than 10 dBV, the ratio of the sensitivity difference to the peak value of the higher peak is no more than 0.1. In some embodiments, the sensitivity difference between the valley between the resonance peaks 921 and 922 and the peak value of the higher peak in the resonance peaks 921 and 322 is no more than 8 dBV, and the ratio of the sensitivity difference to the peak value of the higher peak is no more than 0.08. In some embodiments, the sensitivity difference between the valley between the resonance peaks 921 and 922 and the peak value of the higher peak in the resonance peaks 921 and 922 is no more than 5 dBV, and the ratio of the sensitivity difference to the peak value of the higher peak is no more than 0.05.

Accordingly, a difference between the resonance frequencies corresponding to the resonance peaks 921 and 922 (the frequency of the resonance peak 921 is expressed as $f_0$, which is close to the resonance peak 911, the frequency of the resonance peak 922 is expressed as $f_1$, and the difference between the resonance frequencies corresponding to the resonance peaks 921 and 922 is expressed as the frequency difference $\Delta f_1$) is within a certain range, which can make the frequency response curve between the resonance peaks 921 and 922 flatter. In some embodiments, the frequency difference $\Delta f_1$ is within a range of 200 Hz-3000 Hz, and a ratio of $\Delta f_1$ to $f_0$ is within a range of 0.2-0.7. In some embodiments, the frequency difference $\Delta f_1$ is within a range of 200 Hz-2000 Hz, and the ratio of $\Delta f_1$ to $f_0$ is within a range of 0.2-0.65. In some embodiments, the frequency difference $\Delta f_1$ is within a range of 500 Hz-2000 Hz, and the ratio of $\Delta f_1$ to $f_0$ is within a range of 0.25-0.65. In some embodiments, the frequency difference $\Delta f_1$ is within a range of 500 Hz-1500 Hz, and the ratio of $\Delta f_1$ to $f_0$ is within a range of 0.25-0.6. In some embodiments, the frequency difference $\Delta f_1$ is within a range of 800 Hz-1500 Hz and the ratio of $\Delta f_1$ to $f_0$ is within a range of 0.3-0.6. In some embodiments, the frequency difference $\Delta f_1$ is within a range of 1000 Hz-1500 Hz, and the ratio of $\Delta f_1$ to $f_0$ is within a range of 0.35-0.6.

As shown in FIG. 9, the frequency response curve 920 has a higher and more stable boost in sensitivity (i.e., difference expressed as ΔV1) within the frequency range of less than or equal to the resonance frequency $f_1$ corresponding to the second (or fourth) resonance peak 922 as compared to the frequency response curve 910. In some embodiments, ΔV1 is within a range of 10 dBV-60 dBV. In some embodiments, ΔV1 is within a range of 10 dBV-50 dBV. In some embodiments, ΔV1 is within a range of 15 dBV-50 dBV. In some embodiments, ΔV1 is within a range of 15 dBV-40 dBV. In some embodiments, ΔV1 is within a range of 20 dBV-40 dBV. In some embodiments, ΔV1 is within a range of 25 dBV-40 dBV. In some embodiments, ΔV1 is within a range of 30 dBV-40 dBV.

The first resonance system 530 or the second resonance system 740 produces a suppression effect on the resonance peaks corresponding to the transduction unit of the sensing device 500 or 700, causing that the Q at the first (or third) resonance peak 921 of the frequency response curve 920 is relatively low, the frequency response curve is flatter in the desired frequency band (e.g., low-medium frequency), and a difference between a peak value of the highest peak of the overall frequency response curve 920 and a valley value of the lowest valley (also referred to as a peak-to-valley value, expressed as ΔV2) is within a certain range. In some embodiments, the peak-to-valley value is no more than 30 dBV, and a ratio of the peak-to-valley value to the peak value of the highest peak is no more than 0.2. In some embodiments, the peak-to-valley value is no more than 20 dBV, and the ratio of the peak-to-valley value to the peak value of the highest peak is no more than 0.15. In some embodiments, the peak-to-valley value is no more than 10 dBV, and the ratio of the peak-to-valley value to the peak value of the highest peak is no more than 0.1. In some embodiments, the peak-to-valley value is no more than 8 dBV, and the ratio of the peak-to-valley value to the peak value of the highest peak is no more than 0.08. In some embodiments, the peak-to-valley value is no more than 5 dBV, and the ratio of the peak-to-valley value to the peak value of the highest peak does not exceed 0.05. In some embodiments, the peak-to-valley value is no more than 5 dBV, and the ratio of the peak-to-valley value to the peak value of the highest peak is no more than 0.05.

For the sensing device 700, in some embodiments, the frequency corresponding to the fourth resonance peak 922 (i.e., the fourth resonance frequency) is a low-medium frequency and the frequency corresponding to the third resonance peak 921 (i.e., the third resonance frequency) is a high-medium frequency. In some embodiments, a difference between a minimum value of the sensitivity of the frequency response curve 920 within a frequency range of less than or equal to the resonance frequency $f_1$ and a peak value of the fourth resonance peak is not greater than 30 dBV, and a ratio of the minimum value to the peak value of the fourth resonance peak is not greater than 0.2. In some embodiments, the difference between the minimum value of the sensitivity of the frequency response curve 920 within the frequency range of less than or equal to the resonance frequency $f_1$ and the peak value of the fourth resonance peak is not greater than 20 dBV, and the ratio of the minimum value to the peak value of the fourth resonance peak is not greater than 0.15. In some embodiments, the difference between the minimum value of the sensitivity of the frequency response curve 920 within the frequency range of less than or equal to the resonance frequency $f_1$ and the peak value of the fourth resonance peak is not greater than 10 dBV, and the ratio of the minimum value to the peak value of the fourth resonance peak is not greater than 0.1.

In some embodiments, the frequency response of the sensing device 500 or 700 may be described by the related parameters of the curve 920, e.g., one or more of the peak value and frequency of the first (or third) resonance peak 921, the peak value and frequency of the second (or fourth) resonance peak 922, the Q, $\Delta f_1$, ΔV1, ΔV2, the ratio of $\Delta f_1$ to $f_0$, the ratio of the peak-to-valley value to the peak value of the highest peak, the first order coefficient, the second order coefficient, the third order coefficient, etc. of the equation determined by fitting the frequency response curve.

In some embodiments, the frequency response of the sensing device 500 or 700 may be related to a property of the filled liquid and/or a parameter of the transduction unit. The property of the liquid may include, for example, a liquid density, a liquid kinematic viscosity, a liquid volume, the presence of bubbles, a bubble volume, a bubble position, a bubble number, etc. The parameter of the transduction unit may include, for example, a mass, size, a stiffness, etc. of the transduction unit (e.g., a cantilever beam). In some embodiments, the frequency response of the sensing unit 500 or 700 may also be related to an internal structure of the housing (e.g., a shape of the accommodation cavity), a size, a stiffness, and other parameters.

In some embodiments, in order to obtain a desired output frequency response (e.g., the frequency response curve 920) of the sensing device 500 or 700, a range of each of the above-listed parameters affecting the frequency response (also referred to as a frequency response influencing factor, including, for example, the property of the filled fluid and/or the parameter of the transduction unit) may be determined by means of computer simulation, a phantom experiment, etc. In some embodiments, it may be determined for the effect of each factor on the frequency response of the sensing device 500 or 700 respectively by controlling for variables based on simulation. For example, under the premise that the same liquid is filled in the accommodation cavity, the performance of sensing devices with different structural features of the accommodation cavity is tested. For example, under the premise that the same liquid is filled in the accommodation cavity, the performance of sensing devices with different housing stiffness features is tested. As another example, the performance of sensing devices with the same housing size under different conditions of being filled with the liquid and filled with liquid and bubble is tested. As another example, under the premise that the bubble does not cover the transduction unit (e.g., piezoelectric transducer), the performance of sensing devices with different bubble size features is tested. As another example, under the premise that the bubble covers the transduction unit (e.g., piezoelectric transducer), the performance of sensing devices with different bubble size features is tested.

In some embodiments, some factors are correlated with the effect of other factors on the frequency response of the sensing device 500 or 700, so the effect of the parameter pair or parameter group on the frequency response of the sensing device 500 or 700 may be determined in the form of a corresponding parameter pair or parameter group. For example, as the height of housing becomes larger, the volume of the accommodation cavity becomes larger, the mass of the housing becomes larger, and the volume of the liquid filled in the accommodation cavity becomes correspondingly larger. Therefore, the housing height, housing mass, and liquid volume (or the ratio of any two parameters, or the product of at least two parameters, etc.) may be used as a parameter group to test the effect of the parameter group on the performance of the sensing device. As another example, liquid viscosity and density may be used as a parameter pair to test the effect of the parameter pair (or a ratio of liquid viscosity to liquid density, a product of liquid viscosity to liquid density, etc.) on the frequency response of the sensing device 500 or 700.

In some embodiments, the effect of a parameter pair or a parameter group corresponding to each factor or multiple factors on the frequency response of the sensing device 500 or 700 may be determined by means of a phantom test.

Exemplarily, for the sensing device 500 filled with liquid of different viscosities, the greater the viscosity of the liquid is, the greater the system damping is and the smaller the Q of the frequency response of the sensing device 500 is. For the sensing device 700 filled with liquid and bubbles, the greater the kinematic viscosity of the filled liquid within a certain range of kinematic viscosity, the greater the increase in sensitivity of the sensing device 700.

In some embodiments, the kinematic viscosity of the liquid may be within a range of 0.1-5000 cst. In some embodiments, the kinematic viscosity of the liquid may be within a range of 0.1-1000 cst. In some embodiments, the kinematic viscosity of the liquid may be within a range of 0.3-1000 cst. In some embodiments, the kinematic viscosity of the liquid may be within a range of 0.5-500 cst. In some embodiments, the kinematic viscosity of the liquid may be within a range of 0.5-200 cst. In some embodiments, the kinematic viscosity of the liquid may be within a range of 50-200 cst.

Exemplarily, for the sensing device 500 filled with liquid, taking a bone conduction microphone or a single-axis accelerometer as an example, the length of the cantilever beam becomes shorter within a certain range, and the overall effective frequency band expands.

In some embodiments, a thickness of the cantilever beam may be within a range of 0.5 μm-3 mm, a width of the cantilever beam may be within a range of 50 μm-500 mm, and a length of the cantilever beam may be within a range of 200 μm-1 cm. In some embodiments, the thickness of the cantilever beam may be within a range of 0.5 μm-1 mm, the width of the cantilever beam may be within a range of 50 μm-100 mm, and the length of the cantilever beam may be within a range of 200 μm-200 mm. In some embodiments, the thickness of the cantilever beam may be within a range of 1 μm-100 μm, the width of the cantilever beam may be within a range of 100 μm-10 mm, and the length of the cantilever beam may be within a range of 400 μm-20 mm. In some embodiments, the thickness of the cantilever beam may be within a range of 2 μm-20 μm, the width of the cantilever beam may be within a range of 200 μm-2 mm, and the length of the cantilever beam may be within a range of 800 μm-4 mm. In some embodiments, the thickness of the cantilever beam may be within a range of 2 μm-5 μm, the width of the cantilever beam may be within a range of 200 μm-500 μm, and the length of the cantilever beam may be within a range of 800 μm-1000 μm.

Exemplarily, for the sensing device 500 filled with liquid, the sensitivity of the sensing device may be enhanced in the middle frequency by increasing the size of the accommodation cavity, so as to reduce a frequency response suppression effect of the liquid on the sensing device in the middle frequency, making the frequency response curve more flat.

Exemplarily, for the sensing device 500 with different heights of the accommodation cavities filled with liquid, the higher the height of the accommodation cavity is within a certain range, the higher the low-medium frequency output sensitivity of the sensing device 500 is.

In some embodiments, a length of the accommodation cavity of the sensing device may be within a range of 1-30 mm, a width of the accommodation cavity of the sensing device may be within a range of 1-30 mm, and a height of the accommodation cavity of the sensing device may be within a range of 0.5-30 mm. In some embodiments, the length of the accommodation cavity of the sensing device may be within a range of 2-30 mm, the width of the accommodation cavity of the sensing device may be within a range of 2-30 mm, and the height of the accommodation cavity of the sensing device may be within a range of 1-30 mm. In some embodiments, the length of the accommodation cavity of the sensing device may be within a range of 5-10 mm, the width of the accommodation cavity of the sensing device may be within a range of 5-10 mm, and the height of the accommodation cavity of the sensing device may be within a range of 1-10 mm. In some embodiments, the length of the accommodation cavity of the sensing device may be within a range of 8-10 mm, the width of the accommodation cavity of the sensing device may be within a range of 5-10 mm, and the height of the accommodation cavity of the sensing device may be within a range of 1-5 mm. In some embodiments, the accommodation cavity of the sensing device has larger sizes. In some embodiments, the length of the accommodation cavity of the sensing device may be within a range of 10-200 mm, the width of the accommodation cavity of the sensing device may be within a range of 10-100 mm, and the height of the accommodation cavity of the sensing device may be within a range of 10-100 mm. In some embodiments, the length of the accommodation cavity of the sensing device may be within a range of 10-100 mm, the width of the accommodation cavity of the sensing device may be within a range of 10-50 mm, and the height of the accommodation cavity of the sensing device may be within a range of 10-50 mm. In some embodiments, the length of the accommodation cavity of the sensing device may be within a range of 10-50 mm, the width of the accommodation cavity of the sensing device may be within a range of 10-30 mm, and the height of the accommodation cavity of the sensing device may be within a range of 10-30 mm.

Exemplarily, the sensing device 700 filled with liquid and bubbles has a higher overall output gain than the sensing device 500 filled with liquid as the gas is easily compressed and less rigid, while the liquid is not easily compressed and may be over-rigid and over-damping. For example, in some embodiments, has the second resonance peak of the sensing device 500 may "disappear" due to the over-damping, thus affecting the sensitivity of the sensing device 500 at low-medium frequency.

Exemplarily, for the sensing device 700 filled with liquid and bubbles, when the bubbles do not cover the transduction unit (e.g., a piezoelectric transducer), sensitivity of the sensing device 700 increases as the volume of the bubble increases.

In some embodiments, a ratio of the volume of the bubble to the volume of the liquid may be within a range of 5%-90%. In some embodiments, the ratio of the volume of the bubble to the volume of the liquid may be within a range of 10%-80%. In some embodiments, the ratio of the volume of the bubble to the volume of the liquid may be within a range of 20-60%. In some embodiments, the ratio of the volume of the bubble to the volume of the liquid may be within a range of 30%-50%.

In some embodiments, the bubble may be located at different positions within the sensing device 700. For example, the bubbles may be located within the liquid. As another example, the bubbles may be located between the liquid and the housing. In some embodiments, the transduction unit 720 may divide the accommodation cavity to form a front cavity and a rear cavity located on opposite sides of the vibration-pickup structure. The rear cavity is an enclosed or semi-enclosed space formed by the base part of the transduction unit and the vibration-pickup structure (e.g., a cantilever beam). For example, taking a bone conduction microphone as an example, the accommodation cavity may be divided into a front cavity and a rear cavity using a plane where the cantilever beam is located as a division plane. For the sensing device 700 filled with liquid and bubbles, when the bubbles are located in the front cavity of the sensing device and are not in contact with the transduction unit (e.g., vibration-pickup structure), the sensitivity of the sensing device increases gradually with the increase of bubbles.

In some embodiments, for the sensing device 700 filled with liquid and bubbles, when a certain size of bubbles is set in the front cavity and the rear cavity, a large gain may be achieved in the low-frequency band, the medium frequency effectively suppresses the Q of the resonance peak of the sensing device 700, but does not suppress the sensitivity of other regions outside the resonance peak region corresponding to the sensing device 700, so that the frequency response of the sensing device 700 is relatively flat in the low-medium frequency band.

In some embodiments, a ratio of a volume of bubble to a volume of liquid in both the front and rear cavities may be within a range of 5%-95%. In some embodiments, the ratio of the volume of the bubble to the volume of the liquid in both the front and rear cavities may be within a range of 10%-80%. In some embodiments, the ratio of the volume of the bubble to the volume of the liquid in both the front and rear cavities may be within a range of 20%-60%. In some embodiments, the ratio of the volume of the bubble to the volume of the liquid in both the front and rear cavities may be within a range of 30%-50%.

It should be noted that the above description of the frequency response curve of the sensing device 500 or 700 is only an exemplary description and does not limit the present disclosure to the scope of the cited embodiment. It can be understood that for those skilled in the art, after understanding the principle of the system, they may make arbitrary adjustments to its structure and composition without departing from this principle. Such and such variations are within the scope of protection of the present disclosure.

Figure 10:
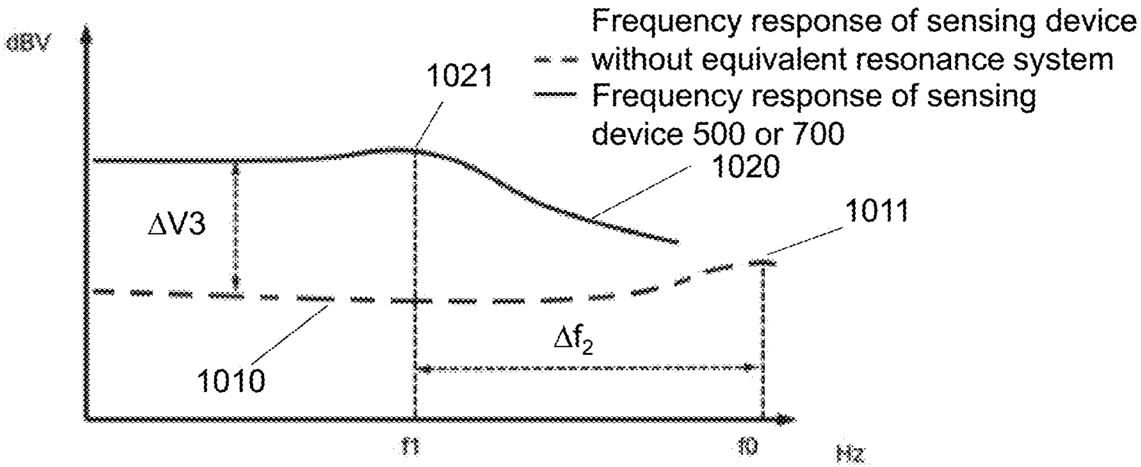
FIG. 10 is an exemplary frequency response curve of a sensing device 500 or 700 according to some embodiments of the present disclosure.

FIG. 10 is an exemplary frequency response curve of a sensing device 500 or 700 according to some embodiments of the present disclosure.

As shown in FIG. 10, the dashed line 1010 represents a frequency response curve of a sensing device without an equivalent resonance system, and the solid line 1020 represents a frequency response curve of the sensing device 500 or 700. The frequency response curve 1010 includes a resonance peak 1011. In some embodiments, the sensing device without the equivalent resonance system corresponds to a higher resonance frequency that is not in the desired frequency band (e.g., 100-5000 Hz, 500-7000 Hz, etc.). In some embodiments, the sensing device without the equivalent resonant system may correspond to a resonance frequency in a higher frequency band. For example, in some embodiments, the sensing device without the equivalent resonance system corresponds to a resonance frequency higher than 7000 Hz. In some embodiments, the sensing device without the equivalent resonance system corresponds to a resonance frequency higher than 10000 Hz. In some embodiments, the sensing device without the equivalent resonance system corresponds to a resonance frequency higher than 12000 Hz. Accordingly, the sensing device without the equivalent resonance system may have a higher stiffness at this time, which also gives the sensing device a higher impact strength and reliability.

The frequency response curve 1020 includes a first (or third) resonance peak (not shown in the figure) and a second (or fourth) resonance peak 1021. In some embodiments, a frequency corresponding to the first (or third) resonance peak is close to or the same as the corresponding resonance frequency in the frequency response curve 1010. In some embodiments, the frequency response curve 1020 is substantially the same as the frequency response curve 920 in FIG. 9, except that the first (or third) resonance peak is shifted to the right. A frequency corresponding to the second (or fourth) resonance peak 1021 is the same as or similar with the frequency range corresponding to the second (or fourth) resonance peak 922 in FIG. 9.

In some embodiments, within the desired frequency range (e.g., less than or equal to 2000 Hz, less than or equal to 3000 Hz, less than or equal to 5000 Hz, etc.), a difference between the maximum and minimum values of sensitivity in the frequency response curve 1020 may be maintained within a certain range to ensure stability of the frequency response of the sensing device 500 or 700. In some embodiments, the difference between the maximum and minimum values of sensitivity is not higher than 40 dBV within the desired frequency range, and a ratio of the difference to the maximum value is no more than 0.3. In some embodiments, the difference between the maximum and minimum values of sensitivity is not higher than 30 dBV within the desired frequency range, and the ratio of the difference to the maximum value is no more than 0.25. In some embodiments, the difference between the maximum and minimum values of sensitivity is not higher than 20 dBV within the desired frequency range, and the ratio of the difference to the maximum value is no more than 0.15. In some embodiments, the difference between the maximum and minimum values of sensitivity is not higher than 10 dBV within the desired frequency range, and the ratio of the difference to the maximum value is no more than 0.1.

In some embodiments, a difference between the resonant frequencies corresponding to the first (or third) resonance peak and the second (or fourth) resonance peak 1021 (the frequency of the first (or third) resonance peak is expressed as $f_0$, which is close to the resonance peak 1011), the frequency of the second (or fourth) resonance peak 1021 is expressed as $f_1$, and the difference between the resonance frequencies corresponding to the two resonance peaks is expressed as a frequency difference $\Delta f_2$) is within a certain range. In some embodiments, the frequency difference $\Delta f_2$ is within a range of 1000 Hz-8000 Hz, and the ratio of the frequency difference $\Delta f_2$ to $f_0$ is within a range of 0.2-0.8. In some embodiments, the frequency difference $\Delta f_2$ is within a range of 1000 Hz-6000 Hz and the ratio of the frequency difference $\Delta f_2$ to $f_0$ is within a range of 0.2-0.65. In some embodiments, the frequency difference $\Delta f_2$ is within a range of 2000 Hz-6000 Hz and the ratio of the frequency difference $\Delta f_2$ to $f_0$ is within a range of 0.3-0.65. In some embodiments, the frequency difference $\Delta f_2$ is within a range of 3000 Hz-5000 Hz and the ratio of the frequency difference $\Delta f_2$ to $f_0$ is within a range of 0.3-0.5. In some embodiments, the frequency difference $\Delta f_2$ is within a range of 3000 Hz-4000 Hz, and the ratio of the frequency difference $\Delta f_2$ to $f_0$ is within a range of 0.3-0.4.

Compared to the frequency response curve 1010, the frequency response curve 1020 has a higher and more stable boost (i.e., difference, expressed as ΔV3) in sensitivity within the frequency range of less than or equal to the resonance frequency $f_1$ corresponding to the second (or fourth) resonance peak 1021. In some embodiments, the boost ΔV3 is within a range of 10 dBV-60 dBV. In some embodiments, the boost ΔV3 is within a range of 10 dBV-50 dBV. In some embodiments, the boost ΔV3 is within a range of 15 dBV-50 dBV. In some embodiments, the boost ΔV3 is within a range of 15 dBV-40 dBV. In some embodiments, the boost ΔV3 is within a range of 20 dBV-40 dBV. In some embodiments, the boost ΔV3 is within a range of 25 dBV-40 dBV. In some embodiments, the boost ΔV3 is within a range of 30 dBV-40 dBV.

For the sensing device 700, in some embodiments, a frequency corresponding to the fourth resonance peak 1021 (i.e., the fourth resonance frequency) is a low-medium frequency and a frequency corresponding to the third resonance peak (i.e., the third resonance frequency) is a high-medium frequency. In some embodiments, a difference between the minimum value of the sensitivity of the frequency response curve 1020 within the frequency range of less than or equal to the resonance frequency $f_1$ and the peak value of the fourth resonance peak is not greater than 30 dBV, and a ratio of the minimum value to the peak value of the fourth resonance peak is not greater than 0.2. In some embodiments, the difference between the minimum value of the sensitivity of the frequency response curve 920 within the frequency range of less than or equal to the resonance frequency $f_1$ and the peak value of the fourth resonance peak is not greater than 20 dBV, and the ratio of the minimum value to the peak value of the fourth resonance peak is not greater than 0.15. In some embodiments, the difference between the minimum value of the sensitivity of the frequency response curve 920 within the frequency range of less than or equal to the resonance frequency $f_1$ and the peak value of the fourth resonance peak is not greater than 10 dBV, and the ratio of the minimum value to the peak value of the fourth resonance peak is not greater than 0.1.

In some embodiments, the frequency response of the sensing device 500 or 700 may be described by relevant parameters of the curve 1020, e.g., one or more descriptions of a peak value and a frequency of a primary resonance peak, a peak value and a frequency of a secondary resonance peak 1021, Q, $\Delta f_2$, ΔV3, a ratio of $\Delta f_2$ to $f_0$, a ratio of a maximum sensitivity to a minimum sensitivity within the desired frequency range, a first order coefficient, a second order coefficient, a third order coefficient, etc. of an equation determined by a fitting frequency response curve. In some embodiments, the frequency response of the sensing device 500 or 700 may be related to the property of the filled liquid and/or the parameter of the transduction unit. In some embodiments, in order to obtain a desired output frequency response (e.g., frequency response curve 1020) of the sensing device 500 or 700, a range of various parameters listed above that affect the frequency response (also known as frequency response influencing factors, including the property of the filled liquid and/or the parameter of the transduction unit) may be determined by computer simulation, a phantom experiment, etc., which is in the same or similar way as described in FIG. 9 and not repeated here.

Figure 11:
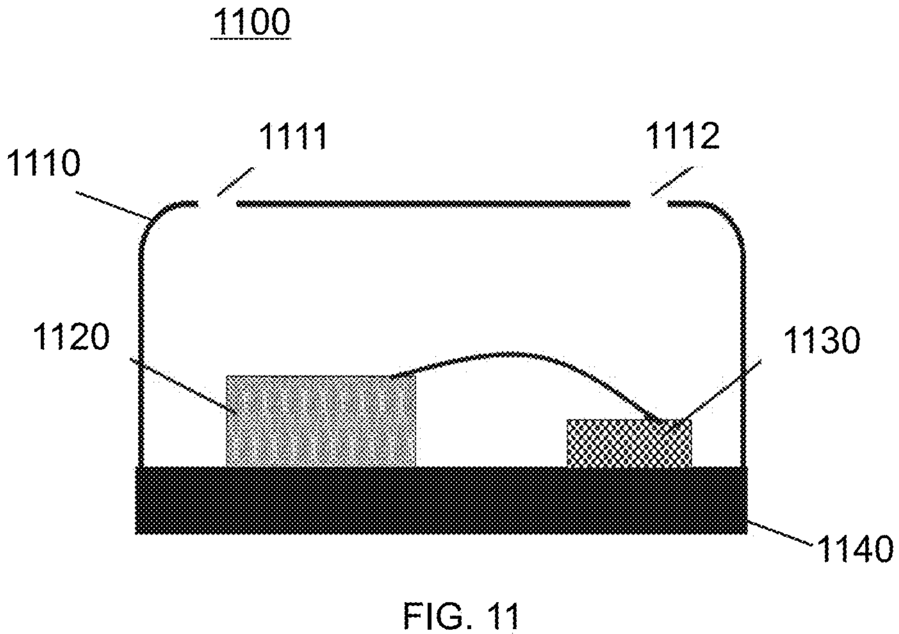
FIG. 11 is a schematic diagram illustrating a sensing device to be filled with liquid according to some embodiments of the present disclosure.

FIG. 11 is a schematic diagram illustrating a sensing device to be filled with liquid according to some embodiments of the present disclosure.

As shown in FIG. 11, the sensing device 1100 includes a housing 1110, a transduction unit 1120, a processor 1130, and a PCB 1140. At least one through-hole may be disposed on an upper surface of the housing 1110 of the sensing device 1100. The through-hole may connect the external environment to an accommodation cavity of the sensing device 1100. Through the at least one through-hole, liquid may be injected into the accommodation cavity of the sensing device 1100. In some embodiments, the through-hole may include a liquid injection hole 1111 and a vent hole 1112. The liquid may be injected into the accommodation cavity of the sensing device 1100 through the liquid injection hole 1111. At the same time, air in the accommodation cavity may be vented through the vent hole 1112 to ensure that the liquid can completely fill the accommodation cavity and the transduction unit 1120 and processor 1130 are submerged in the liquid without bubbles. Optionally, the through-hole may include only the liquid injection hole 1111, through which the liquid is injected into the accommodation cavity of the sensing device 1100 in a vacuum environment, which also allows the liquid to completely fill the accommodation cavity and the transduction unit 1120 and the processor 1130 submerged in the liquid without bubbles.

In some embodiments, when the sensing device 1100 is filled with liquid without bubbles, the sensing device 1100 is similar to the sensing device 500, a damping of the transduction unit 1120 may be increased due to the viscous effect of the liquid, therefore, the Q of the resonance peak of the sensing device 1100 (also called the first resonance peak, i.e., the peak corresponding to the intrinsic resonance frequency of the transduction unit 1120) is reduced. In addition, the liquid is not easy to be compressed and may be over-rigidity and over-damping, an additional resonance peak (i.e., the second resonance peak) formed due to the addition of liquid corresponds to a higher frequency, which may be closer to the first resonance peak of the sensing device 1100, and the first resonance peak may at least partially overlap with the second resonance peak, so the flatness of the frequency response curve is lower.

In some embodiments, the Q of the resonance peak corresponding to the transduction unit 1120 of the sensing device 1100 may be adjusted within a certain range through adjusting the viscosity or density of the liquid filled in the sensing device 1100 (e.g., adjusting the density or viscosity by selecting liquid with a different density and viscosity or adding a specific agent). For example, the higher the kinematic viscosity of the liquid is within a certain range, the lower the Q is. In some embodiments, the density of the liquid may be within a range of 0.6-2 kg/$m^3$. In some embodiments, the density of the liquid may be within a range of 0.6-1.4 kg/$m^3$. In some embodiments, the density of the liquid may be within a range of 0.7-1.1 kg/$m^3$. In some embodiments, the density of the liquid may be within a range of 0.8-1.0 kg/$m^3$. In some embodiments, the density of the liquid may be within a range of 0.85-0.95 kg/$m^3$. In some embodiments, the density of the liquid may be within a range of 0.9-0.95 kg/$m^3$. In some embodiments, the density of the liquid may be within a range of 0.93-0.95 kg/$m^3$.

In some embodiments, the kinematic viscosity of the liquid may be within a range of 0.1-5000 cst. In some embodiments, the kinematic viscosity of the liquid may be within a range of 0.1-1000 cst. In some embodiments, the kinematic viscosity of the liquid may be within a range of 0.1-1000 cst. In some embodiments, the kinematic viscosity of the liquid may be within a range of 0.5-500 cst. In some embodiments, the kinematic viscosity of the liquid may be within a range of 0.3-200 cst. In some embodiments, the kinematic viscosity of the liquid may be within a range of 50-200 cst.

In some embodiments, the liquid filled in the accommodation cavity may include bubbles. The bubbles have a certain volume. For example, a ratio of a volume of the bubble to the volume of the accommodation cavity of the sensing device 1100 may be, for example, any value from 5% to 95%. A number of the bubbles may be 1, 2, 3, 4, or more, without specific limitation here.

The bubbles may be located at different positions in the sensing device 1100. Taking a bone conduction microphone as an example, the cavity may be divided into a front cavity and a rear cavity using a plane where the cantilever beam is located as a division plane. In some embodiments, the bubbles may be in the front cavity. Exemplarily, the bubbles may be in the front cavity away from the cantilever beam, near the cantilever beam, or attached to the cantilever beam. In some embodiments, the bubbles may be within the rear cavity. In other embodiments, the bubbles may exist in both the front and rear cavities.

The bubbles may be formed by air that has not been expelled from the accommodation cavity. For example, when the amount of filled liquid is less than the volume of the accommodation cavity, bubbles are left in the accommodation cavity. In some embodiments, the bubbles may be formed by encapsulating the gas in an air bladder. For example, the air bladder may be a closed bladder formed by membrane-like material (e.g., polyester membrane, nylon membrane, plastic membrane, composite membrane, etc.) or membrane-like material and a component inside the housing or sensing device 1100, the closed bladder being filled with gas. A size and shape of the air bladder may be set according to a volume of the desired bubbles, a volume and shape of the accommodation cavity, and/or a position in which the air bladder is located. In some embodiments, the bubbles may also be formed by providing a hydrophobic material on an inner surface of the accommodation cavity or a surface of a component inside the accommodation cavity. The bubbles are attached to the surface of the hydrophobic material. For example, a superhydrophobic coating may be provided on a portion of the inner surface region of the accommodation cavity or a portion of the internal component surface of the accommodation cavity. The superhydrophobic coating may be made by a specific process from fluorine-containing polymers, (e.g., polytetrafluoroethylene, fluorinated ethylene propylene copolymers, copolymers of ethylene and tetrafluoroethylene, copolymers of tetrafluoroethylene and perfluoroalkoxy vinyl ether, etc.) or polymeric melt polymers (e.g., polyolefins, polycarbonates, polyamides, polyacrylonitrile, polyesters, non-fluorinated acrylates, molten paraffins, etc.). The gas in the bubbles may be air, oxygen, nitrogen, inert gas, etc., or any combination thereof. In some embodiments, due to a certain elastic property of the gas during vibration, the equivalent stiffness of the bubbles (or gas) may be changed by varying the air pressure in the bubbles, thus changing the performance of the second resonance system.

After the sensing device 1100 is filled with liquid and bubbles, the sensing device 1100 may be similar to the sensing device 700. Since the bubbles are easily compressible and less rigid, the combined stiffness of the liquid and bubbles is smaller, and the resonance frequency (also called the fourth resonance frequency) corresponding to the resonance peak (also called the fourth resonance peak) of the second resonance system formed by the liquid and bubbles in the sensing device 1100 is lower, and a difference between the fourth resonance frequency and an inherent resonance frequency (also called the third resonance frequency) of the transduction unit 1120 of the sensing device 1100 is larger, which can effectively control the final output performance of the sensing device 1100 Therefore, the overall sensitivity of the sensing device 1100 is increased by a large amount, the frequency response curve is flatter, and the effective bandwidth (which satisfies the frequency response flatness condition) may cover a large range. In some embodiments, the position of the fourth resonance peak may be adjusted by adjusting the ratio of the volume of bubble to the volume of liquid in the sensing device 1100, so that the third resonance peak and the fourth resonance peak are within a certain frequency band, and thus the frequency response curve of the sensing device 1100 can be optimized and made flatter.

After the liquid or fluid and bubbles are filled into the accommodation cavity (e.g., the front cavity), the through-hole on the upper surface of the housing 1110 is sealed. In some embodiments, the through-hole may be sealed using a sealing member. The sealing member may include, for example, a plug, a screw, a tape, etc. In some embodiments, the through-hole is a circular threaded hole. The sealing member may seal at least one of the through-holes through threaded connection.

Figure 12:
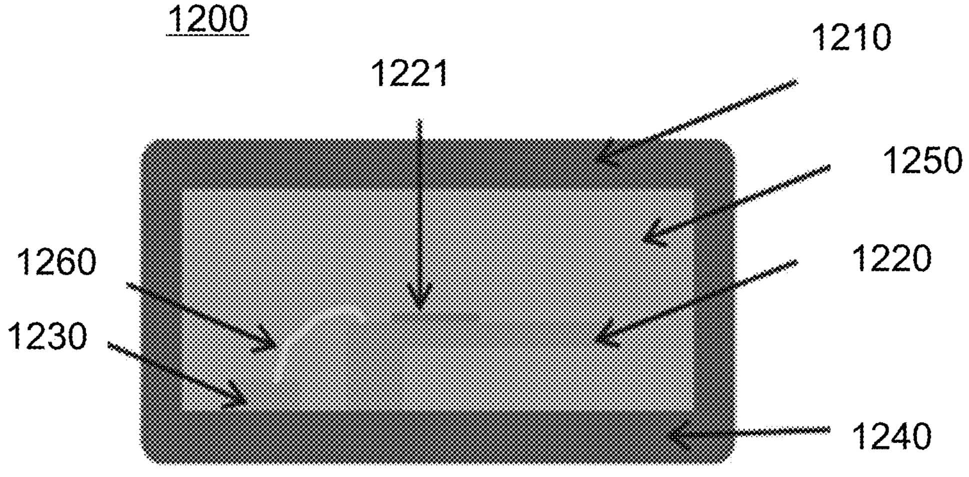
FIG. 12 is a schematic diagram illustrating an exemplary sensing device to be filled with liquid according to some embodiments of the present disclosure.

FIG. 12 is a schematic diagram illustrating an exemplary sensing device to be filled with liquid according to some embodiments of the present disclosure.

As shown in FIG. 12, the sensing device 1200 may be a bone conduction microphone filled with liquid and includes a housing 1210, a transduction unit 1220, a processor 1230, and a PCB substrate 1240. The housing 1210 has an accommodation cavity filled with liquid 1250. The transduction unit 1220 includes a piezoelectric layer 1221. The transduction unit 1220 and the processor 1230 are connected to each other by a lead wire 1260. In some embodiments, the structure and internal components of the sensing device 1200 are identical or similar to those of the sensing device 500 and are not described herein. The housing of the sensing device 1200 is provided with at least one through-hole (not shown in the figure). The liquid 1250 (e.g., silicone oil) may be filled into the cavity inside the sensing device 1200 through the at least one through-hole.

In some embodiments, the housing 1210 may be made of metal, plastic, glass, etc. In some embodiments, the housing 1210 may be made of transparent material. Through the transparent housing, it may be observed whether the internal accommodation cavity of the sensing device 1200 is filled with liquid, whether bubbles are present, etc.

It should be noted that the above description of the sensing device 1200 is only exemplary and does not limit the present disclosure to the scope of the embodiments cited. It can be understood that it is possible for those skilled in the art, with an understanding of the principle of the system, to make any combination of its structure, modules, or form subsystems to connect with other modules without departing from this principle. For example, the first resonance system 530 or the second resonance system 740 in the form of liquid or liquid and bubbles may also be incorporated into an audio output device, such as a speaker, to improve the frequency response of the speaker.

Figure 13:
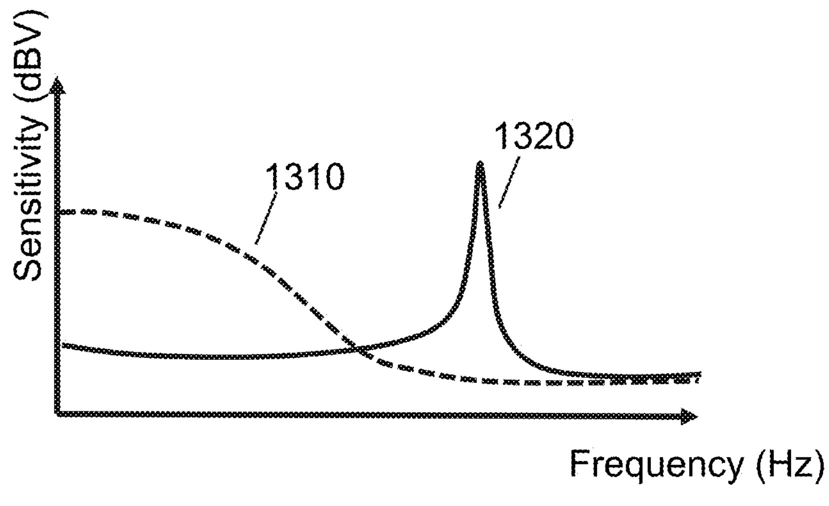
FIG. 13 is a frequency response curve of a sensing device before and after being partial filled the liquid according to some embodiments of the present disclosure.

FIG. 13 is a frequency response curve of a sensing device before and after being partial filled the liquid according to some embodiments of the present disclosure.

As shown in FIG. 13, the frequency response curve 1310 represents the frequency response curve of a sensing device (e.g., sensing device 1200) filled with liquid (e.g., a silicone oil with a kinematic viscosity of 0.65 cst). The frequency response curve 1320 represents the frequency response curve of the sensing device when only a portion of the liquid remains (e.g., an oil membrane) after the liquid in the sensing device is pumped out membrane. In some embodiments, the front cavity of the sensing device is filled with liquid and the rear cavity is partially filled with liquid. A volume of liquid filled in the rear cavity may be 1%-90% of the volume of liquid filled in the front cavity.

It can be seen that when the sensing device is filled with liquid (e.g., the front cavity is filled with liquid and the rear cavity is partially filled with liquid), the sensitivity of the sensing device has an significantly and steadily boost in the low frequency band or the low-medium frequency band or before high-medium frequency band (e.g., a frequency band less than 7000 Hz, 5000 Hz, 3000 Hz, 1000 Hz, or 500 Hz) as compared to only remaining a portion of the liquid (e.g., an oil membrane). In some embodiments, the sensitivity boost may be within a range of 10-50 dBV. In some embodiments, the sensitivity boost may be within a range of 10-30 dBV. In some embodiments, the sensitivity boost may be within a range of 20-30 dBV.

Although the sensitivity of the sensing device is greatly improved after filling with liquid, it is in an over-damping or over stiffness state and over suppressed near the medium frequency, resulting in a rapid decrease of the frequency response curve, and the peak at the inherent resonance frequency of the transduction unit in the sensing device is suppressed. To avoid over-damping resulting in excessive suppression at the medium frequency, a certain volume of bubbles may be retained in the housing. The second resonance system 740 formed by the liquid and bubbles may have less stiffness or damping compared to the first resonance system 530 filled with liquid (e.g., silicone oil), which may mitigate the suppression of the medium frequency.

Figure 14:
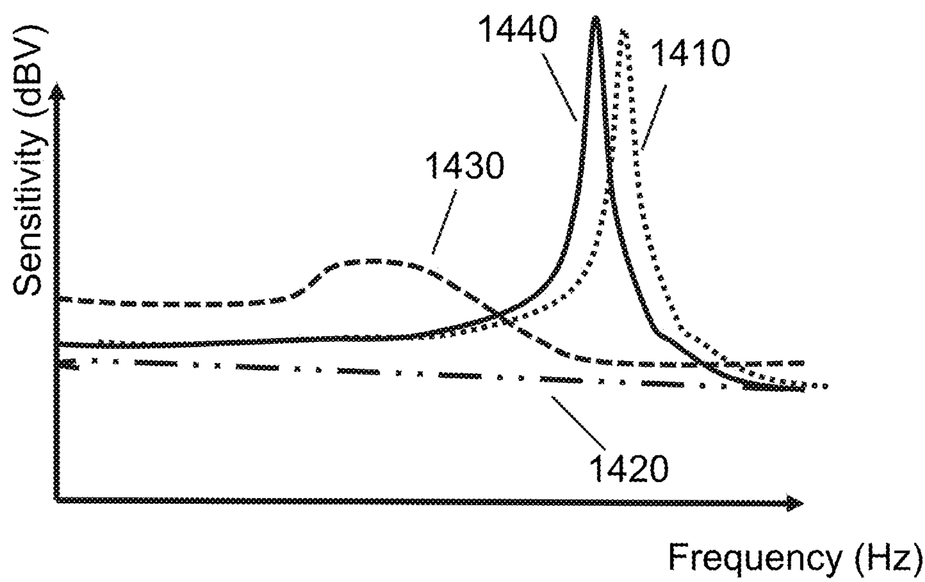
FIG. 14 is a frequency response curve of a sensing device with a small size accommodation cavity before and after being filled with liquid according to some embodiments of the present disclosure.

FIG. 14 is a frequency response curve of a sensing device with a small size accommodation cavity before and after being filled with liquid according to some embodiments of the present disclosure.

The sensing device (e.g., sensing device 1200) is formed by filling the accommodation cavity of the sensing device (e.g., sensing device 1100) with liquid. In this embodiment, the accommodation cavity of the sensing device is a small size accommodation cavity. In some embodiments, a length of the accommodation cavity of the sensing device is within a range of 0.5-10 mm, a width of the accommodation cavity of the sensing device is within a range of 0.5-10 mm, and a height of the accommodation cavity of the sensing device is within a range of 0.3-10 mm. In some embodiments, the length of the accommodation cavity of the sensing device is within a range of 2-10 mm, the width of the accommodation cavity of the sensing device is within a range of 2-10 mm, and the height of the accommodation cavity of the sensing device is within a range of 0.5-10 mm. In some embodiments, the length of the accommodation cavity of the sensing device is within a range of 2-10 mm, the width of the accommodation cavity of the sensing device is within a range of 2-10 mm, and the height of the accommodation cavity of the sensing device is within a range of 0.5-5 mm. In some embodiments, the length of the accommodation cavity of the sensing device is within a range of 3-10 mm, the width of the accommodation cavity of the sensing device is within a range of 2-8 mm, and the height of the accommodation cavity of the sensing device is within a range of 0.8-5 mm.

Exemplarily, in this embodiment, the accommodation cavity of the sensing device has a small size: 3.76 mm×2.95 mm×(0.8-0.85) mm. As shown in FIG. 14, the curve 1410 shows the frequency response curve of the sensing device with the accommodation cavity unfilled with liquid. The curve 1420 shows the frequency response curve of the sensing device with the accommodation cavity filled with liquid (e.g., silicone oil with a kinematic viscosity of 0.65 cst). The curve 1430 shows the frequency response curve of the sensing device with only the rear cavity partially filled with liquid. The curve 1440 shows the frequency response curve of the sensing device with only the oil membrane remaining on the surface of the transduction unit (e.g., cantilever beam).

Combining the curves 1410-1440, it can be seen that for small-sized accommodation cavities, when completely filled with liquid (corresponding to the curve 1420), the sensitivity of the sensing device in not increased. When the small-size accommodation cavity is filled with liquid, an additional resonance frequency of the liquid is high and cannot form a resonance before the inherent resonance frequency of the transduction unit (first or third resonance frequency), while the introduction of liquid also leads to an increase in additional stiffness and damping, which suppresses the vibration of the transduction unit and makes the output of the sensing device decrease. When only a portion of the liquid remains in the rear cavity (corresponding to the curve 1430), it may be considered as the introduction of large bubbles in the accommodation cavity of the sensing device. Since the bubbles are easily compressed and have low stiffness, the combined stiffness of the liquid and the bubbles is small. The resonance frequency (also called the fourth resonance frequency) corresponding to the resonance peak (also called the fourth resonance peak) of the second resonance system composed of liquid and bubbles in the sensing device is lower, and the difference between the fourth resonance frequency and the inherent resonance frequency (also called the third resonance frequency) of the transduction unit of the sensing device is larger, so the sensitivity of the sensing device is enhanced in a wider range of frequency band.

Figure 15:
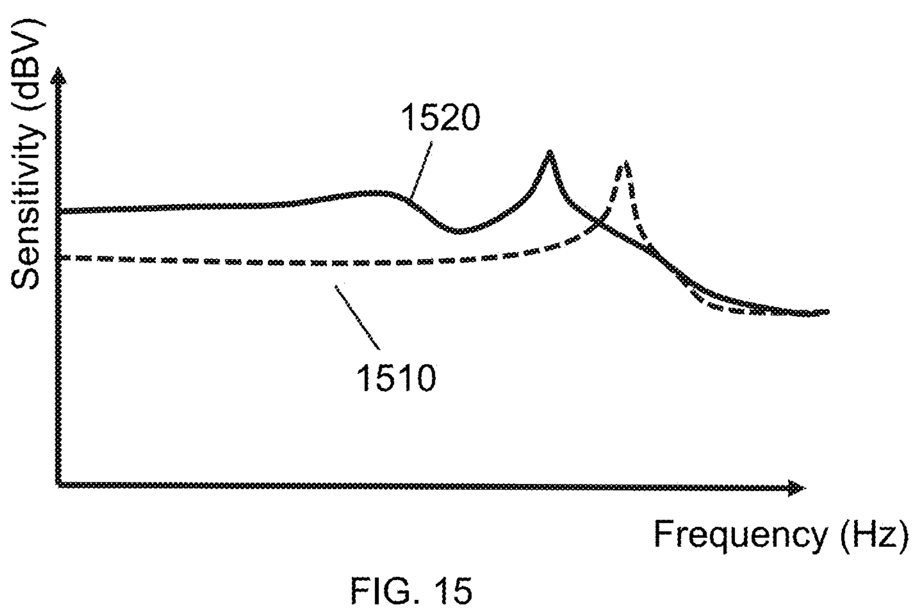
FIG. 15 is a frequency response curve illustrating a sensing device with a large size accommodation cavity not filled with liquid and partially filled with liquid or with an oil membrane in the accommodation cavity according to some embodiments of the present disclosure.

FIG. 15 is a frequency response curve illustrating a sensing device with a large size accommodation cavity not filled with liquid and partially filled with liquid or with an oil membrane in the accommodation cavity according to some embodiments of the present disclosure.

The sensing device (e.g., the sensing device 1200) is formed by filling the accommodation cavity of the sensing device (e.g., the sensing device 1100) with liquid. In this embodiment, the accommodation cavity of the sensing device is a large size accommodation cavity. In some embodiments, the length of the accommodation cavity of the sensing device is within a range of 1-30 mm, the width of the accommodation cavity of the sensing device is within a range of 1-30 mm, and the height of the accommodation cavity of the sensing device is within a range of 0.5-30 mm. In some embodiments, the length of the accommodation cavity of the sensing device is within a range of 2-30 mm, the width of the accommodation cavity of the sensing device is within a range of 2-30 mm, and the height of the accommodation cavity of the sensing device is within a range of 1-30 mm. In some embodiments, the length of the accommodation cavity of the sensing device is within a range of 5-10 mm, the width of the accommodation cavity of the sensing device is within a range of 5-10 mm, and the height of the accommodation cavity of the sensing device is within a range of 1-10 mm. In some embodiments, the length of the accommodation cavity of the sensing device is within a range of 8-10 mm, the width of the accommodation cavity of the sensing device is within a range of 5-10 mm, and the height of the accommodation cavity of the sensing device is within a range of 1-5 mm Optionally, the accommodation cavity of the sensing device has a larger size. In some embodiments, the length of the accommodation cavity of the sensing device is within a range of 10-200 mm, the width of the accommodation cavity of the sensing device is within a range of 10-100 mm, and the height of the accommodation cavity of the sensing device is within a range of 10-100 mm. In some embodiments, the length of the accommodation cavity of the sensing device is within a range of 10-100 mm, the width of the accommodation cavity of the sensing device is within a range of 10-50 mm, and the height of the accommodation cavity of the sensing device is within a range of 10-50 mm. Exemplarily, in this embodiment, the accommodation cavity of the sensing device has a larger size: 10 mm×7 mm×(1~4) mm.

As mentioned earlier, the sensing device with the small-size accommodation cavity filled with silicone oil may be in an over-damping or over-stiffened state, the medium frequency is excessive suppressed and the frequency response curve drops rapidly, and the resonance peak at the resonance frequency corresponding to the sensing device not filled with liquid is completely suppressed. By increasing the size of the accommodation cavity, the output of the sensing device at the medium frequency may be enhanced, and the frequency response suppression effect of the liquid on the sensing device at the medium frequency may be reduced, resulting in a flatter frequency response curve of the sensing device.

As shown in FIG. 15, curves 1510 and 1520 represent the frequency response curves of the sensing device with large size accommodation cavities not filled with liquid and partially filled with liquid (e.g., silicone oil with a kinematic viscosity of 0.65 cst) or in which the oil membrane exists, respectively.

It can be seen that when the accommodation cavity is partially filled with liquid or when an oil membrane exists in the accommodation cavity (corresponding to curve 1520), the frequency response sensitivity of the sensing device has a boost compared to the accommodation cavity not filled with liquid (corresponding to curve 1510). In some embodiments, the boost is within a range of 10-40 dBV. In some embodiments, the boost is within a range of 10-30 dBV. In some embodiments, the boost is within a range of 10-20 dBV. In some embodiments, the boost is about 15 dBV.

Figure 16:
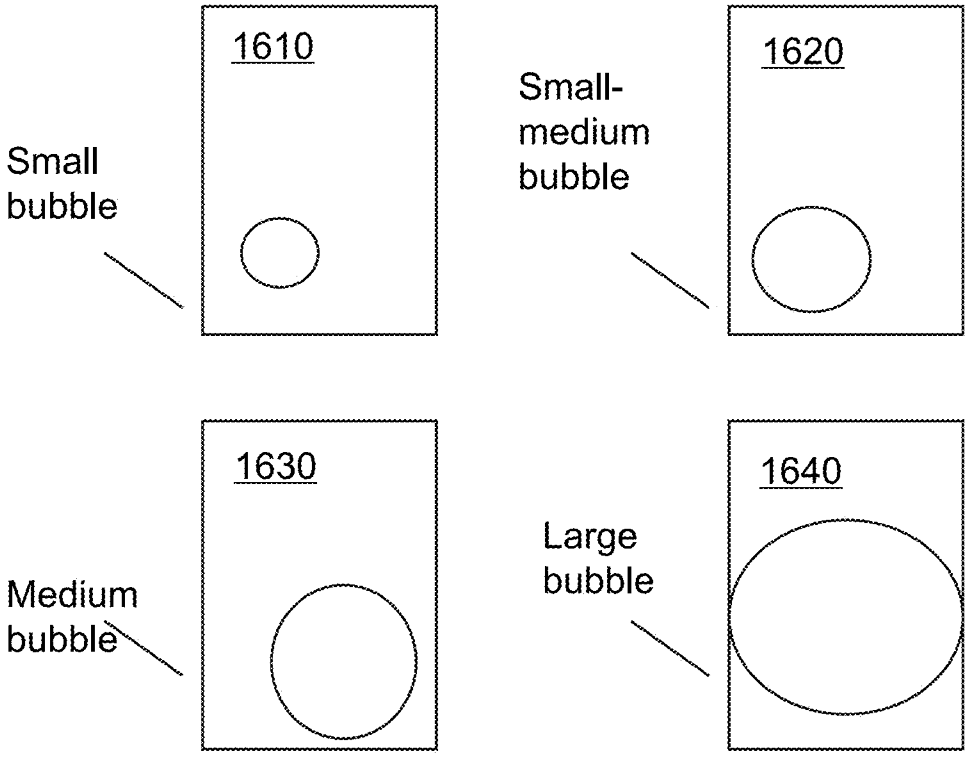
FIG. 16 is a schematic diagram illustrating a sensing device filled with liquid and bubbles according to some embodiments of the present disclosure.

FIG. 16 is a schematic diagram illustrating a sensing device filled with liquid and air bubbles according to some embodiments of the present disclosure.

Since there is gas (e.g., air) inside the bubbles, their stiffness, mass, and damping differ significantly from those of the liquid, the second resonance system 740 (i.e., an additional spring-mass-damping system) of the sensing device (e.g., sensing device 1200) may be adjusted by controlling the size and position of the introduced bubbles. Thus, the final output performance of the sensing device can be effectively controlled so that the frequency response curve is flat (e.g., peak-to-valley fluctuation less than 5 dBV, 10 dBV, 15 dBV, etc.), the effective bandwidth (satisfying the flat frequency response condition) covers a certain range (e.g., 20 Hz-8K Hz), and the overall sensitivity is improved to a certain extent (e.g., 10-50 dBV).

In this embodiment, the accommodation cavity of the sensing device is a large size accommodation cavity. In some embodiments, the size of the accommodation cavity may be 10 mm×7 mm×(1~4) mm. Exemplarily, the size of the accommodation cavity of the sensing device is 10 mm×7 mm×1 mm.

In some embodiments, size of the bubbles may be different, and the position of the bubbles within the accommodation cavity of the sensing device may also be different. As shown in FIG. 16, the bubbles may be small bubble (e.g., a ratio of a volume of bubble to a volume of the accommodation cavity equal to or less than 10%), medium or large bubbles (e.g., a ratio of a volume of bubble to a volume of the accommodation cavity within a range of 10%-90%), etc. The position of the bubbles may be in the front cavity (away from the cantilever beam, close to or attached to the cantilever beam, etc.), the rear cavity, or both the front and rear cavities of the accommodation cavity of the sensing device. For more information about the different positions of the bubbles, please refer to the descriptions elsewhere in the present disclosure, such as FIGS. 18A-18D and their related descriptions.

By way of example only, as shown in FIG. 16, the sensing device 1610 has an accommodation cavity filled with liquid and has small bubbles in a corner of the accommodation cavity, the volume of the bubbles is about 2-10% of the volume of the liquid, and there is no bubbles near the transduction unit (e.g., cantilever beam). The sensing device 1620 has an accommodation cavity filled with liquid, the volume of the bubbles is about 10%-20% of the volume of the liquid, and the bubbles do not cover the region of the transduction unit, and the transduction unit is completely infiltrated by silicone oil at this time. The sensing device 1630 has an accommodation cavity filled with liquid, the volume of the bubbles is about 20%-50% of the volume of liquid, and the bubbles do not cover the region of the transduction unit, and the transduction unit is completely infiltrated by silicone oil at this time. The sensing device 1640 has an accommodation cavity filled with liquid, the volume of the bubbles is about 50%-90% of the volume of the liquid, and the bubbles cover the region of the transduction unit, and the transduction unit is not completely infiltrated by silicone oil at this time.

Figure 17:
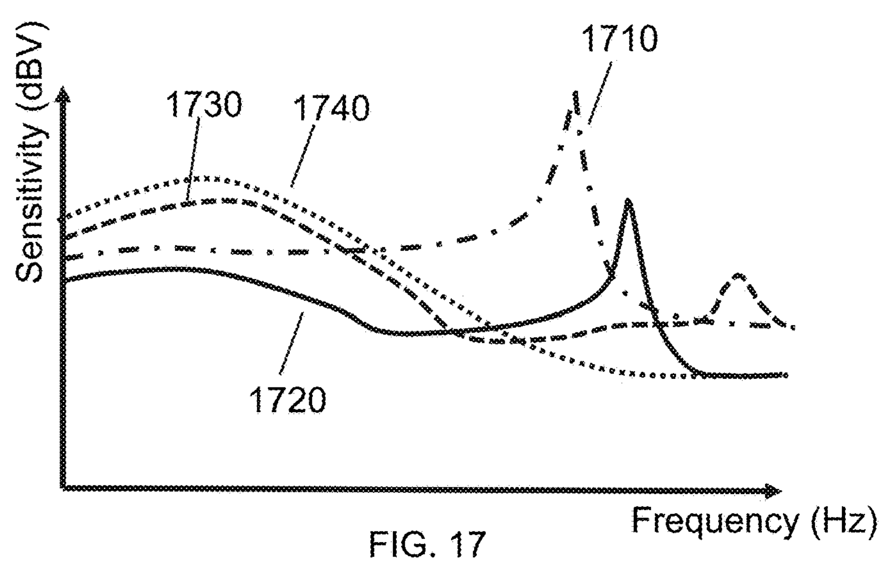
FIG. 17 is a frequency response curve illustrating a sensing device with different size bubbles in the liquid filled in an accommodation cavity according to some embodiments of the present disclosure.

FIG. 17 is a frequency response curve illustrating a sensing device with different size bubbles in the liquid filled in an accommodation cavity according to some embodiments of the present disclosure.

In this embodiment, the accommodation cavity of the sensing device (e.g., the sensing device 1200) is a large size accommodation cavity. In some embodiments, the size of the accommodation cavity of the sensing device is 10 mm×7 mm×(1~4) mm. Exemplarily, the size of the accommodation cavity of the sensing device is 10 mm×7 mm×1 mm.

As shown in FIG. 17, curve 1710 represents the frequency response curve of a sensing device not filled with silicone oil (e.g., the sensing device 1100). Curve 1720 represents the frequency response curve of a sensing device in which the filled liquid contains small bubbles as shown in FIG. 16. Curve 1730 represents the frequency response curve of a sensing device in which the filled liquid contains the small-medium bubbles shown in FIG. 16. Curve 1740 represents the frequency response curve of a sensing device in which the filled liquid contains the medium bubble shown in FIG. 16.

Combining the curves 1710-1740, it can be seen that when the bubbles do not cover the transduction unit (e.g., piezoelectric transducer), the sensitivity of the sensing device increases as the bubble volume increases. For example, compared to the sensing device containing small bubble (corresponding to curve 1720), the sensing device containing small-medium bubbles (corresponding to curve 1730) has a sensitivity boost of about 5-30 dBV in the low frequency band before or the low-medium frequency or before the high-medium frequency (e.g., the frequency band less than 7000 Hz, 5000 Hz, 3000 Hz, 1000 Hz, or 500 Hz). In some embodiments, a low frequency roll-off exists in the lower frequency band (e.g., the frequency band less than 5000 Hz, 3000 Hz, 500 Hz or 200 Hz). Compared to the sensing device containing small-medium bubbles (corresponding to curve 1730), the sensing device containing medium bubble (corresponding to curve 1740) has a sensitivity boost of about 5-30 dBV in the low frequency band or the low-medium frequency band or before the high-medium frequency band (e.g., in the frequency band less than 7000 Hz, 5000 Hz, 3000 Hz, 1000 Hz, or 500 Hz).

FIG. 18A, FIG. 18B, FIG. 18C, and FIG. 18D are schematic diagrams illustrating sensing devices with bubbles in the filled liquid at different positions according to some embodiments of the present disclosure.

Figure 18A:
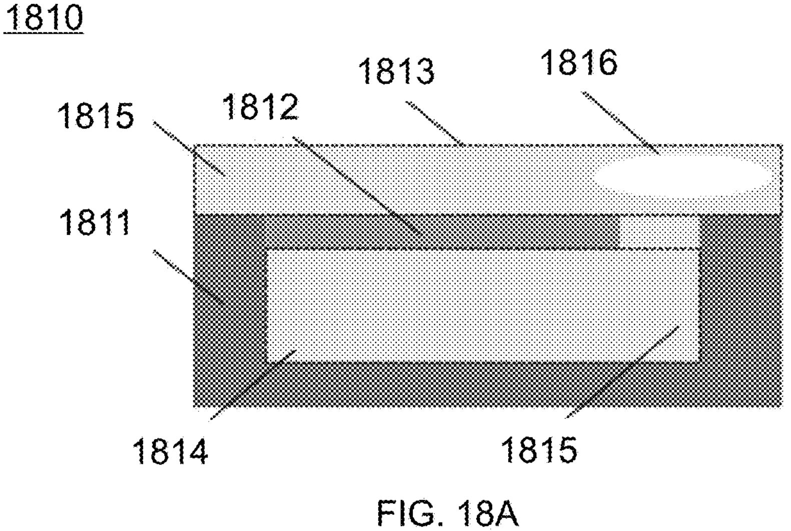
FIG. 18A, FIG. 18B, FIG. 18C, and FIG. 18D are schematic diagrams illustrating sensing devices with bubbles in the filled liquid at different positions according to some embodiments of the present disclosure.

As shown in FIG. 18A, taking the sensing device being a bone conduction microphone 1810 as an example, a transduction unit 1812 may include a cantilever beam. An accommodation cavity of the bone conduction microphone 1810 may be divided into a front cavity 1813 and a rear cavity 1814 with a plane in which the transduction unit 1812 is located as a division plane. In some embodiments, a space formed by a base part 1811 and the plane where the transduction unit 1812 is located may form the rear cavity 1814. In some embodiments, a space formed by the base part 1811 and the plane in which the transduction unit 1812 is located and a portion of the housing of the sensing device 1810 may form the rear cavity 1814. The front cavity 1813 may be a space in the accommodation cavity of the bone conduction microphone 1810 other than the rear cavity 1814.

The front cavity 1813 and the rear cavity 1814 in FIG. 18A are filled with liquid 1815. Bubbles 1816 are located in the front cavity 1813 and away from the transduction unit 1812. The bubbles 1816 may be located in a middle or corner of the front cavity 1813. The bubbles 1816 may be small bubbles (e.g., a ratio of the volume of the bubbles to the volume of the front cavity is equal to or less than 10%), medium or large bubbles (e.g., the ratio of the volume of the bubbles to the volume of the front cavity is within a range of 10%-90%), etc.

Figure 18B:
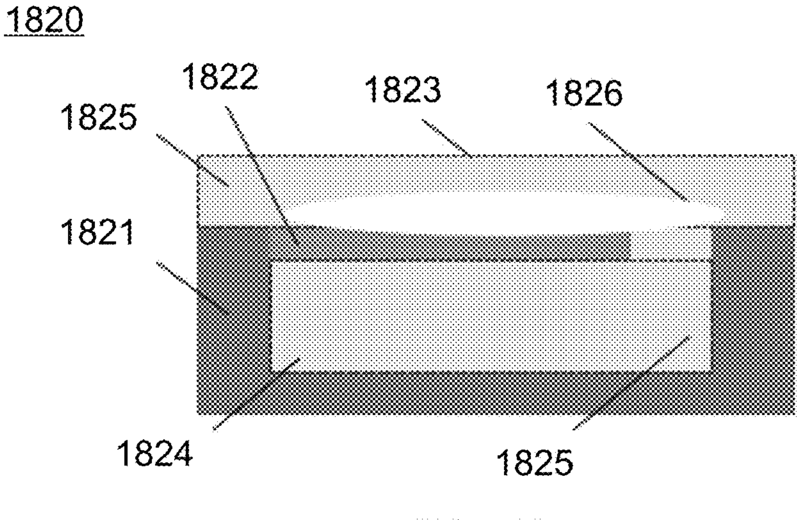

The structure of a bone conduction microphone 1820 in FIG. 18B is similar to that of FIG. 18A. A base part 1821 and a transduction unit 1822 form a rear cavity 1824. A space in the accommodation cavity of the bone conduction microphone 1820 other than the rear cavity 1824 is a front cavity 1823. Both the front cavity 1823 and the rear cavity 1824 are filled with liquid 1825. Bubbles 1826 are located in the front cavity 1823 and attached to or close to the transduction unit 1822. The bubbles 1826 may be small bubbles (e.g., a ratio of the volume of the bubbles to the volume of the front cavity is equal to or less than 10%), medium or large bubbles (e.g., a ratio of the volume of the bubbles to the volume of the front cavity is within a range of 10%-90%), etc.

Figure 18C:
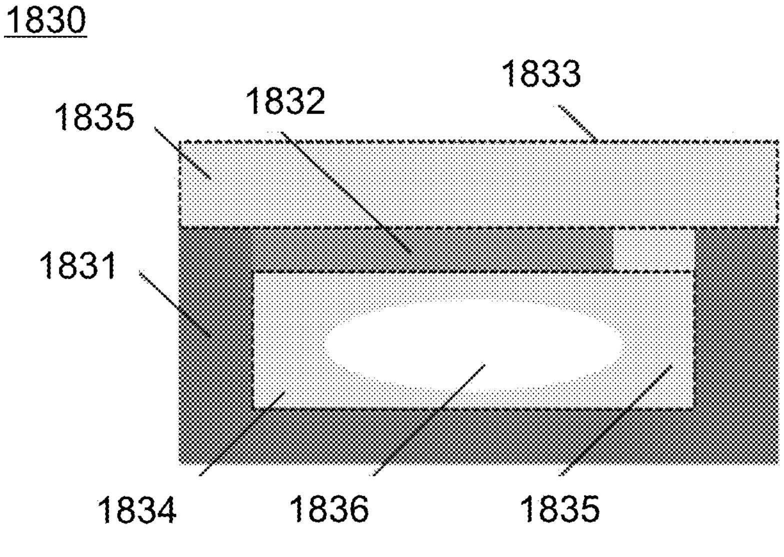

The structure of a bone conduction microphone 1830 in FIG. 18C is similar to that of FIG. 18A or FIG. 18B. A base part 1831 and a transduction unit 1832 form a rear cavity 1834. A space in an accommodation cavity of the bone conduction microphone 1830 other than the rear cavity 1834 is a front cavity 1833. Both the front cavity 1833 and the rear cavity 1834 are filled with liquid 1835. Bubbles 1836 are located in the rear cavity 1834. The bubbles 1836 may be located in a middle or corner of the rear cavity 1834. The bubbles 1836 may be small bubbles (e.g., a ratio of the volume of the bubbles to the volume of the rear cavity is equal to or less than 10%), medium or large bubbles (e.g., a ratio of the volume of the bubbles to the volume of the rear cavity is within a range of 10%-90%), etc.

Figure 18D:
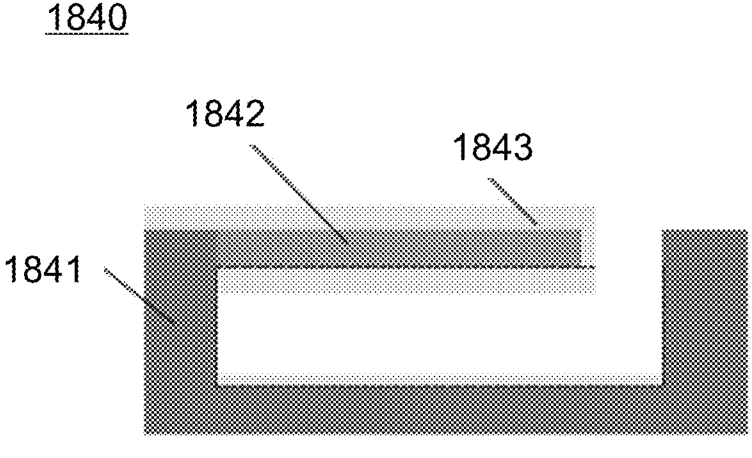

The structure of a bone conduction microphone 1840 in FIG. 18D is similar to that of FIG. 18A, FIG. 18B, or FIG. 18C. A base part 1841 and a transduction unit 1842 form a rear cavity. The liquid 1843 (e.g., an oil membrane) is only attached to the transduction unit 1842 in an accommodation cavity of the bone conduction microphone 1840, which is regarded as that the accommodation cavity of the bone conduction microphone 1840 has large bubbles (e.g., ratio of the volume of the bubbles to the volume of the accommodation cavity is more than 90%) and little liquid is filled in the accommodation cavity.

It should be noted that the above description of the sensing device is only exemplary and does not limit the present disclosure to the scope of the cited embodiment. It can be understood that for those skilled in the art, after understanding the principle of the system, they may make arbitrary adjustments to its structure and composition without departing from this principle. Such and such variations are within the scope of protection of the present disclosure. For example, the transduction unit in FIGS. 18A-18D may also include a diaphragm (such as a piezoelectric membrane 32211A shown in FIG. 32A). A plane in which the diaphragm is located may divide the accommodation cavity into a front cavity and a rear cavity. For example, the transduction unit in FIGS. 18A-18D may also include both a cantilever beam and a diaphragm (e.g., a piezoelectric beam 35211 and a second membrane structure 35213 shown in FIG. 35B).

Figure 19:
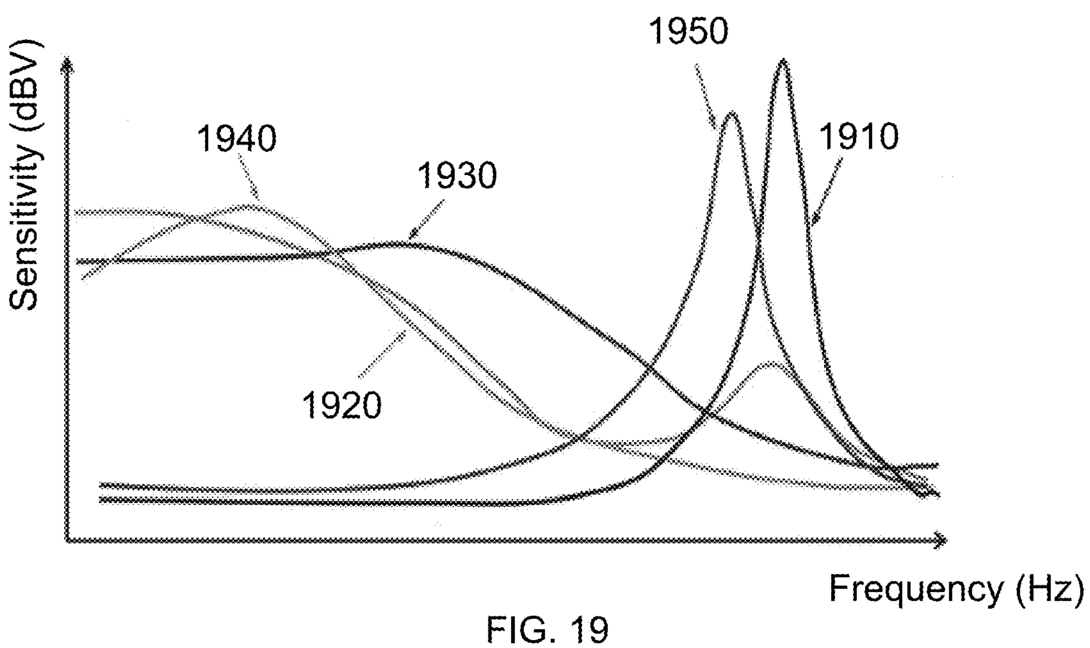
FIG. 19 is a frequency response curve illustrating a sensing device with bubbles in the filled liquid at different positions in an accommodation cavity according to some embodiments of the present disclosure.

FIG. 19 is a frequency response curve illustrating a sensing device with bubbles in the filled liquid at different positions in an accommodation cavity according to some embodiments of the present disclosure.

The liquid filled in the accommodation cavity of the sensing device contains bubbles of different sizes, which corresponds to different spring ($K_{m3}$, $K_{m4}$)-mass ($M_{m4}$)-damping ($R_{m3}$, $R_{m4}$) systems, and the output performance of the sensing device are different.

As shown in FIG. 19, curve 1910 represents the frequency response curve of a sensing device with an accommodation cavity not filled with liquid (e.g., the sensing device 1100). Curve 1920 represents the frequency response curve of a sensing device with a front cavity filled with liquid (e.g., silicone oil) and large bubbles and the bubbles away from a transduction unit and a rear cavity filled with liquid. Curve 1930 represents the frequency response curve of a sensing device with a front cavity filled with air and a rear cavity filled with liquid. Curve 1940 represents the frequency response curve of a sensing device with both front and rear cavities filled with liquid and the rear cavity also filled with bubbles. Curve 1950 represents the frequency response curve of a sensing device with only a liquid membrane attached to a transduction unit.

Combining curves 1910-1950, it can be seen that when the bubbles are introduced, regardless of whether the bubbles are located in the front or rear cavity and whether the bubbles are in contact with the transduction unit, the sensitivity (e.g., 10-60 dBV, 10-40 dBV, 15-40 dBV, etc.) of the sensing device may have a certain boost in the low frequency band or low-medium frequency band or before the high-medium frequency band (e.g., a frequency band of less than 7000 Hz, 5000 Hz, 3000 Hz, 1000 Hz, or 500 Hz). The magnitude of the boost is also related to the size and/or position of the bubbles. For example, combining curves 1920 and 1930, it shows that when the bubbles are located in the front cavity and not in contact with the transduction unit, the sensitivity increases gradually as the bubbles increase.

In addition, in addition to the gain of the sensitivity of the sensing device at low, medium, and medium-high frequencies, different combinations of bubbles and liquid have different effects on the higher frequency band. For example, when the rear cavity has bubbles, a smaller suppression effect on the higher frequency band may be obtained.

Figure 20:
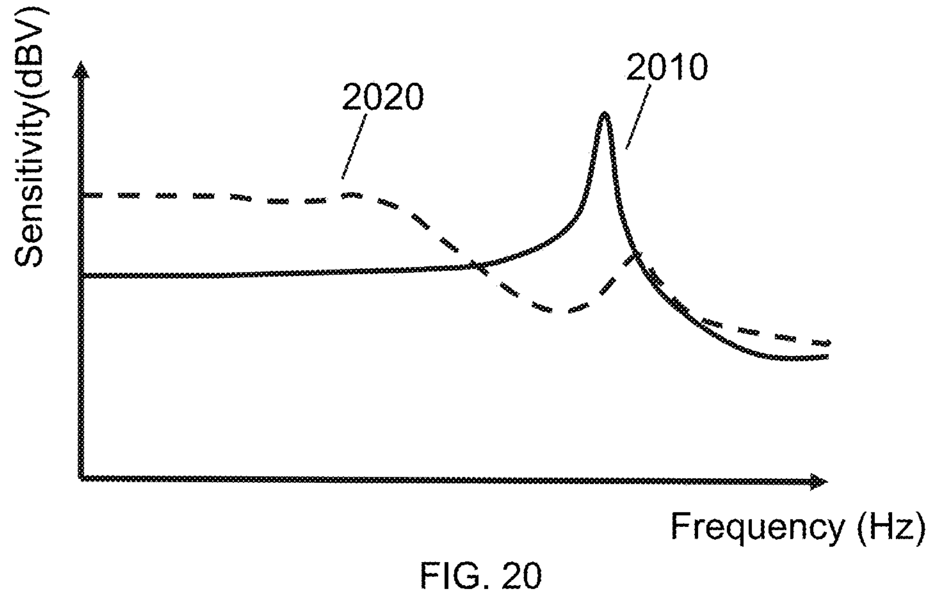
FIG. 20 is a frequency response curve of a sensing device before and after being filled with liquid according to some embodiments of the present disclosure.

FIG. 20 is a frequency response curve of a sensing device before and after being filled with liquid according to some embodiments of the present disclosure.

As shown in FIG. 20, curves 2010 and 2020 are the frequency response curves of a sensing device not filled with liquid (e.g., the sensing device 1100) and a sensing device with the rear cavity filled with liquid with bubbles, respectively.

Combining curves 2010 and 2020, it shows that there is a resonance peak for the sensing device filled with liquid in the frequency band of 2000-20,000 Hz. Comparatively, the sensing device that is filled with liquid and introduces bubbles in the rear cavity (e.g., small bubbles (e.g., a ratio of the volume of the bubbles to the volume of the rear cavity is equal to or less than 10%), medium or large bubbles (e.g., a ratio of the volume of the bubbles to the volume of the rear cavity is within a range of 10%-90%), etc.) has a gain of about 10-40 dBV in the low frequency band or low-medium frequency band or before the high-medium frequency band (e.g., a frequency band less than 7000 Hz, 5000 Hz, 3000 Hz, 1000 Hz, or 500 Hz), etc.). In some embodiments, the gain in the low frequency band is within a range of 20-25 dBV. The spring ($K_{m3,\ 4}$)-mass ($M_{m4}$)-damping ($R_{m3,\ 4}$) system formed by a combination of the bubbles and liquid resonates in the low frequency band, allowing the sensing device to have a large gain boost in the low frequency band. In addition, due to the additional damping and stiffness of the spring ($K_{m3,4}$)-mass ($M_{m4}$)-damping ($R_{m3,\ 4}$) system that has a suppressive effect on the vibration of the sensing device, the Q of the resonance peak (e.g., the first or third resonance peak) at the corresponding resonance frequency (the medium frequency) of the sensing device is significantly reduced. In addition, the properties of the additional spring ($K_{m3,\ 4}$)-mass ($M_{m4}$)-damping ($R_{m3,\ 4}$) of the device may be adjusted by adjusting the combination of bubbles and liquid, so that the resonance frequency (e.g., the first or third resonance frequency) of the sensing device is shifted forward or backward.

In some embodiments, a certain size of bubbles may be provided in both the front and rear cavities to achieve a large gain in the low frequency band, and the medium frequency may suppress the Q of the resonance peak (first or third resonance peak) of the transduction unit in the sensing device, while not suppressing the sensitivity of other regions outside the resonance peak region.

Figure 21:
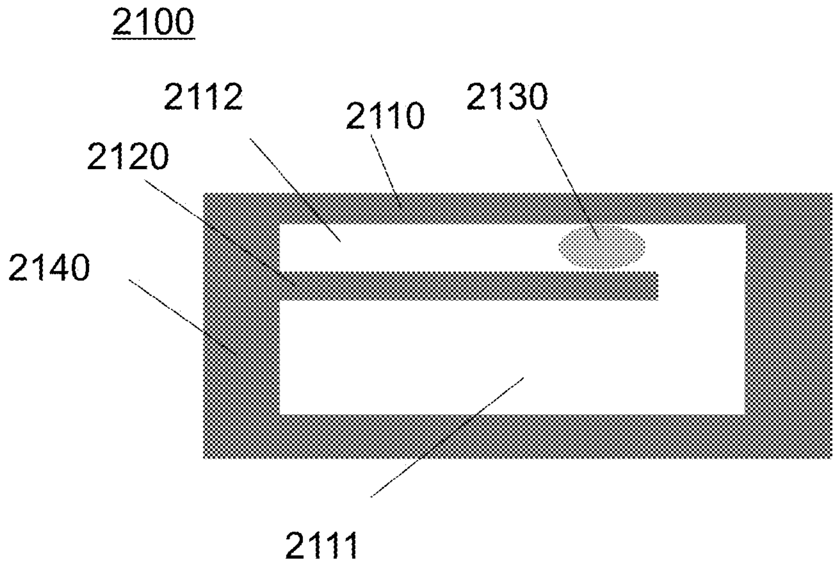
FIG. 21 is a schematic diagram illustrating an exemplary sensing device containing a liquid droplet according to some embodiments of the present disclosure.

FIG. 21 is a schematic diagram illustrating an exemplary sensing device containing a liquid droplet according to some embodiments of the present disclosure.

As shown in FIG. 21, taking the bone conduction microphone as an example, the structure of the sensing device 2100 is similar to the structures of the bone conduction microphones 1810-1830 in FIGS. 18A-18C. The sensing device 2100 includes a housing 2110, a transduction unit 2120, a liquid droplet 2130, and a base part 2140. The housing 2110 has an accommodation cavity provided with the liquid droplet 2130. The base part 2140 and the transduction unit 2120 form a rear cavity 2111. A space in accommodation cavity of the housing 2110 of the sensing device 2100 other than the rear cavity 2111 is a front cavity 2112. The liquid droplet 2130 may be located any position on a surface of the transduction unit 2120 such that at least a portion of the transduction unit 2120 is connected to the housing 2110 by the liquid droplet 2130. The liquid droplet 2130 may be equivalent to a spring-mass-damping system (e.g., the first resonance system 530 or the second resonance system 740). The liquid droplet 2130 may adjust a vibration feature of the transduction unit 2120 so that its original resonance frequency (e.g., the first or third resonance frequency) changes while the Q is within a suitable range, and the sensing device 2100 has a high sensitivity due to the additional resonance peaks (e.g., the second or fourth resonance peaks).

Exemplarily, the liquid droplet 2130 is present in the front cavity 2112. The liquid droplet 2130 is between the transduction unit 2120 and the housing 2110, the upper and lower portions of which are connected to the transduction unit 2120 and the housing 2110, respectively. In some embodiments, a volume of the liquid droplet 2130 may be 1%-80% of the volume of the front cavity. In some embodiments, the volume of the liquid droplet 2130 may be 5%-50% of the volume of the front cavity. In some embodiments, the volume of the liquid droplet 2130 may be 10%-40% of the volume of the front cavity. In some embodiments, the volume of the liquid droplet 2130 may be 20%-30% of the volume of the front cavity. Optionally, the liquid droplet 2130 may also be within the rear cavity 2111. In some embodiments, the volume of the liquid droplet 2130 may be 5%-80% of the volume of the rear cavity. In some embodiments, the volume size of the liquid droplet 2130 may be 5%-50% of the volume of the rear cavity. In some embodiments, the volume of the liquid droplet 2130 may be 10%-40% of the volume of the rear cavity. In some embodiments, the volume of the liquid droplet 2130 may be 20%-30% of the volume of the rear cavity.

The liquid droplet 2130 may be formed by directly adding the droplet to the accommodation cavity (e.g., the front or rear cavity), or may be formed by other means, such as membrane wrapping.

Figure 22:
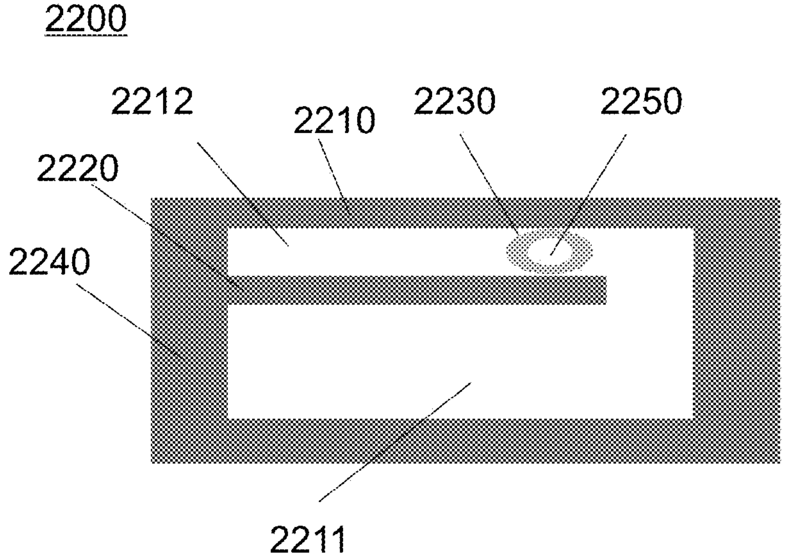
FIG. 22 is a schematic diagram illustrating an exemplary sensing device containing a liquid droplet according to some embodiments of the present disclosure.

FIG. 22 is a schematic diagram illustrating an exemplary sensing device containing a liquid droplet according to some embodiments of the present disclosure.

The structure of the sensing device 2200 in FIG. 22 is similar to that of FIG. 21. As shown in FIG. 22, the sensing device 2200 includes a housing 2210, a transduction unit 2220, a liquid droplet 2230, and a base part 2240, the housing 2210 has an accommodation cavity provided with the liquid droplet 2230. The base part 2240 and the transduction unit 2220 form a rear cavity 2211, and a space in the accommodation cavity of the housing 2210 of the sensing device 2200 other than the rear cavity 2211 is a front cavity 2212. The liquid droplet 2230 may be located any position on a surface of the transduction unit 2220 such that at least a portion of the transduction unit 2220 is connected to the housing 2210. In this embodiment, the liquid droplet 2230 includes bubbles 2250. The bubbles in the liquid droplet 2230 may be formed by adding gas to the droplet or by other means (e.g., membrane wrapping, etc.). In some embodiments, the liquid droplet 2230 is a hollow liquid droplet due to the presence of the bubbles 2250. In some embodiments, the size and position of the hollow liquid droplet is the same as or similar to the liquid droplet 2130 and not described herein. The liquid droplet 2230 and the bubbles 2250 may be equivalent to a spring-mass-damping system (e.g., the first resonance system 530 or the second resonance system 740). By adding the bubbles 2250, the stiffness and/or damping of the introduced spring-mass-damping system may be adjusted over a larger range, causing the additional resonance frequency (e.g., second or fourth resonance frequency) and the Q of the device to be adjusted over a larger range.

In some embodiments, a gap (e.g., slit, slot, hole, etc.) exists between the transduction unit (e.g., cantilever beam, cantilever membrane, etc.) and the housing of the sensing device. In some embodiments, an additional resonance system of the sensing device (e.g., the first resonance system 530 or the second resonance system 740) may be arranged at the gap. The additional resonance system may adjust an original vibration feature of the transduction unit 2220 so that its original resonance frequency (e.g., first or third resonance frequency) is changed while the Q is in the suitable range, a new resonance system may also be introduced, and the sensing device has a higher sensitivity due to an additional resonance peak (e.g., second or fourth resonance peak).

Figure 23A:
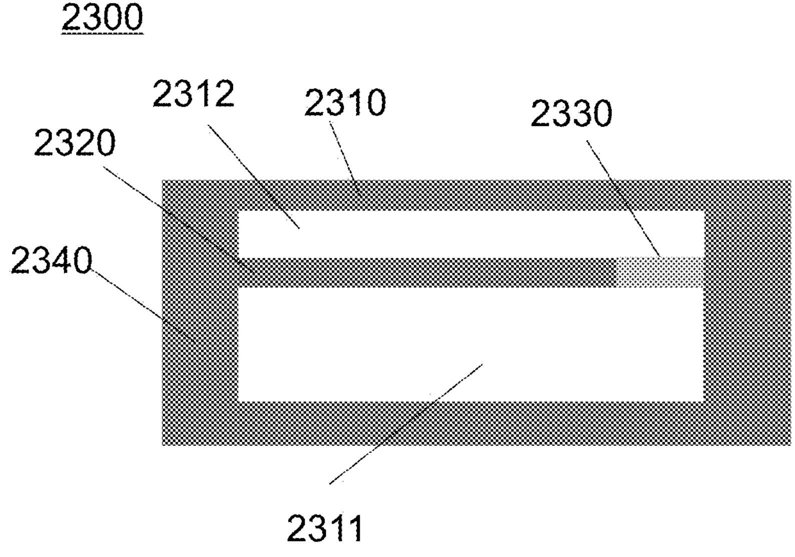
FIG. 23A is a schematic diagram illustrating an exemplary sensing device containing a liquid membrane according to some embodiments of the present disclosure.

FIG. 23A is a schematic diagram illustrating an exemplary sensing device containing a liquid membrane according to some embodiments of the present disclosure.

The structure of the sensing device 2300 in FIG. 23A is similar to that of FIGS. 21 and 22. As shown in FIG. 23A, the sensing device 2300 includes a housing 2310, a transduction unit 2320, a liquid membrane 2330, and a base part 2340, the base part 2340 and the transduction unit 2320 form a rear cavity 2311. A space in the accommodation cavity of the housing 2310 of the sensing device 2300 other than the rear cavity 2311 is a front cavity 2312. A gap exists between the transduction unit 2320 and the housing 2310. The liquid membrane 2330 may be located within the gap between the transduction unit 2320 and the housing 2310 such that at least a portion of the transduction unit 2320 is connected to the housing 2310. In some embodiments, a thickness of the liquid membrane 2330 may be less than, equal to, or greater than a thickness of the transduction unit 2320.

Figure 23B:
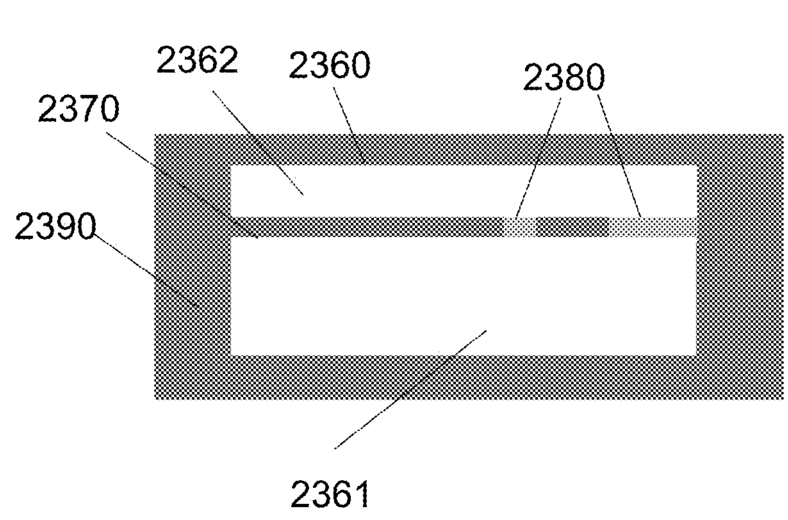
FIG. 23B is a schematic diagram illustrating an exemplary sensing device containing a liquid membrane according to some embodiments of the present disclosure.

FIG. 23B is a schematic diagram illustrating an exemplary sensing device containing a liquid membrane according to some embodiments of the present disclosure.

The structure of the sensing device 2350 in FIG. 23B is similar to that of FIGS. 21-22 and FIG. 23A. As shown in FIG. 23B, the sensing device 2350 includes a housing 2360, a transduction unit 2370, a liquid membrane 2380, and a base part 2390, the base part 2390 and the transduction unit 2370 form a rear cavity 2361. A space in the accommodation cavity of the housing 2360 of the sensing device 2350 other than the rear cavity 2361 is a front cavity 2362, and multiple gaps exist between the transduction unit 2370 and the housing 2360. The liquid membrane 2380 may be located within a gap in the transduction unit 2370 itself and a gap between the transduction unit 2370 and the housing 2360 such that portions of the transduction unit 2370 are connected to each other and at least a portion of the transduction unit 2370 is connected to the housing 2360. In some embodiments, a thickness of the liquid membrane 2380 may be less than, equal to, or greater than a thickness of the transduction unit 2370.

Figure 24A:
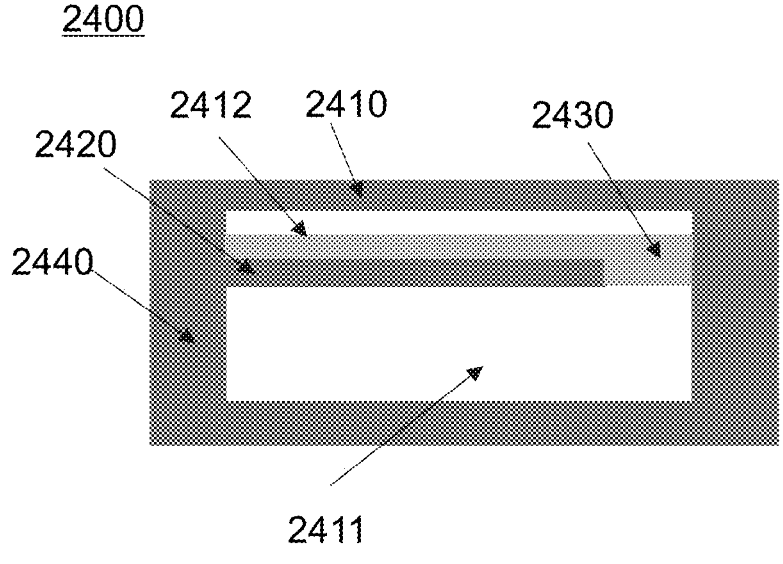
FIG. 24A is a schematic diagram illustrating an exemplary sensing device containing a liquid membrane according to some embodiments of the present disclosure.

FIG. 24A is a schematic diagram illustrating an exemplary sensing device containing a liquid membrane according to some embodiments of the present disclosure.

The structure of the sensing device 2400 in FIG. 24A is similar to that of FIGS. 21-22 and FIGS. 23A-23B. As shown in FIG. 24A, the sensing device 2400 includes a housing 2410, a transduction unit 2420, a liquid membrane 2430, and a base part 2440, and the base part 2440 and the transduction unit 2420 form a rear cavity 2411. A space in the accommodation cavity of housing 2410 of the sensing device 2400 other than the rear cavity 2411 is a front cavity 2412. A gap exists between the transduction unit 2420 and the housing 2410. The liquid membrane 2430 may be located within the gap between the transduction unit 2420 and the housing 2410 such that at least a portion of the transduction unit 2420 is connected to the housing 2410. Further, the liquid membrane 2430 further covers at least a portion of a surface of the transduction unit 2420. In this embodiment, the liquid membrane 2430 further covers an upper surface of the transduction unit 2420, thereby further improving the performance of the sensing device 2400.

Figure 24B:
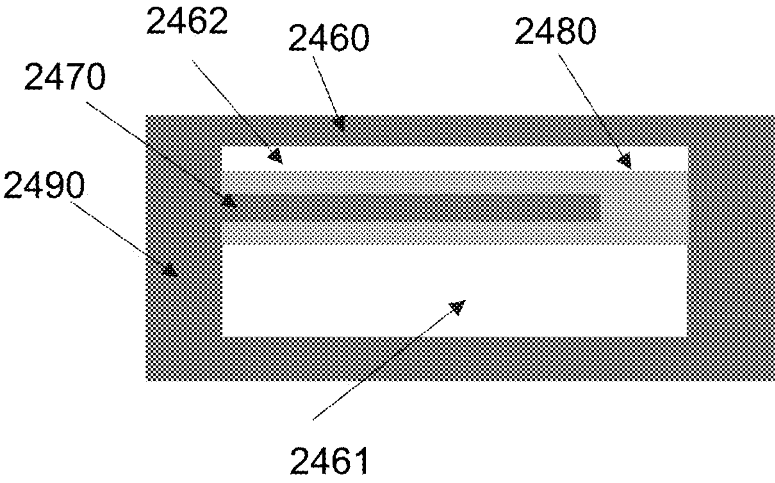
FIG. 24B is a schematic diagram illustrating an exemplary sensing device containing a liquid membrane according to some embodiments of the present disclosure.

FIG. 24B is a schematic diagram illustrating an exemplary sensing device containing a liquid membrane according to some embodiments of the present disclosure.

The structure of the sensing device 2450 in FIG. 24B is similar to that of FIGS. 21-22, FIGS. 23A-23B, and FIG. 24A. As shown in FIG. 24B, the sensing device 2450 includes a housing 2460, a transduction unit 2470, a liquid membrane 2480, and a base part 2490, and the base part 2490 and the transduction unit 2470 form a rear cavity 2461. A space in the accommodation cavity of the housing 2410 of the sensing device 2400 other than the rear cavity 2461 is a front cavity 2462. A gap exists between the transduction unit 2470 and the housing 2460. The liquid membrane 2480 may be located within the gap between the transduction unit 2470 and the housing 2460 such that at least a portion of the transduction unit 2470 is connected to the housing 2460. Further, the liquid membrane 2480 also covers at least a portion of a surface of the transduction unit 2470. In this embodiment, the liquid membrane 2480 also covers an upper surface and a lower surface of the transduction unit 2470, thereby further improving the performance of the sensing device 2450.

FIG. 25 is a schematic diagram illustrating a structure of a sensing device according to some embodiments of the present disclosure. As shown in FIG. 25, the sensing device 2500 may include a housing 2510 and a transduction unit 2520, an accommodation cavity is provided inside the housing 2510 and the transduction unit 2520 is provided in the accommodation cavity. The transduction unit 2520 may include a vibration-pickup structure 2521, which divides the accommodation cavity into a front cavity 2530 and a rear cavity 2540 located on opposite sides of the vibration-pickup structure 2521.

The sensing device 2500 may generate deformation and/or displacement based on an external signal, such as a mechanical signal (e.g., pressure, mechanical vibration), an acoustic signal (e.g., sound waves). The deformation and/or displacement may be further converted to a target signal by the transduction unit 2520 of the sensing device 2500. The target signal may be an electrical signal, a mechanical signal (e.g., mechanical vibration), an acoustic signal (e.g., sound waves), an optical signal, a thermal signal, etc. In some embodiments, the sensing device 2500 may be a microphone (e.g., a bone conduction microphone), a speaker (e.g., a bone conduction speaker), an accelerometer, a pressure sensor, a hydrophone, an energy harvester, a gyroscope, etc. The bone conduction microphone or bone conduction speaker is a microphone or speaker in which sound waves are conducted in a solid (e.g., bone) by means of mechanical vibrations.

The housing 2510 may be a three-dimensional structure having an accommodation cavity (i.e., a hollow portion). In some embodiments, the housing 2510 may be a rectangular, spherical, polygonal, prismatic, and other regularly shaped or arbitrarily irregularly shaped structural body. In some embodiments, the housing 2510 may be made of metal (e.g., stainless steel, copper, etc.), plastic (e.g., polyethylene (PE), polypropylene (PP), polyvinyl chloride (PVC), polystyrene (PS), and acrylonitrile-butadiene-styrene co-polymer (ABS), etc.), composite material (e.g., metal matrix composite or non-metal matrix composite), epoxy resin, phenolic ceramics, polyimide, glass fibers (e.g., FR4-glass fibers), etc., or any combination thereof. In some embodiments, a flexible circuit board (FPC board) may be used as a side of the housing 2510 (e.g., a bottom wall of the housing 2510 in FIG. 25), the flexible circuit board 2510 may be used to mount components such as a circuit and a transduction unit of the sensing device, and other side walls of the housing 2510 may be made of the above materials, which is not further limited herein.

In some embodiments, the transduction unit 2520 may be a piezoelectric transducer. The transduction unit 2520 may include a base part 2522 and a vibration-pickup structure 2521. The vibration-pickup structure 2521 may include a cantilever beam (e.g., a piezoelectric cantilever beam or a piezoelectric beam), a cantilever membrane (e.g., a piezoelectric membrane), etc., which are supported by the base part 2522.

In some embodiments, the base part 2522 may be a structural body with an opening, the vibration-pickup structure 2521 is located at the opening of the base part 2522 and covers the opening, and an end of the base part 2522 away from the vibration-pickup structure 2521 is connected to the housing 2510 to divide the accommodation cavity into a front cavity 2530 and a rear cavity 2540 located on opposite sides of the vibration-pickup structure 2521. In some embodiments, the base part 2522 may be made of semiconductor material. The semiconductor material may include, but is not limited to, silicon dioxide, silicon nitride, gallium nitride, zinc oxide, silicon carbide, etc. In some embodiments, the vibration-pickup structure 2521 may be physically connected to the base part 2522. The term "connection" in the present disclosure may be understood to mean the connection of different parts of the same structure, after preparing different parts or structures separately, fixedly connection of each separate part or structure by welding, riveting, clamping, bolting, adhesive bonding, etc., or during the preparation process, a first component or structure deposited on a second component or structure by physical deposition (e.g., physical vapor deposition) or chemical deposition (e.g., chemical vapor deposition). In some embodiments, the base part 2522 may also be a barrel structure with two through ends, one end of which is connected to the housing 2510 and the other end of which is connected to the vibration-pickup structure 2521. For the specific structure of the vibration-pickup structure 2521, please refer to FIGS. 30-36B and their related description.

In some embodiments, the front cavity 2530 is filled with liquid that is in contact with the vibration-pickup structure 2521 and the base part 2522. The liquid may transmit vibration from the housing 2510 to the vibration-pickup structure 2521. In some embodiments, the liquid may have safety properties (e.g., non-flammable and non-explosive), stability properties (e.g., non-volatile, no high-temperature deterioration, etc.). For example, the liquid may include oil (e.g., silicone oil, glycerin, castor oil, motor oil, lubricating oil, hydraulic oil (e.g., aviation hydraulic fluid), etc.), water (e.g., pure water, aqueous solutions of other inorganic or organic substances, etc. (e.g., brine)), oil-water emulsions, or other liquids meeting the performance requirements, or any combination thereof.

In some embodiments, the sensing device 2500 may also include one or more pipeline structures 2550, each pipeline structure 2550 connects the front cavity 2530 to an outside of the housing 2510, and at least a portion of the liquid is disposed in the pipeline structure 2550. In some embodiments, the pipeline structure 2550 may be a separate structure relative to the housing 2510, the pipeline structure 2550 may be provided through a side wall of the housing 2510, or the side wall of the housing 2510 may be provided with mounting holes, and the pipeline structure 2550 is connected to the mounting holes in the side wall of the housing 2510.

In some embodiments, the pipeline structure 2550 may be part of the housing 2510, for example, the side wall of the housing 2510 extends toward the accommodation cavity to form one or more protrusions having a channel that connects the accommodation cavity to the outside of the housing 2510. In some embodiments, a cross-sectional shape of the pipeline structure 2550 includes, but is not limited to, a regular shape such as a circle, a rectangle, an oval, a semicircle, a polygon, or any irregular shape. In some embodiments, a top pipeline opening of the pipeline structure 2550 may be set flush with the side wall of the housing 2510, or protrude from the side wall of the housing 2510.

The housing 2510 of the sensing device 2500 is subjected to an external force to generate vibration, and the housing 2510 drives the base part 2522 to vibrate. The vibration-pickup structure 2521 and the base part 2522 cannot maintain a completely consistent movement due to the different properties of the vibration-pickup structure 2521 and the housing 2510 or the base part 2522, thus generating a relative motion, which further causes the vibration-pickup structure 2521 to produce deformation or displacement. In some embodiments, the vibration-pickup structure 2521 may include at least a piezoelectric layer, and when the vibration-pickup structure 2521 is deformed, the piezoelectric layer is subjected to the deformation stress to generate an electrical potential difference (voltage) to achieve the conversion of a vibration signal to an electrical signal. A processor 2523 may obtain the electrical signal from the vibration-pickup structure 2521 and perform signal processing, and the processor 2523 is similar to the processor shown in FIG. 1. In some embodiments, each pipeline structure 2550 connects the front cavity 2530 to the outside of the housing 2510. The outside of the housing 2510 may be an open space (e.g., a space in communication with the external environment) or an enclosed or semi-enclosed space enclosed by another structure (e.g., another portion of the housing). In some embodiments, the outside of the housing 2510 may be filled with medium different from the liquid in the front cavity 2530. For example, the outside of the housing 2510 may be filled with gas (e.g., air), one end of each pipeline structure 2550 is located in the liquid of the front cavity 2530 and the other end is connected to the external gas of the housing 2510. The liquid and gas connected to each pipe structure 2550 may form a resonance system (the principle of the resonance system is similar to the first resonance system or second resonance system) that may act on the transduction unit 2520 through the liquid in the front cavity 2530 to produce an additional resonance peak. Specifically, the vibration of the housing 2510 is transmitted to the pipeline structure 2550, and the liquid in a fluid region corresponding to the pipeline structure 2550 (which may include an internal region of the cavity of the pipeline structure 2550 and a vicinity of an end of the pipeline structure 2550 extending into the liquid, i.e., the region surrounded by the curve as shown in FIG. 25) squeezes gas corresponding to that pipeline structure 2550 (i.e., the gas above the pipeline structure 2550 shown in FIG. 25), thereby generating the vibration and acting on the transduction unit 2520, causing the transduction unit 2520 to generate an additional resonance peak that corresponds to a resonance frequency less than the first resonance frequency generated by the vibration-pickup structure 2521, resulting in a significant improvement in the response of the sensing device 2500 in the lower frequency band.

It should be noted that the above description of the sensing device 2500 is exemplary only and does not limit the present disclosure to the cited embodiments. For example, the base part may be a structure that is not limited to being independent relative to the housing, and in some embodiments, the base part may also be part of the housing. As another example, the liquid may not only be filled in the front cavity, but in some embodiments, both the front and rear cavities may be filled with liquid. In some embodiments, the liquid may be filled only in the rear cavity, and the pipeline structure is provided in the rear cavity accordingly. For the specific structure of the pipeline structure provided in the rear cavity, please refer to FIG. 30 and its description.

In order to enable the sensing device to have multiple resonance peaks and multiple resonance valleys, the sensing device 2500 may include multiple pipeline structures, which preferably may have different shapes or sizes.

In some embodiments, a resonance frequency corresponding to the resonance system may be adjusted by adjusting a volume of a cavity inside the pipeline structure to adjust a liquid mass in a corresponding fluid region of the pipeline structure. In some embodiments, cavity volumes of the multiple pipeline structures may be set differently, and accordingly, liquid masses of fluid regions corresponding to the pipeline structures are different, making the resonance frequencies of the resonant systems corresponding to the multiple pipeline structures different. Factors affecting the cavity volume include, but are not limited to, a cross-sectional area of the pipeline structure (which may be determined by a length, a width, or a radius of the cross-sectional area of the pipeline structure) and a height of the pipeline structure, etc. The cross-sectional area of the pipeline structure is an area of the cross-section perpendicular to an extension direction thereof. In some embodiments, the cavity volume of the pipeline structure may be adjusted by adjusting the cross-sectional area of the pipeline structure and/or the height of the pipeline structure, which in turn controls the liquid mass of the cavity inside the pipeline structure. Multiple resonance systems corresponding to the multiple pipeline structures (containing the liquid mass in the fluid region and the gas above the liquid surface) may provide the sensing device with multiple additional resonance peaks due to the different resonance frequencies of the resonance peaks corresponding to the pipeline structures with different cavity volumes. In addition, a resonance system corresponding to each pipeline structure may provide an additional resonance valley for the sensing device because the vibration direction of the liquid in the fluid region of the pipeline structure changes before and after each resonance peak, i.e., the multiple pipeline structures may provide multiple additional resonance valleys for the sensing device. In other words, each pipeline structure corresponds to an additional set of resonance peak and resonance valley of the resonance system. For more information about the resonance peaks and resonance valleys, please refer to FIG. 28, FIG. 29A and FIG. 29B and their related descriptions.

Figure 26A:
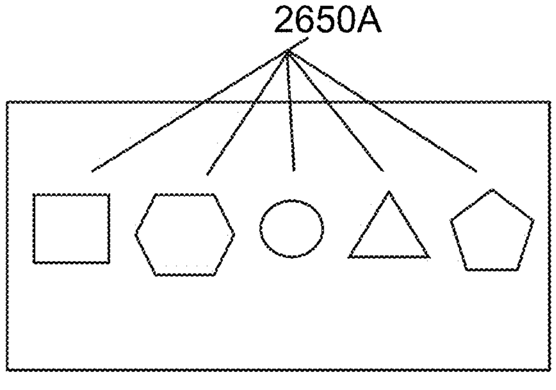
FIG. 26A a schematic diagram illustrating multiple pipeline structures according to some embodiments of the present disclosure.
Figure 26B:
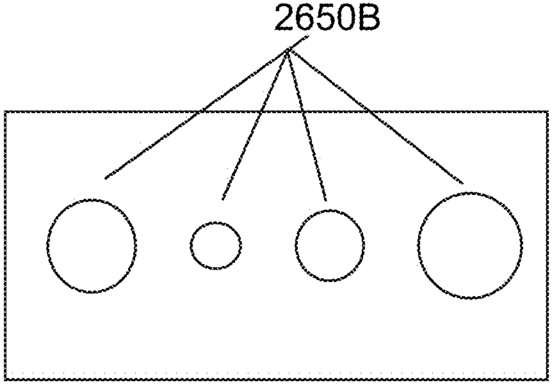
FIG. 26B a schematic diagram illustrating multiple pipeline structures according to some embodiments of the present disclosure.

In some embodiments, the multiple pipeline structures may be provided on at least one sidewall of the housing. For example, the multiple pipeline structures may be provided on the same side wall of the housing. As another example, the multiple pipeline structures may be provided on different side walls of the housing. In some embodiments, the multiple pipeline structures may be regularly distributed in rows, columns, rings, etc. or irregularly distributed on the side walls of the housing. In some embodiments, the cross-sectional shapes of the multiple pipeline structures may be all the same, different, or not all the same. For example, the cross-sectional shapes of the multiple pipeline structures may all be circular. For example, the cross-sectional shapes of the multiple pipeline structures may include any one of a rectangular shape, a polygonal shape, a circular shape, a semicircular shape, an elliptical shape, or any combination thereof. FIG. 26A is a schematic diagram illustrating multiple pipeline structures according to some embodiments of the present disclosure. As shown in FIG. 26A, the multiple pipeline structures 2650A are distributed in a row, and the multiple pipeline structures all have different cross-sectional shapes, which are rectangular, hexagonal, elliptical, triangular, and pentagonal shapes in sequence. FIG. 26B is a schematic diagram illustrating multiple pipeline structures according to some embodiments of the present disclosure. As shown in FIG. 26B, the multiple pipeline structures 2650B are distributed in a row, and the cross-sectional shapes of the multiple pipe structures 2650B are all circular.

Figure 27:
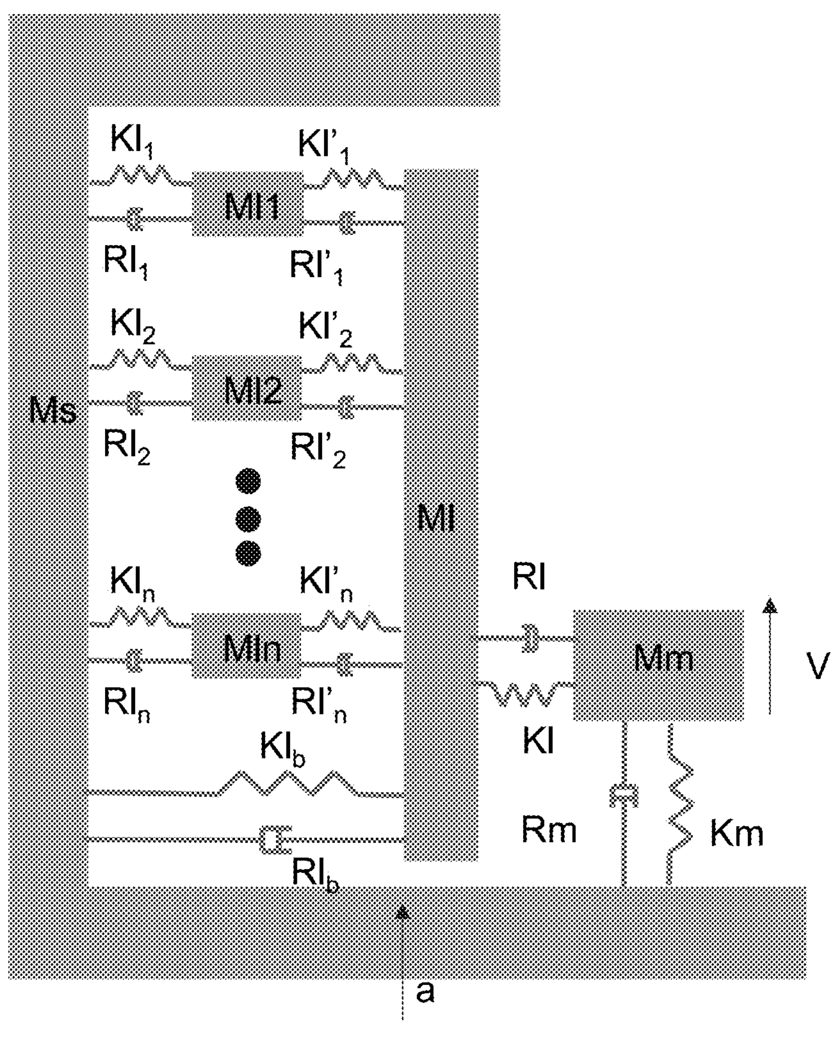
FIG. 27 is a schematic diagram illustrating a mechanical equivalent of a sensing device according to some embodiments of the present disclosure.

FIG. 27 is a schematic diagram illustrating a mechanical equivalent of a sensing device according to some embodiments of the present disclosure. In conjunction with FIG. 25 and FIG. 27, the arrow a in FIG. 27 indicates an acceleration direction of the housing and the arrow V indicates a velocity direction of the vibration-pickup structure, the housing 2510 illustrated in FIG. 25 may be equivalent to a mass Ms. The vibration-pickup structure 2520 is equivalent to the spring-damping-mass system Km-Rm-Mm, Mm characterizing a sum of a mass of the vibration-pickup structure 2520 and an additional mass of the liquid attached to the vibration-pickup structure 2520. The vibration-pickup structure 2520 is connected to the housing 2510, the liquid is equivalent to the mass Ml, the spring damping effect between the vibration-pickup structure 2520 and Ml is equivalent to Kl-Rl, and the spring damping effect between the housing 2510 and Ml is equivalent to Klb-Rlb. A resonance system corresponding to the pipeline structure 2550 may be equivalent to the spring-damping-mass system $Kl_n$-$Rl_n$-$Ml_n$, $Kl_n$-$Rl_n$ is provided by gas corresponding to the pipeline structure 2550 and liquid in the fluid region of the pipeline structure 2550, ML characterizes a liquid mass in the fluid region corresponding to the pipeline structure 2550, the pipeline structure 2550 is connected to the housing 2510 and the pipeline structure 2550 is in contact with the liquid, and the spring damping effect between the pipeline structure 2550 and Ml is equivalent to $Kl'_n$-$Rl'_n$. Resonance systems corresponding to the multiple pipeline structures 2550 may be equivalent to multiple $Kl_n$-$Rl_n$-$Ml_n$ systems connected in parallel, where n may be any positive integer (e.g., 1, 2, . . . ). In some embodiments, the sensing device may include a pipeline structure 1, a pipeline structure 2, . . . , a pipeline structure n. The pipeline structure 1 may be equivalent to a spring-damping-mass system $Kl_1$-$Rl_1$-$Ml_1$, $Kl_1$-$Rl_1$ being provided by gas corresponding to the pipeline structure 1 (i.e., the gas located at an outlet of the pipeline structure 1) and liquid in a fluid region of the pipeline structure 1, $Ml_1$ characterizes a liquid mass in the fluid region corresponding to the pipeline structure 1. The spring damping effect between a resonance system corresponding to the pipeline structure 1 and Ml is equivalent to $Kl'_1$-$Rl'_1$. A resonance system corresponding to the pipeline structure 2 may be equivalent to a spring-damping-mass system $Kl_2$-$Rl_2$-$Ml_2$, $Kl_2$-$Rl_2$ being provided by gas corresponding to the pipeline structure 2 and liquid in a fluid region of the pipeline structure 2, $Ml_2$ characterizes a liquid mass in the fluid region corresponding to the pipeline structure 2, and the spring damping action between the pipeline structure 2 and Ml is equivalent to $Kl'_2$-$Rl'_2$.

Figure 28:
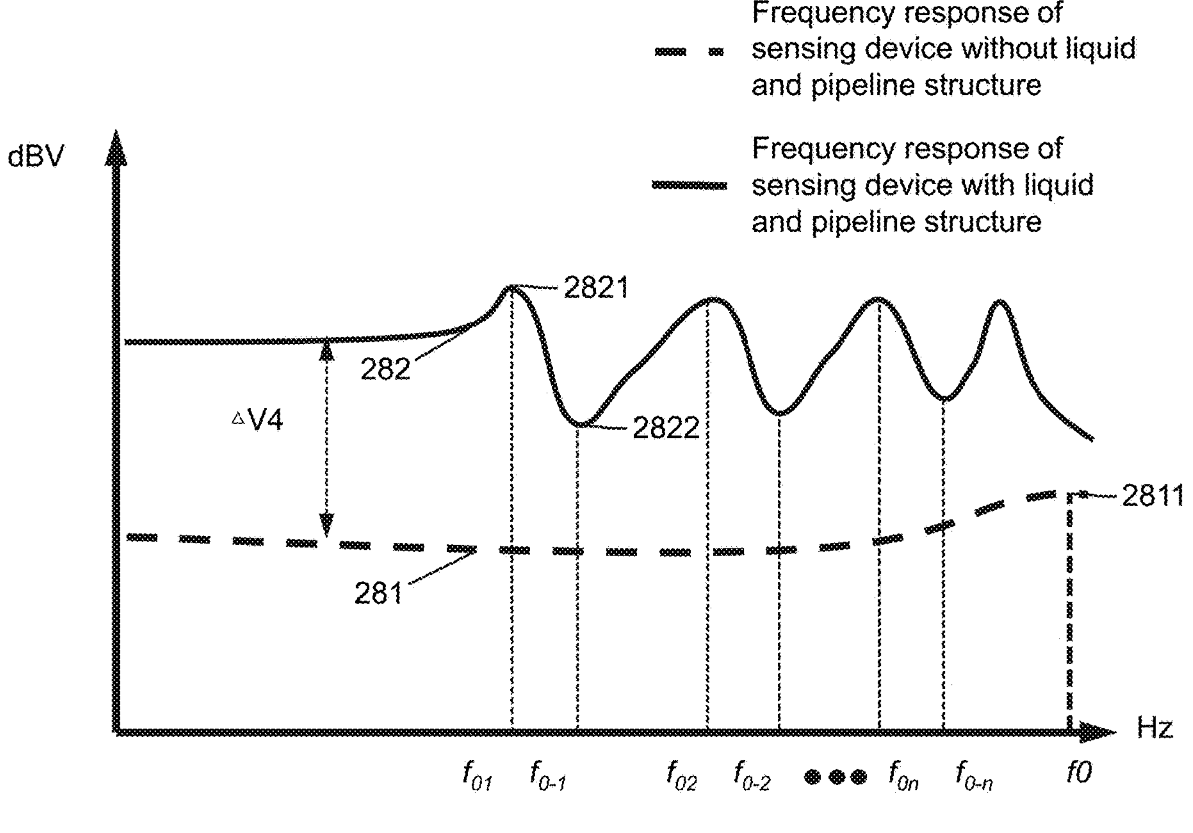
FIG. 28 is a frequency response curve illustrating a sensing device according to some embodiments of the present disclosure.

The spring-damping-mass system Km-Rm-Mm and the spring-damping-mass system $Kl_n$-$Rl_n$-$Ml_n$ have different elasticity, damping and mass, respectively, so that each spring-damping-mass system may have different resonance peaks, and the sensing device includes multiple spring-damping-mass systems with different resonance peaks, so that the frequency response curve of the sensing device may have multiple resonance peaks. FIG. 28 is a frequency response curve illustrating a sensing device according to some embodiments of the present disclosure. In FIG. 28, the horizontal coordinate indicates the frequency, a unit of which is Hz, and the vertical coordinate indicates the sensitivity, a unit of which is dBV. Curve 281 shows the frequency response curve of a sensing device without liquid and a pipeline structure, the resonance frequency $f_0$ corresponding to resonance peak 2811 is a first resonance frequency. Curve 282 shows the frequency response curve of a sensing device with liquid and a pipeline structure, a spring-damping-mass system equivalent to the resonance system (e.g., $Kl_n$-$Rl_n$-$Ml_n$) corresponding to the pipeline structure resonates at the resonance frequency such that curve 282 may have multiple resonance peaks (including resonance peak 2821) and multiple resonance valleys (including resonance valley 2822). The multiple resonance peaks correspond to resonance frequencies $f_{01}$, $f_{02}$, . . . , $f_{0n}$, and the multiple resonance valleys correspond to resonance frequencies $f_{0\text{-}1}$, $f_{0\text{-}2}$, . . . , $f_{0\text{-}n}$, n corresponds to n of the spring damping mass system $Kl_n$-$Rl_n$-$Ml_n$. In some embodiments, relationships between the resonance frequencies corresponding to the multiple resonance peaks may be similar to the relationships between the resonance frequencies corresponding to the first (or third) resonance peak 921 and the second (or fourth) resonance peak 922 in the curve 920 of FIG. 9, and are not repeated herein. Continuing to reference to FIG. 28, the sensitivity of the sensing device having liquid and a pipeline structure has a significantly boost compared to the sensing device not having liquid and a pipeline structure, and the boost may be ΔV4. In some embodiments, ΔV4 may be within a range of 10 dBV-60 dBV. Preferably, ΔV4 may be within a range of 20 dBV-60 dBV. Further preferably, ΔV4 may be within a range of 30 dBV-50 dBV. In some embodiments, amplitude of the resonance peak provided by the pipeline structure is higher by reducing the viscosity of the liquid, thereby improving the sensitivity of the sensing device in a frequency band near a resonance frequency corresponding to its resonance peak. In some embodiments, multiple resonance peaks provided by the multiple pipeline structures may have higher amplitudes, thereby enabling the sensing device to maintain a good response over a wide frequency band.

Figures 29A, 29B, 30:
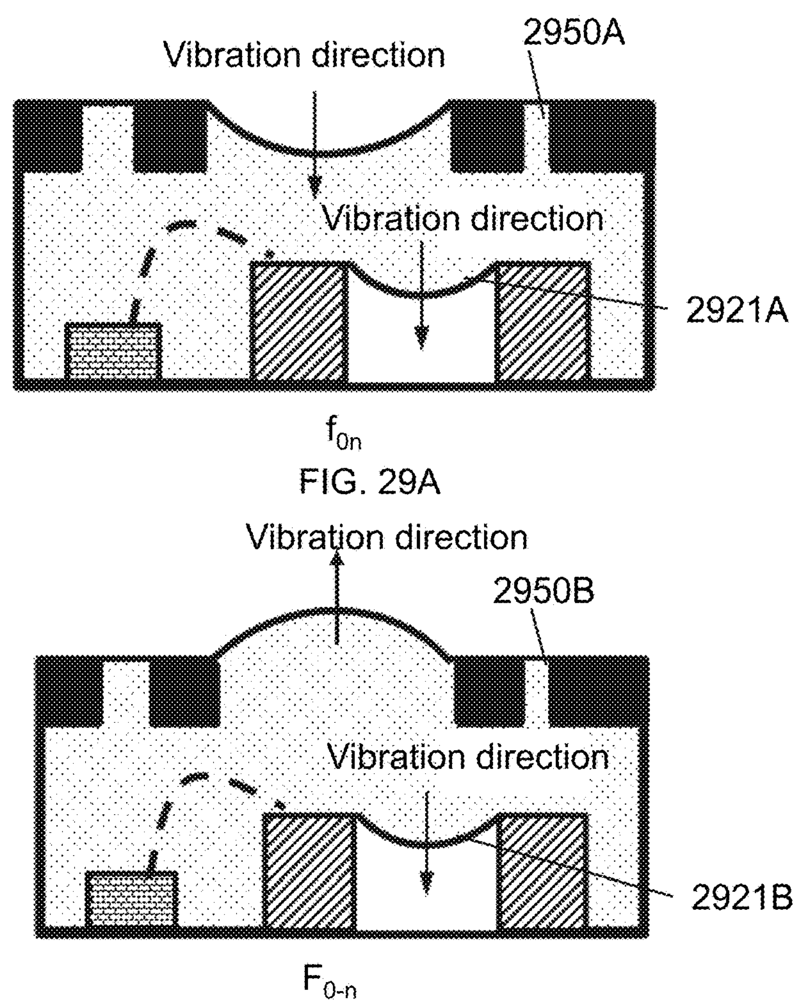
FIG. 29A a schematic diagram illustrating a vibration direction of a sensing device at a resonance peak according to some embodiments of the present disclosure.
FIG. 29B a schematic diagram illustrating a vibration direction of a sensing device at a resonance valley according to some embodiments of the present disclosure.
FIG. 30 is a schematic diagram illustrating a structure of a sensing device according to some embodiments of the present disclosure.

The liquid in the fluid region corresponding to the pipeline structure vibrates in the same or opposite direction to the vibration of the vibration-pickup structure during the vibration, causing the frequency response curve of a sensing device with a resonance system (e.g., the spring mass system $Kl_n$-$Rl_n$-$Ml_n$) to have a resonance peak (e.g., resonance peak 2821 in FIG. 28) or a resonance valley (e.g., resonance valley 2822 in FIG. 28). For the specific principles of the generation of the resonance peak and resonance valley, please refer to FIG. 29A and FIG. 29B for specific descriptions. FIG. 29A is a schematic diagram illustrating a vibration direction of a sensing device at a resonance peak according to some embodiments of the present disclosure. As shown in FIG. 29A, when the sensing device is at the resonance frequency $f_{0n}$ corresponding to the resonance peak, liquid in a fluid region of a pipeline structure 2950A vibrates in the same direction as the vibration direction of a vibration-pickup structure 2921A, and a vibration displacement of the liquid is superimposed on a vibration displacement of the vibration-pickup structure 2921A to increase the deformation, thereby causing the sensing device to generate a resonance peak at $f_{0n}$. FIG. 29B is a schematic diagram illustrating a vibration direction of a sensing device at a resonance valley according to some embodiments of the present disclosure. As shown in FIG. 29B, when the sensing device is at the resonance frequency $f_{0\text{-}n}$ corresponding to the resonance peak, a vibration direction of liquid in a fluid region of a pipeline structure 2950B is opposite to the vibration direction of a vibration-pickup structure 2921B, and a vibration displacement of the liquid partially offsets a vibration displacement of the vibration-pickup structure 2921B to reduce the amount of deformation, thereby causing the sensing device to produce a resonance valley at $f_{0\text{-}n}$.

In some embodiments, by performing an acoustoelectric conversion on a vibration signal near each resonance peak in a multi-resonance system (e.g., the spring-mass system $Kl_1$-$Rl_1$-$Ml_1$, the sprin-mass system $Kl_2$-$Rl_2$-$Ml_2$, the spring-mass system $Kl_n$-$Rl_n$-$Ml_n$, etc. in FIG. 27), a sub-band frequency division of the vibration signal may be achieved. For example, considering the existence of multiple resonance peaks, a filter is set near the resonance frequency corresponding to each resonance peak, and a higher quality sub-band signal may be extracted even if a low-order filter is set. In this way, the sensing device provided by the embodiment of the present disclosure can help realize the sub-band frequency division processing of full-band signals by its own structure under the premise of a low-cost hardware circuit (e.g., filter circuit) or a software algorithm, avoiding the problems of complex design of a high-cost hardware circuit and a software algorithm that takes up high computing resources and brings about signal distortion and noise introduction.

By way of example only, the method of determining the frequency response curve of the sensing device illustrated in FIG. 28 may include: supplying a measurement voltage to the sensing device in a measurement circuit, and plotting the frequency response curve of the sensing device by a level recorder.

FIG. 30 is a schematic diagram illustrating a structure of a sensing device according to some embodiments of the present disclosure. As shown in FIG. 30, the sensing device 3000 may include a housing 3010, a transduction unit 3020, and a pipeline structure 3050, an accommodation cavity is provided inside the housing 3010, the transduction unit 3020 is provided inside the accommodation cavity, a vibration-pickup structure divides the accommodation cavity into a front cavity 3030 and a rear cavity 3040 located on opposite sides of the vibration-pickup structure, the rear cavity 3040 is filled with liquid, the liquid is in contact with the vibration-pickup structure 3021, the pipeline structure 3050 connects the rear cavity 3040 to an outside of the housing 3010, and the liquid is at least partially located in the pipeline structure 3050. The housing 3010, the transduction unit 3020 and the pipeline structure 3050 shown in FIG. 25 are similar to the housing 2510, the transduction unit 2520 and the pipeline structure 2050 illustrated in FIG. 25 and are not repeated herein.

Figure 31A:
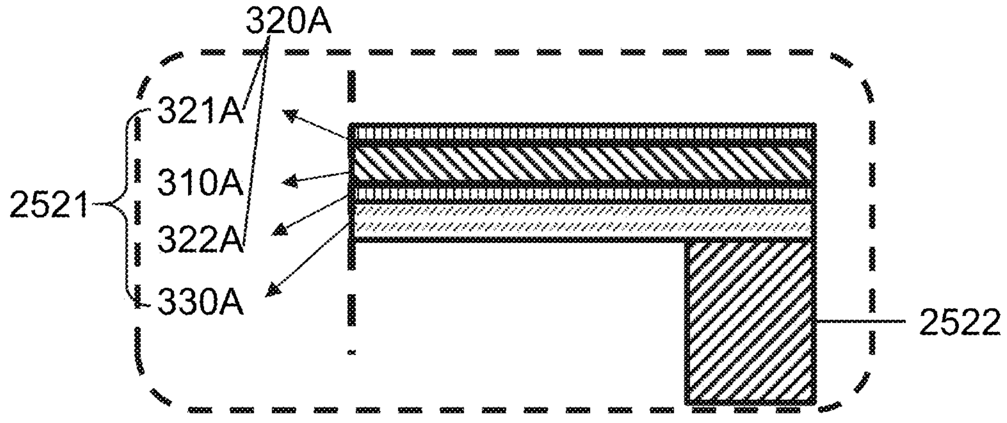
FIG. 31A is a schematic diagram illustrating a structure of part A of FIG. 25 according to some embodiments of the present disclosure.

FIG. 31A is a schematic diagram illustrating a structure of part A of FIG. 25 according to some embodiments of the present disclosure. As shown in FIG. 31A, the vibration-pickup structure 2521 may include a piezoelectric layer 310A and an electrode layer 320A, and the electrode layer 320A may be disposed on an upper and/or lower surface of the piezoelectric layer 310A.

In some embodiments, the electrode layer 320A has a first electrode layer 321A and a second electrode layer 322A, and the piezoelectric layer 310 may be disposed between the first electrode layer 321A and the second electrode layer 322A. In some embodiments, a side of the second electrode layer 320 away from the piezoelectric layer 310 is connected to a base part 2522. When a vibration signal is received by a vibration-pickup structure 2521, the vibration-pickup structure 2521 is deformed or displaced, and the piezoelectric layer 310 may generate an electrical potential difference under the deformation stress based on the piezoelectric effect, and the electrode layer 320 (e.g., the first electrode layer 321A and the second electrode layer 322A) may capture the potential difference and transmit the potential difference to a processor 2523, thereby converting an external vibration signal into an electrical signal.

In some embodiments, material of the piezoelectric layer may include piezoelectric crystal material and piezoelectric ceramic material. The piezoelectric crystal material is a piezoelectric single crystal. In some embodiments, the piezoelectric crystal material may include crystals, sphalerite, aragonite, tourmaline, rhodochrosite, GaAs, barium titanate and its derived structural crystals, $KH_2PO_4$, $NaKC_4H_4O_6 \cdot 4H_2O$ (Rochelle salt), or any combination thereof. The piezoelectric ceramic material is a piezoelectric polycrystal formed by an irregular collection of microfine grains obtained by solid-phase reaction and sintering for powder grains of different materials. In some embodiments, the piezoelectric ceramic material may include barium titanate (BT), lead zirconate titanate (PZT), lead barium lithium niobate (PBLN), modified lead titanate (PT), aluminum nitride (AlN), zinc oxide (ZnO), or any combination thereof. In some embodiments, the material of the piezoelectric layer may also be piezoelectric polymer material, such as polyvinylidene fluoride (PVDF), etc.

In some embodiments, material of the electrode layer may be conductive material. Exemplary conductive material includes metal, alloy material, metal oxide material, graphene, or the like, or any combination thereof. In some embodiments, the metal and alloy material may include nickel, iron, lead, platinum, titanium, copper, molybdenum, zinc, or any combination thereof. In some embodiments, the alloy material may include a copper-zinc alloy, a copper-tin alloy, a copper-nickel-silicon alloy, a copper-chromium alloy, a copper-silver alloy, or any combination thereof. In some embodiments, the metal oxide material may include $RuO_2$, $MnO_2$, $PbO_2$, NiO, etc., or any combination thereof.

In some embodiments, in order to support the electrode layer 320A and the piezoelectric layer 310A or transmit displacement to the electrode layer 320A and the piezoelectric layer 310A, the vibration-pickup structure may also include a substrate layer 330A, which may be disposed between the second electrode layer 322A and the base part 2522. In some embodiments, the substrate layer 330A may be a single-layer structure or a multi-layer composite structure made of one or more semiconductor materials. It should be noted that the vibration-pickup structure illustrated in FIG. 31A is exemplary only and does not limit the vibration-pickup structure to the scope of the cited embodiments. For example, the vibration-pickup structure may also include other structural layers, or have multiple piezoelectric layers. In some embodiments, the vibration-pickup structure may also include a first piezoelectric layer and a second piezoelectric layer, and the electrode layer 320 is disposed between the first piezoelectric layer and the second piezoelectric layer.

Figure 31B:
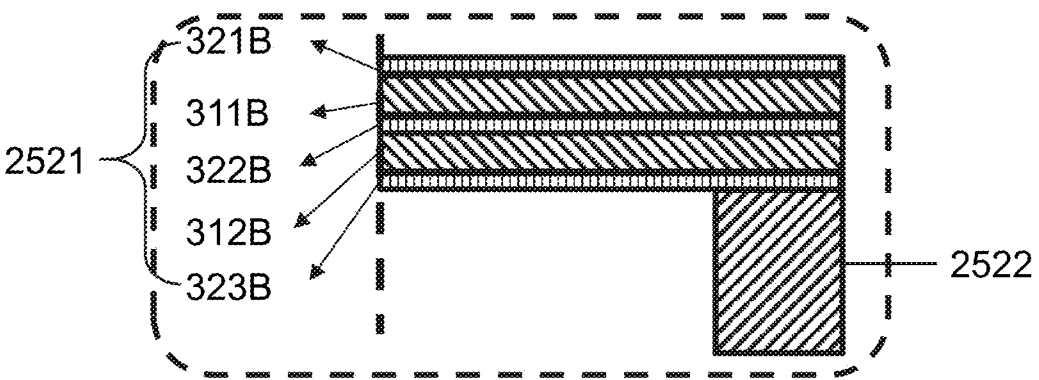
FIG. 31B is a schematic diagram of a structure of part A of FIG. 25 according to some embodiments of the present disclosure.

FIG. 31B is a schematic diagram of a structure of part A of FIG. 25 according to some embodiments of the present disclosure. As shown in FIG. 31B, the vibration-pickup structure 2521 may include a first electrode layer 321B, a first piezoelectric layer 311B, a second electrode layer 322B, a second piezoelectric layer 312B, and a third electrode layer 323B arranged in sequence from top to bottom, a side of the third electrode layer 323B away from the second piezoelectric layer 312B is connected to the base part 2522.

When a vibration signal is received by the vibration-pickup structure 2521, the piezoelectric layers (e.g., the first piezoelectric layer 311B, the second piezoelectric layer 312B) are subjected to deformation stress to generate a potential difference (voltage), and the electrode layers (e.g., the first electrode layer 321B, the second electrode layer 322B, and the third electrode layer 323B) may pick up the potential difference and transfer the potential difference to the processor 2522, thereby converting the external vibration signal into an electrical signal.

Figure 32A:
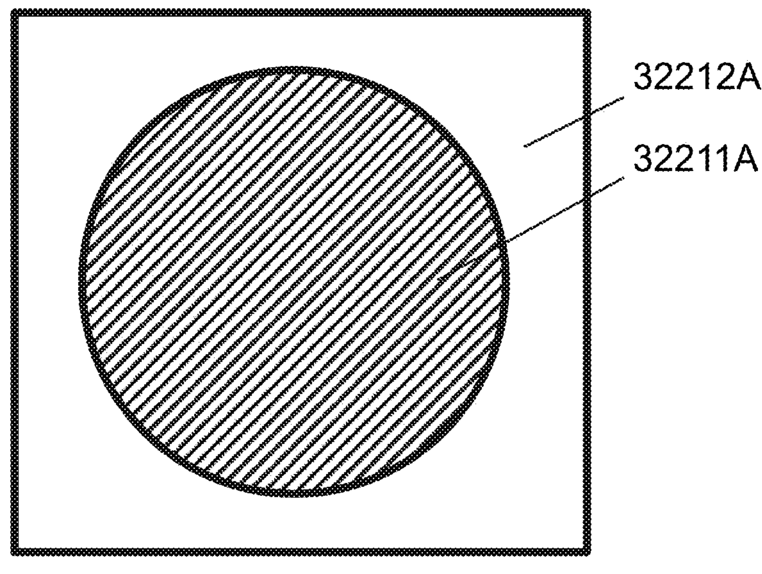
FIG. 32A is a schematic diagram illustrating a vibration-pickup structure according to some embodiments of the present disclosure.
Figure 32B:
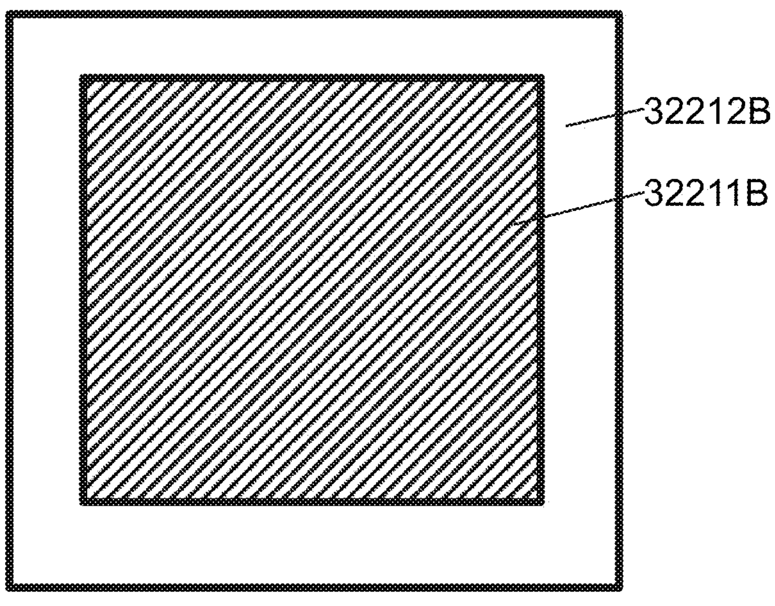
FIG. 32B is a schematic diagram illustrating a vibration-pickup structure according to some embodiments of the present disclosure.

In some embodiments, the vibration-pickup structure may cover an opening of the base part to prevent liquid in the front cavity from entering the rear cavity. In some embodiments, a surface of the vibration-pickup structure is connected to a side of the base part away from a bottom wall of the housing and covers the opening of the base part, and a surface of the vibration-pickup structure away from the base part is in contact with the liquid. In some embodiments, the vibration-pickup structure may be connected to a side wall of the base part by its circumference, and the vibration-pickup structure is adapted to a shape and size of the opening of the base part. In some embodiments, the shape of the vibration-pickup structure may include, but is not limited to, regular shapes such as circular, rectangular, oval, semi-circular, polygonal, or any irregular shape. Exemplary illustrations of the piezoelectric membrane and base part are provided below in conjunction with FIG. 32A and FIG. 32B. FIG. 32A is a schematic diagram illustrating a vibration-pickup structure according to some embodiments of the present disclosure. As shown in FIG. 32A, in some embodiments, a base part 32212A may be a square cylinder structure with two through ends or one opening end, the shape of the opening of the base part 32212A may be circular, and a piezoelectric membrane 32211A may be circular in shape adapted to the shape of the opening. FIG. 32B is a schematic diagram illustrating a vibration-pickup structure according to some embodiments of the present disclosure. As shown in FIG. 32B, in some embodiments, a base part 32212B may be a square cylinder structure with two through ends or one opening end, the shape of the opening of the base part 32212B may be square, and a piezoelectric membrane 32211B may be square in shape adapted to the shape of the opening.

It should be understood that the piezoelectric membrane may also not be adapted to the shape of the opening, for example, the shape of the piezoelectric membrane may be square and the shape of the opening of the base part may be triangular.

In some embodiments, the sensing device may include multiple piezoelectric beams. In some embodiments, the multiple piezoelectric beams may be multiple identical piezoelectric beams, for example, the multiple piezoelectric beams have the same length, thickness, material, and other factors. When mass centers of the multiple piezoelectric beams are located in a same plane, the multiple piezoelectric beams may provide a better acoustic output for the sensing device, which means that the sensing device may output a greater response when the same excitation signal is input. In some embodiments, the multiple piezoelectric beams may be multiple different piezoelectric beams, for example, the multiple piezoelectric beams may differ in any of factors such as length, thickness, material, etc., and their positions, etc. The multiple different piezoelectric beams may provide different resonance peaks for the sensing device, enhancing the response of the sensing device in any particular frequency band (e.g., in the frequency range of 20 Hz-1000 Hz). For more information about the piezoelectric beam, please refer to elsewhere in the present disclosure, e.g., FIG. 33, FIG. 35A and FIG. 35B and their related descriptions.

Figure 33:
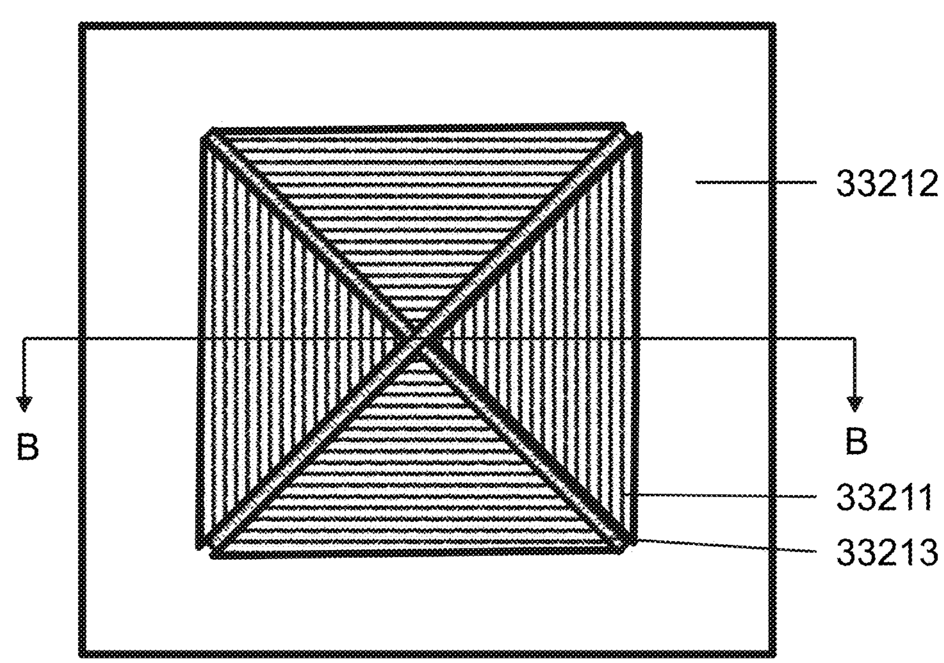
FIG. 33 is a schematic diagram illustrating a vibration-pickup structure according to some embodiments of the present disclosure.

FIG. 33 is a schematic diagram illustrating a vibration-pickup structure according to some embodiments of the present disclosure. As shown in FIG. 33, in some embodiments, a vibration-pickup structure 3321 may include a base part 33212 and four piezoelectric beams 33211, each piezoelectric beam 33211 extending toward a center of an opening of the base part 33212, the four piezoelectric beams 33211 being symmetrically distributed along a geometric center of the opening, and the four piezoelectric beams 33211 together covering the opening of the base part 33212. By way of exemplary illustration only, the opening of the base part in FIG. 33 is square, each piezoelectric beam 33211 may be an isosceles right triangle with the same size, the hypotenuse of each piezoelectric beam 33211 is connected to a side wall at the opening of the base part 33212, and the right-angled edges of the four piezoelectric beams 33211 are stitched to each other to form a square of the same shape as the shape of the opening.

In some embodiments, the shape formed by splicing multiple piezoelectric beams includes, but not limited to, a regular shape such as a circle, a rectangle, an ellipse, a semicircle, a polygon, or an arbitrary irregular shape. In some embodiments, the shape of each piezoelectric beam may be the same or different, and the shape includes, but is not limited to, a regular shape such as a sector, a triangle, a rectangle, a semicircle, a polygon, or an arbitrary irregular shape. In some embodiments, the vibration-pickup structure may include a base part and two piezoelectric beams, and the two piezoelectric beams covers an opening of the base part. In some embodiments, the two piezoelectric beams may be semi-circular with the same size, circular edges of the piezoelectric beams are connected to a side wall at the opening of the base part, and straight edges of the two piezoelectric beams are connected to each other to form a circle that adapts to the opening. In some embodiments, the vibration-pickup structure may include a base part and three piezoelectric beams, and the three piezoelectric beams cover the opening of the base part. In some embodiments, the three piezoelectric beams may be sectors with the same size, circular edges of the piezoelectric beams are connected to the side wall at the opening of the base part, and straight edges of the three piezoelectric beams are connected two by two to form a circle that adapts into the opening. In some embodiments, the piezoelectric beam 33211 may include an electrode layer and a piezoelectric layer, for more information about how the electrode layer and the piezoelectric layer are set up and more details, please refer to FIG. 31A, FIG. 31B and related contents. The base part 33212 shown in FIG. 33 is similar to the base part 2522 illustrated in FIG. 25 and not repeated herein.

In order to avoid the flow of liquid between the front and/or rear cavity through gaps between the piezoelectric beams 33211, in some embodiments, the vibration-pickup structure may also include a blocking structure 33213 that fills or covers the gaps between the multiple piezoelectric beams 33211. For example, the blocking structure 33213 may be disposed on upper or lower surfaces of the multiple piezoelectric beams 33211 to cover the gaps between the multiple piezoelectric beams 33211. As another example, the blocking structure 33213 may be disposed at a gap between two adjacent piezoelectric beams 33211. As another example, a portion of the blocking structure 33213 may be filled at the gap between the two adjacent piezoelectric beams 33211, and another portion may be located on the upper or lower surfaces of the multiple piezoelectric beams 33211 to cover the gaps between the multiple piezoelectric beams 33211. Considering that the blocking structure 33213 impedes the vibration of the piezoelectric beams connected to it, in some embodiments, the material of the blocking structure 33213 may be selected from material having a small Young's modulus to minimize this effect, for example, the Young's modulus of the blocking structure 33213 may be smaller than the Young's modulus of the electrode layer or the piezoelectric layer. In some embodiments, the material of the blocking structure 33213 may be semiconductor material, non-metallic material, or flexible material. Exemplary non-metallic material may include plastic (e.g., polyethylene (PE), polypropylene (PP), polyvinyl chloride (PVC), polystyrene (PS), and acrylonitrile-butadiene-styrene co-polymer (ABS), etc.), a composite material (e.g., a non-metallic matrix composite), etc., or any combination thereof. Exemplary flexible material may include rubber, latex, silicone, sponge, etc., or any combination thereof. For more information about the way in which the blocking structure fills or covers the gaps between the multiple piezoelectric beams, please refer to FIGS. 34A-FIG. 34D and their related description.

Figure 34A:
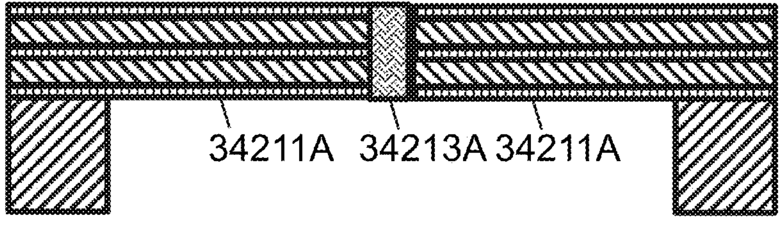
FIG. 34A is a cross-sectional diagram of the vibration-pickup structure in FIG. 33 along a B-B axis according to some embodiments of the present disclosure.

FIG. 34A is a cross-sectional diagram of the vibration-pickup structure in FIG. 33 along a B-B axis according to some embodiments of the present disclosure. As shown in FIG. 34A, a blocking structure 34213A fills a gap between two adjacent piezoelectric beams 3421A. In some embodiments, the circumferential side of the blocking structure 34213A may be connected to a corresponding piezoelectric beam 34211A at the gap. In some embodiments, an end surface of the blocking structure 34213A may be flush with a surface of the piezoelectric beam 34211A along a vibration direction of the piezoelectric beam 34211A. In some embodiments, the end surface of the blocking structure 34213A may be convex or concave relative to the surface of the piezoelectric beam 34211A along the vibration direction of the piezoelectric beam 34211A.

Figure 34B:
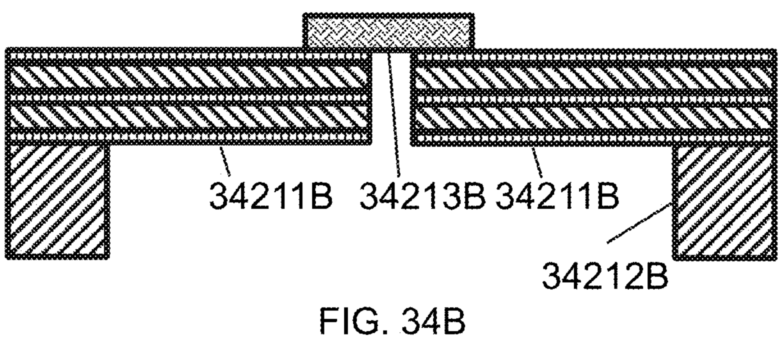
FIG. 34B is a cross-sectional diagram of the vibration-pickup structure in FIG. 33 along a B-B axis according to some embodiments of the present disclosure.

FIG. 34B is a cross-sectional diagram of the vibration-pickup structure in FIG. 33 along a B-B axis according to some embodiments of the present disclosure. As shown in FIG. 34B, a blocking structure 34213B covers a gap between two adjacent piezoelectric beams 34211B, and the blocking structure 34213B is located on a side of the piezoelectric beam 34211B away from a base part 34212B.

Figure 34C:
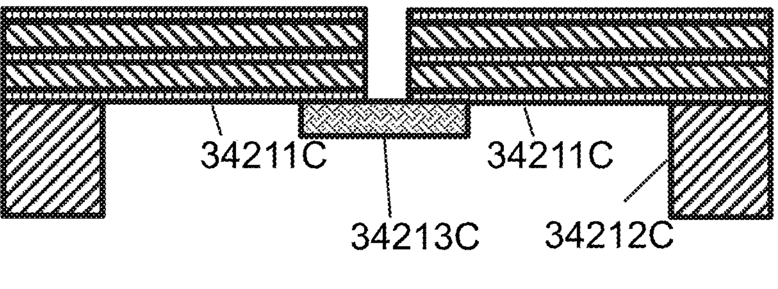
FIG. 34C is a cross-sectional diagram of the vibration-pickup structure in FIG. 33 along a B-B axis according to some embodiments of the present disclosure.

FIG. 34C is a cross-sectional diagram of the vibration-pickup structure in FIG. 33 along a B-B axis according to some embodiments of the present disclosure. As shown in FIG. 34C, a blocking structure 34213C covers a gap between two adjacent piezoelectric beams 34211C, and the blocking structure 34213C is located on a side of the piezoelectric beam 34211C near a base part 34212C.

Figure 34D:
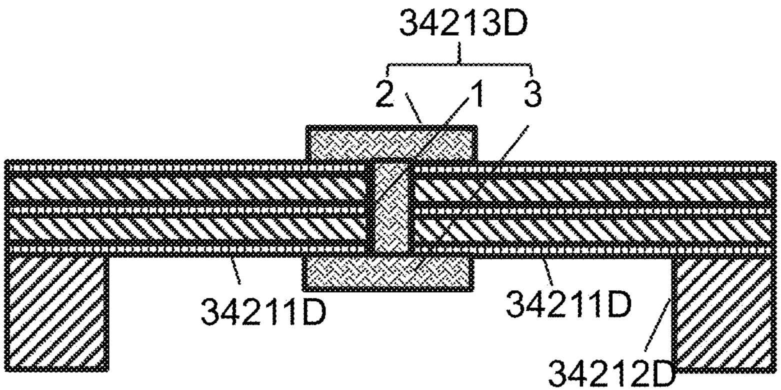
FIG. 34D is a cross-sectional diagram of the vibration-pickup structure in FIG. 33 along a B-B axis according to some embodiments of the present disclosure.

In order to further improve filling and sealing of the blocking structure to a gap between piezoelectric beams, the blocking structure may cover and fill the gap between two adjacent piezoelectric beams FIG. 34D is a cross-sectional diagram of the vibration-pickup structure in FIG. 33 along a B-B axis according to some embodiments of the present disclosure. As shown in FIG. 34D, a blocking structure 34213D surrounds a gap between piezoelectric beams 34211D.

In some embodiments, the blocking structure 34213D includes a first structural part 1, a second structural part 2, and a third structural part 3, the first structural part 1 fills a gap between the two adjacent piezoelectric beams 34211D, the second structural part 2 and the third structural part 3 cover the gap between the two adjacent piezoelectric beams 34211D, respectively, the second structural part 2 is located on a side of the piezoelectric beam 34211D away from a base part 34212D and the third structural part 3 is located on a side of the piezoelectric beam 34211D near the base part 34212D. In some embodiments, a circumferential side of the first structural part 1 may be connected to a corresponding piezoelectric beam 34211D at the gap. In some embodiments, an end surface of the first structural part 1 may be flush with a surface of the piezoelectric beam 34211D along a vibration direction of the piezoelectric beam 34211D. In some embodiments, the end face of the first structural portion 1 may be concave relative to the surface of the piezoelectric beam 34211D along the vibration direction of the piezoelectric beam 34211D. In some embodiments, the first structural part 1, the second structural part 2, and the third structural part 3 of the blocking structure 34213D may be independent structures of each other or may be a whole (e.g., integrated molding).

Optionally, when the gap between the piezoelectric beams is sufficiently small, the surface of the piezoelectric beam has a sufficient blocking effect on the liquid so that the liquid does not pass through the gap. In some embodiments, the gap between the piezoelectric beams may be no greater than 20 μm. Preferably, the gap between the piezoelectric beams may be no greater than 15 μm. Further preferably, the gap between the piezoelectric beams may be no greater than 10 μm.

Figure 35A:
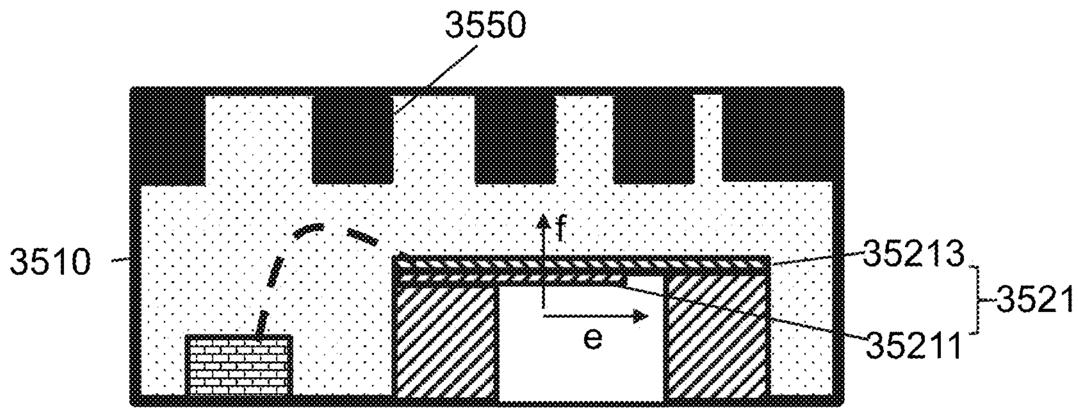
FIG. 35A is a schematic diagram illustrating a structure of a sensing device according to some embodiments of the present disclosure.
Figure 35B:
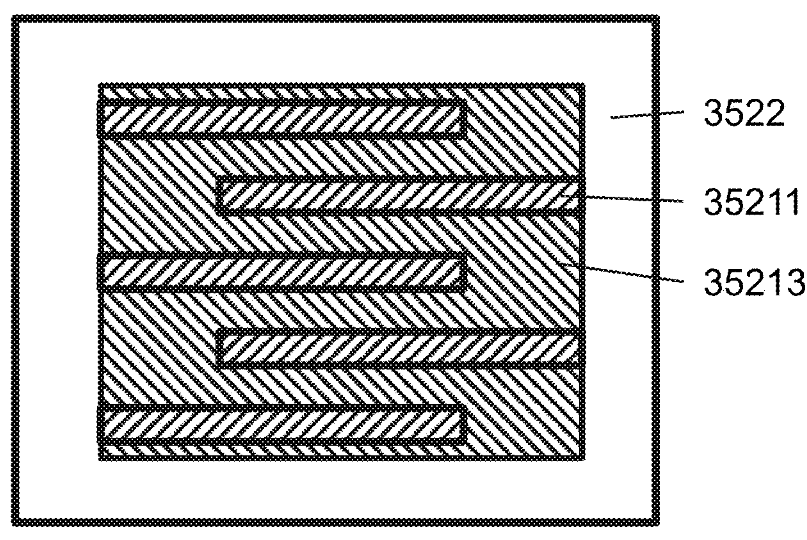
FIG. 35B is a schematic diagram illustrating a structure of a vibration-pickup structure according to some embodiments of the present disclosure.

FIG. 35A is a schematic diagram illustrating a structure of a sensing device according to some embodiments of the present disclosure, and FIG. 35B is a schematic diagram illustrating a structure of a vibration-pickup structure according to some embodiments of the present disclosure. The overall structure of a sensing device 3500 shown in FIG. 35A is substantially the same as that of the sensing device 2500 shown in FIG. 25, and the main difference is that the vibration-pickup structure is different. As shown in FIG. 35A and FIG. 35B, a vibration-pickup structure 3521 may include a piezoelectric beam 35211 and a second membrane structure 35213. A base part 3522 is a structure with an opening, the piezoelectric beam 35211 is disposed at the opening, and the second membrane structure 35213 covers the opening of the base part 3522. A housing 3510 and a pipeline structure 3550 shown in FIG. 35A are similar to the housing 2510 and the pipeline structure 2550 shown in FIG. 25, and the base part 3522 is similar to the base part 2522 shown in FIG. 25, which is not repeated herein.

In some embodiments, the piezoelectric beam 35211 may be a cantilever beam structure having a long strip shape, and two ends of the piezoelectric beam 35211 are a fixed end and a free end, respectively, and the fixed end may be connected to a side of the base part, and the free end may be suspended at the opening of the base part. In some embodiments, the piezoelectric beam 35211 may include an electrode layer and a piezoelectric layer, both the electrode layer and the piezoelectric layer are arranged along their long axis direction (direction e shown in FIG. 35A) and overlap along their thickness direction (direction f shown in FIG. 35A). For more information about how the electrode layer and the piezoelectric layer are arranged and more details, please refer to FIG. 31A, FIG. 31B and related descriptions. In some embodiments, a polarization direction of the piezoelectric beam 35211 is perpendicular to a stress direction, when the piezoelectric beam 35211 is subjected to a vibration signal transmitted by the base part, the direction of the stress on the piezoelectric beam 35211 during the vibration process is a long axis direction of the piezoelectric beam 35211, the piezoelectric beam 35211 is deformed as a whole, and the polarization direction is perpendicular to the long axis direction of the piezoelectric beam 35211. After the piezoelectric layer is subjected to the deformation stress, a potential difference (voltage) is generated between upper and lower surfaces of the piezoelectric layer. The electrode layers located on both sides of the piezoelectric layer (e.g., the first and second electrode layers) may collect the potential difference so as to convert the external vibration signal into an electrical signal. A single piezoelectric beam may be considered as a signal acquisition unit, which may have a unique resonance peak. In some embodiments, a resonance frequency corresponding to the resonance peak of the piezoelectric beam 35211 may be adjusted by adjusting the structural parameters of the piezoelectric beam 35211 (e.g., volume, mass, width of the piezoelectric beam and thickness of the piezoelectric and electrode layers, etc.).

In order to enhance the sensitivity of the sensing device in a wider frequency band, multiple piezoelectric beams 35211 may be provided, and the multiple piezoelectric beams 35211 may vibrate to produce resonance peaks of different frequencies. Each piezoelectric beam 35211 may act as a separate signal acquisition unit to output a sub-electrical signal. In some embodiments, each sub-electrical signal may be output directly to a processor (e.g., processor 2523 illustrated in FIG. 25) in the form of electrical series, parallel, or a combination of series and parallel. In some embodiments, each sub-electrical signal may be individually transmitted to the processor, which individually performs signal processing (including, but not limited to, adjusting amplitude, phase, etc.) on each sub-electrical signal, and then performs a corresponding signal fusion. For more information about the processing on the sub-electrical signal of each piezoelectric beam can be found in, for example, the PCT application entitled "MICROPHONE AND ELECTRONIC DEVICE HAVING THE SAME", application number PCT/CN2020/103201, the contents of which are introduced herein for reference. In some embodiments, the opening of the base part may be rectangular, the fixed end of the piezoelectric beam 35211 may be connected to a side wall of the opening, the free end of the piezoelectric beam 35211 may be suspended within the opening, and the fixed end of the piezoelectric beam 35211 is disposed at intervals on the side wall of the opening. In some embodiments, the fixed ends of the multiple piezoelectric beams 35211 may be arranged on the same side wall of the opening. In some embodiments, the multiple piezoelectric beams 35211 on the same side wall of the opening are sequentially disposed at intervals. In some embodiments, the multiple piezoelectric beams 35211 that are disposed at intervals on the same side wall of the opening are in the same plane and are approximately parallel. In some embodiments, the multiple piezoelectric beams 35211 may be separately disposed on opposite side walls of the opening. In some embodiments, the free ends of the multiple piezoelectric beams 35211 disposed on opposing side walls of the opening are disposed at intervals within the opening. In some embodiments, the multiple piezoelectric beams 35211 separately disposed on the opposite side walls of the opening are in the same plane and are approximately parallel. In some embodiments, the multiple piezoelectric beams may be separately disposed on the four side walls of the opening, for example, the free ends of the piezoelectric beams 35211 separately disposed on the four side walls of the opening all extend toward the opposite side walls of the opening.

In some embodiments, the opening may be annular, the fixed ends of the multiple piezoelectric beams may be disposed at intervals on an annular inner wall of the opening, the fixed ends of the piezoelectric beams may be approximately perpendicular to the annular inner wall, and the fixed ends of the piezoelectric beams 35211 extend toward a center of the opening and are suspended in the opening so that the multiple piezoelectric beams are distributed in an annular shape in the same plane. In some embodiments, the opening may also be a polygonal structure (e.g., triangular, pentagonal, hexagonal, etc.), the fixed ends of the multiple piezoelectric beams may be disposed at intervals along at least one of the side walls of the opening in the same plane. In some embodiments, multiple different piezoelectric beams having different resonance frequencies (e.g., piezoelectric beams having different structural parameters) may be provided, thereby enabling the vibration-pickup structure to produce a frequency response with multiple resonance peaks to the vibration signal of the housing. Since the piezoelectric beams are sensitive to the vibrations near their resonance frequencies, it can be assumed that the piezoelectric beams have frequency selective features for the vibration signals, i.e., the piezoelectric beams mainly convert the vibration signals in the sub-bands near their resonance frequencies into electrical signals.

In some embodiments, different piezoelectric beams may be made to have different resonance frequencies by setting different structural parameters, thereby forming separate sub-bands near each resonance frequency. In some embodiments, at least five sub-bands may be formed in a vocal frequency range (e.g., 20 Hz-16000 Hz) by adjusting the structural parameters of the multiple piezoelectric beams to be different. In some embodiments, 5-11 sub-bands may be formed in the vocal frequency range (e.g., 20 Hz-16000 Hz) by adjusting the structural parameters of the multiple piezoelectric beams to be different. In some embodiments, 5-16 sub-bands may be formed in the vocal frequency range (e.g., 20 Hz-16000 Hz) by adjusting the structural parameters of the multiple piezoelectric beams to be different. In some embodiments, 6-24 sub-bands may be formed in the vocal frequency range (e.g., 20 Hz-16000 Hz) by adjusting the structural parameters of the multiple piezoelectric beams to be different. It should be noted that the piezoelectric beams, the number of sub-bands, and frequency range of the resonance frequency corresponding to each sub-band are not limited to the above description, which can be adjusted according to the application scenario of the microphone, the size of the sensing device, and other specific circumstances, which are not further limited here.

In some embodiments, the output at the resonance peak of each piezoelectric beam is much larger than the output in the other frequency ranges, and the sub-band frequency division is performed on a full frequency sound signal by extracting the signals generated by each piezoelectric beam separately. In some embodiments, each sub-band may be processed separately (e.g., denoising, amplitude modulation, etc.), and then the separately processed sub-band signals may be fused to obtain a flatter frequency response curve of the sensing device with a high signal-to-noise ratio. In some embodiments, the electrical signal of each piezoelectric beam may be output to the processor in electrical series or parallel or a combination of series and parallel, or the electrical signal of each piezoelectric beam may be output to the processor individually. The processor processes the electrical signal of each piezoelectric beam 35211 individually, thus realizing the frequency band fusion. By setting multiple piezoelectric beams in the sensing device and using a feature that the piezoelectric beams (e.g., piezoelectric beam 35211) have different resonance frequencies, filtering and frequency band decomposition of the vibration signals may be realized, avoiding the complexity of a filtering circuit used in the sensing device and the problem that the software algorithm takes up high computing resources and brings about signal distortion and noise introduction, thereby reducing the complexity of the sensing device and production costs.

In some embodiments, the sensitivity of the sensing device near multiple resonance peaks may be enhanced by setting different piezoelectric beams to increase the resonance peaks in different frequency ranges, thereby enhancing the sensitivity of the sensing device in a wider frequency band.

In some embodiments, one surface of the second membrane structure 35213 may be connected to the side of the base part 3522 away from the bottom wall of the housing and cover the opening of the base part 3522, one surface of the second membrane structure 352113 away from the base part in contact with the liquid. In some embodiments, the second membrane structure 35213 may be connected to a side wall corresponding to the opening of the base part 3522 by its circumferential side, and the second membrane structure 35213 is adapted to the shape and size of the opening of the base part 3522. In some embodiments, the shape of the second membrane structure 35213 may include, but is not limited to, regular shapes such as circular, rectangular, oval, semi-circular, polygonal, or any irregular shape. By arranging the second membrane structure 35213, the liquid may be effectively prevented from flowing into another cavity through the gap between the piezoelectric beams or gap between the piezoelectric beams and the base part, thereby effectively improving the reliability of the sensing device.

In some embodiments, the second membrane structure 35213 may be connected to multiple piezoelectric beams 35211. In some embodiments, the second membrane structure 35213 may be connected to a circumferential side of the piezoelectric beam 35211. In some embodiments, the second membrane structure 35213 may be connected to a side of the piezoelectric beam 35211 near the base part 3522. In some embodiments, the second membrane structure 35213 may be connected to a side of the piezoelectric beam 35211 away from the base part 3522. Considering that the second membrane structure 35213 impedes the vibration of the piezoelectric beam connected to the second membrane structure, in some embodiments, the material of the second membrane structure 35213 may be selected from material with a small Young's modulus to minimize this effect, for example, the Young's modulus of the blocking structure 33213 may be smaller than the Young's modulus of the electrode layer or piezoelectric layer. In some embodiments, the material of the second membrane structure 35213 may include, but is not limited to, one or more of semiconductor material, metal material, metal alloy, organic material, etc. In some embodiments, the semiconductor material may include, but is not limited to, silicon, silicon dioxide, silicon nitride, silicon carbide, etc. In some embodiments, the metal material may include, but is not limited to, copper, aluminum, chromium, titanium, gold, etc. In some embodiments, the metal alloy may include, but is not limited to, copper-aluminum alloy, copper-gold alloy, titanium alloy, aluminum alloy, etc. In some embodiments, the organic material may include, but is not limited to, polyimide, parelin, PDMS, silicone gel, silicone, etc.

Figure 36A:
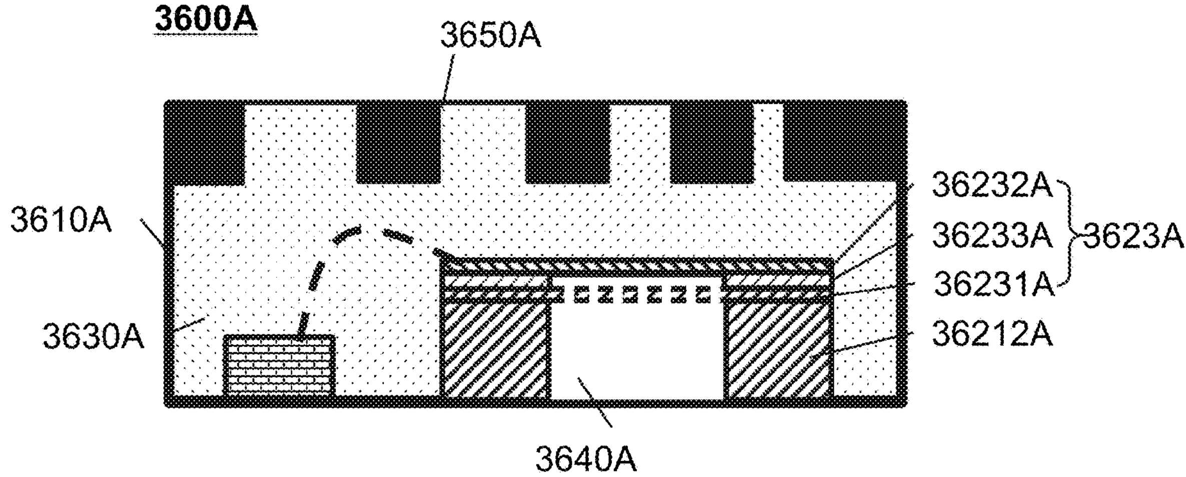
FIG. 36A is a schematic diagram illustrating a structure of a sensing device according to some embodiments of the present disclosure.

FIG. 36A is a schematic diagram illustrating a structure of a sensing device according to some embodiments of the present disclosure. An overall structure of a sensing device 3600A shown in FIG. 36A is substantially the same as that of the sensing device 2500 shown in FIG. 25, and the main difference is that the transduction units are different. A housing 3610A and a pipeline structure 3650A shown in FIG. 36A are similar to the housing 2510 and the pipeline structure 2550 shown in FIG. 25, etc., which is not repeated here. As shown in FIG. 36A, the sensing device 3600A may include a housing 3610A and a transduction unit, an accommodation cavity may be provided inside the housing 3610A, the transduction unit may be provided in the accommodation cavity, and a vibration-pickup structure may divide the accommodation cavity into a front cavity 3630A and a rear cavity 3640A located on opposite sides of the vibration-pickup structure. The transduction unit includes a capacitive transducer 3623A, and the capacitive transducer 3623A includes a perforated backplate 36231A and a diaphragm 36232A.

In some embodiments, the transduction unit may also include a base part 36212A, which is similar to the base part 2522 illustrated in FIG. 25 and not repeated herein. The capacitive transducer 3623A may cover the opening of the base part 36212A. The perforated backplate 36231A is approximately parallel to the diaphragm 36232A. In some embodiments, a gasket 36233A is provided between the perforated backplate 36231A and the diaphragm 36232A to separate the perforated backplate 36231A and the diaphragm 36232A. The diaphragm 36232A may cover the opening of the base part 36212A. In some embodiments, a side of the diaphragm 36232A near the base part 36212A may be connected to a side of the base part 36212A away from a bottom wall of the housing 3610A. The perforated backplate 36231A may be disposed within the opening of the base part 36212A, and a circumferential side of the perforated backplate 36231A may be connected to an inner wall of the opening. In some embodiments, when the cavity near the diaphragm 36232A is filled with liquid, the liquid is in contact with the diaphragm 36232A. The liquid cannot flow between the diaphragm 36232A and the perforated backplate 36231A. When the capacitive transducer 3623A receives a vibration signal, the diaphragm 36232A vibrates such that a distance between the diaphragm and the perforated backplate 36231A changes, thereby generating an electrical signal. In some embodiments, the material of the diaphragm 36232A and the material of the perforated backplate 36231A may be conductive material (e.g., copper, aluminum, graphite, etc.). In some embodiments, the diaphragm 36232A may be a non-conductive polymer elastic membrane, at least one side of which is plated with a conductive layer (e.g., an aluminum membrane layer), and the material of the perforated backplate 36231A may be conductive material. Exemplarily, the material of the polymeric elastomeric membrane may include, but is not limited to, one or more of polyethylene terephthalate (PET), polycarbonate (PC), vinyl polymer (PVC), acrylonitrile-butadiene-styrene copolymer (ABS), and polyethylene (PE).

Figure 36B:
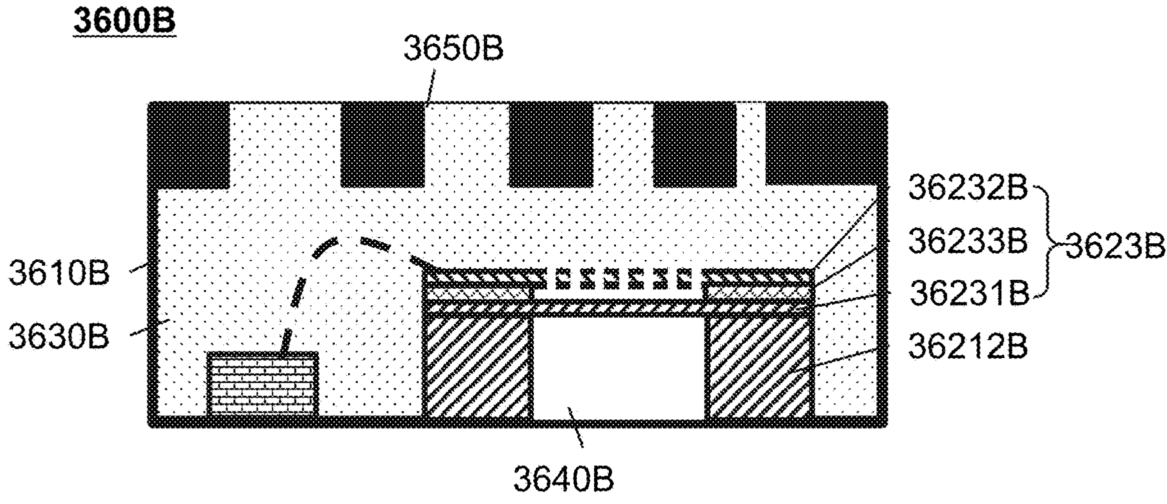
FIG. 36B is a schematic diagram illustrating a structure of a sensing device according to some embodiments of the present disclosure.

In order to reduce the Q of multiple resonance peaks and resonance valleys on the frequency response curve of the sensing device, the structure of the sensing device shown in FIG. 36B is provided on the basis of FIG. 36A. FIG. 36B is a schematic diagram illustrating a structure of a sensing device according to some embodiments of the present disclosure. An overall structure of a sensing device 3600B shown in FIG. 36B is substantially the same as that of the sensing device 2500 shown in FIG. 36A, and the main difference is that the capacitive transducers are mounted in a different manner. A housing 3610B, a front cavity 3630B, a rear cavity 3640B, a pipeline structure 3650B, a base part 36212B, a perforated backplate 36231B, a diaphragm 36232B, and a gasket 36233B shown in FIG. 36B are substantially the same as the housing 3610A, the front cavity 3630A, the rear cavity 3640A, the pipeline structure 3650A, the base part 36212A, the perforated backplate 36231A, the diaphragm 36232A and the gasket 36233A shown in FIG. 36A and are not described herein. As shown in FIG. 36B, the cavity near the perforated backplate 36231B is filled with liquid, and the liquid is in contact with the perforated backplate 36231B and penetrates between the perforated backplate 36231B and the diaphragm 36232B through holes in the perforated backplate 36231B. Thus, the overall damping of the capacitive transducer 3623B may be increased to achieve damping adjustment of the sensing device, thereby achieving the purpose of smoothing the frequency response curve. In addition, a dielectric layer is formed between the diaphragm 36232B and the backplate 36231B after the liquid flows between the perforated backplate 36231B and the diaphragm 36232B. By the selection of the type of liquid, the adjustment of parameters such as a dielectric constant of the electrostatic structure may be achieved to improve the efficiency of generating electrical signals by the capacitive transducer. In some embodiments, the holes on the perforated backplate 36231B may be adjusted to be smaller so that the holes have a confining effect on the liquid. In this way, the area between the perforated backplate 36231B and the diaphragm 36232B may not be completely filled with liquid, and a partial air domain may still exist, thereby enabling the regulation of the resonance frequency (e.g., the first resonance frequency $f_0$) of the capacitive transducer.

Figure 37:
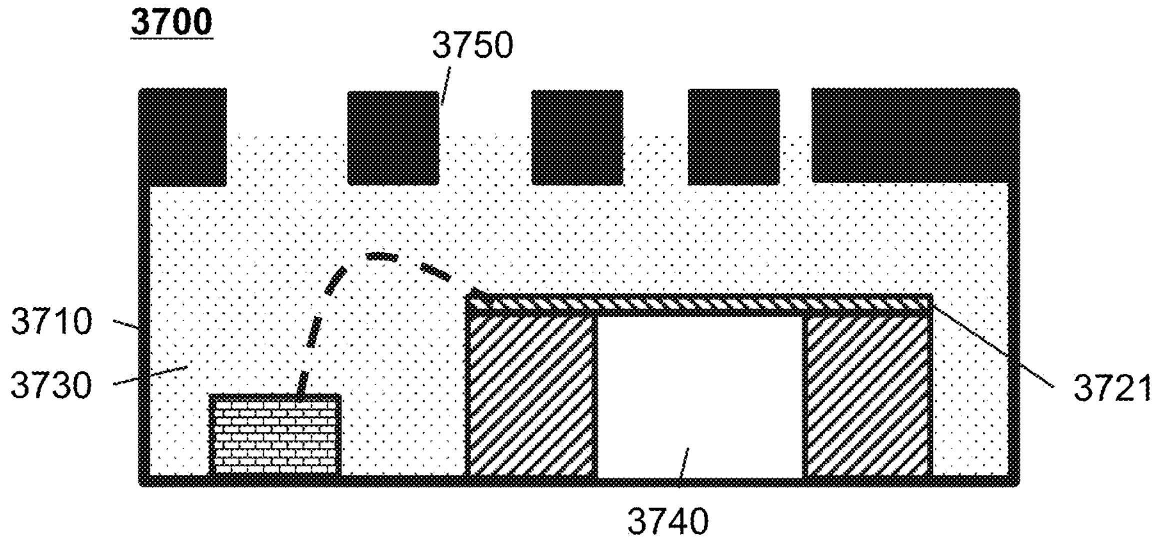
FIG. 37 is a schematic diagram illustrating a structure of a sensing device according to some embodiments of the present disclosure.

FIG. 37 is a schematic diagram illustrating a structure of a sensing device according to some embodiments of the present disclosure. An overall structure of a sensing device 3700 shown in FIG. 37 is substantially the same as that of the sensing device 2500 illustrated in FIG. 25. The structures of a transduction unit and a pipeline structure 3750 shown in FIG. 37 are similar to these of the transduction unit and the pipeline structure 2550 shown in FIG. 25, etc., and are not repeated herein. As shown in FIG. 37, the sensing device 3700 may include a housing 3710, a transduction unit and a pipeline structure 3750, the pipeline structure 3750 is located at a top of the housing 3710 in a gravity direction, the transduction unit is disposed in an accommodation cavity, a vibration-pickup structure 3721 divides the accommodation cavity into a front cavity 3730 and a rear cavity 3740 located on opposite sides of the vibration-pickup structure 3721, and the front cavity 3730 is filled with liquid.

In some embodiments, there is no confining structure at a junction of liquid and gas within the pipeline structure 3750. Due to the viscous effect of the liquid itself, a gas-liquid interface with very low stiffness is formed between the liquid and the gas on the outside of the pipeline structure, and the overall additional stiffness of the liquid to the transduction unit is small, thus achieving a larger output. In addition, the gas-liquid interface makes a resonance system corresponding to the pipeline structure have less stiffness, thus providing the transduction unit with resonance peaks of smaller resonance frequencies and improving the low frequency response of the sensing device.

Figure 38:
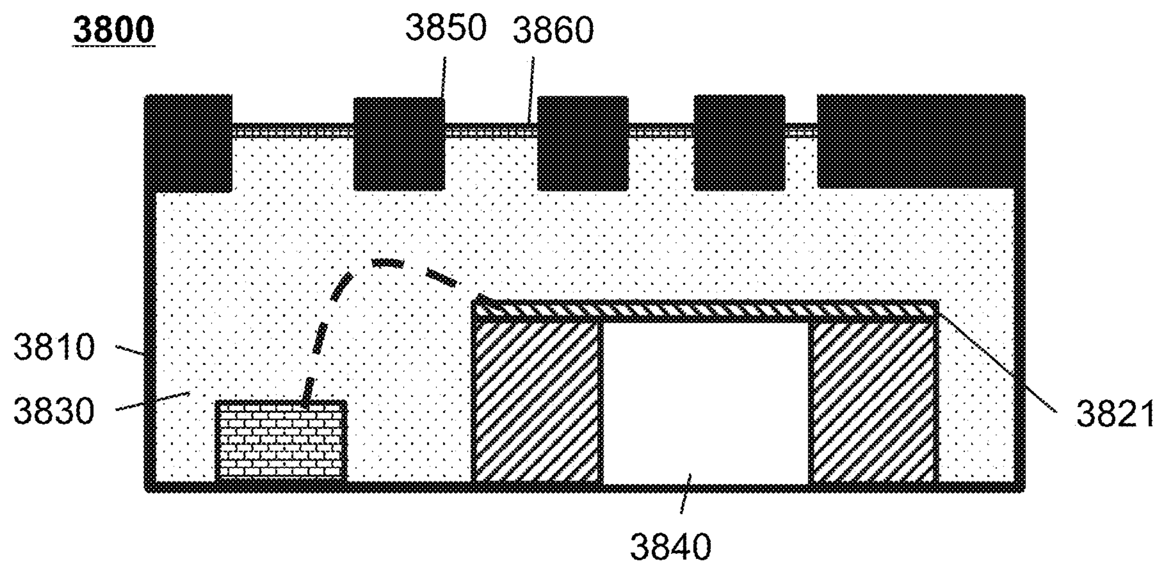
FIG. 38 is a schematic diagram illustrating a structure of a sensing device according to some embodiments of the present disclosure.

FIG. 38 is a schematic diagram illustrating a structure of a sensing device according to some embodiments of the present disclosure. An overall structure of a sensing device 3800 shown in FIG. 38 is substantially the same as that of the sensing device 2500 shown in FIG. 25, and the main difference is that the sensing device 3800 shown in FIG. 38 also includes a first membrane structure 3860. A transduction unit and a pipeline structure 3850 shown in FIG. 38 are similar to the transduction unit and pipeline structure 2550 shown in FIG. 25, and are not repeated herein. As shown in FIG. 38, the sensing device 3800 may include a housing 3810, a transduction unit and a pipeline structure 3850, the transduction unit is provided in an accommodation cavity and a vibration-pickup structure 3821 divides the accommodation cavity into a front cavity 3830 and a rear cavity 3840 located on opposite sides of the vibration-pickup structure 3821, and the front cavity is filled with liquid.

A first membrane structure 3860 is disposed between the liquid in the pipeline structure 3850 and the gas outside of the housing. In some embodiments, the first membrane structure 3860 is disposed within the pipeline structure 3850 and the first membrane structure 3860 is connected to an inner wall of the pipeline structure 3850 by its circumferential side. Specifically, the first membrane structure 3860 is used to isolate the liquid and the gas and confine the liquid within the pipeline structure 3850 to better prevent the liquid from spilling out of the pipeline structure. In addition, the stiffness provided by the first membrane structure 3860 may adjust the resonance frequency of the resonance system formed by the liquid and gas, improving the frequency response of the sensing device 3800. In some embodiments, the structure and material of the first membrane structure 3860 may be designed to adjust a resonance position of an additional resonant system formed by the liquid and gas introduced into the sensing device 2500 and a resonance position of the transduction unit, thereby achieving a highly sensitive sensing device under a constrained liquid boundary. In some embodiments, the first membrane structure 3860 may be a membrane structure having flexibility (e.g., high yield limit, no high temperature deterioration, etc.) and softness (e.g., low stiffness, easy deformation, etc.). Exemplarily, the first membrane structure 3860 may be selected from one or more of a polyimide membrane (PI membrane), a polydimethylsiloxane membrane (PDMS membrane), a polyurethane (PU), a poly(ether-ether-ketone) (PEEK), a semiconductor flexible membrane, a silicone bonding adhesive, a silicone membrane, a silicone gel, a damping adhesive (e.g., an acrylic damping adhesive), etc. In some embodiments, a thickness of the first membrane structure 3860 may be within a range of 0.05 mm to 0.15 mm.

The frequency response curve of the sensing device may be adjusted by forming different degrees of constraint on the liquid in the pipeline structure. FIG. 39 is a frequency response curve illustrating a sensing device according to some embodiments of the present disclosure. As shown in FIG. 39, the horizontal coordinate indicates the frequency, a unit of which is Hz, and the vertical coordinate indicates the sensitivity, a unit of which is dBV. Curve 391 shows the frequency response curve of a sensing device without liquid and a pipeline structure. Curve 392 is the frequency response curve of a sensing device with liquid and a pipeline structure and the pipeline structure has no constraint on the liquid (i.e., a gas-liquid interface is formed between the liquid and the gas in the pipeline structure). Curve 393 is the frequency response curve of a sensing device with liquid and a pipeline structure and the pipeline structure has a small constraint on the liquid (i.e., the pipeline structure has a first membrane structure 3860 located between the liquid and the gas). Both curve 392 and curve 393 have a large output enhancement relative to curve 391, and it can be seen that the sensitivity of the sensing device with liquid and a pipeline structure is substantially enhanced compared to the sensing device without liquid and a pipeline structure. While the positions of the resonance peak and resonance valley of curve 392 are different from these of curve 393, it can be seen that the positions of the resonance peak and resonance valley corresponding to the resonance system corresponding to the pipeline structure may be effectively changed by changing the degree of confinement at the junction of liquid and gas within the pipeline structure. In some embodiments, the sensing device includes multiple pipeline structures. In order to better adjust the position of the resonance peak that each pipeline structure can provide, the first membrane structure 3860 separating the liquid and the gas may be disposed on a portion of the pipeline structure, and the liquid and the gas may form a gas-liquid interface within a portion of the pipeline structure.

FIG. 40 is a schematic diagram illustrating a structure of a sensing device according to some embodiments of the present disclosure. An overall structure of a sensing device shown in FIG. 40 is substantially the same as that of the sensing device illustrated in FIG. 25, and the main difference is that the sensing device also includes a first gas cavity 4060. The structures of a transduction unit and a pipeline structure shown in FIG. 40 are similar to these of the transduction unit and the pipeline structure shown in FIG. 25, etc., and are not repeated here. As shown in FIG. 40, the first gas cavity 4060 is enclosed by another housing 4050 on the outside of the pipeline structure. A front cavity 4030 is filled with liquid, the first gas cavity 4060 is close to the front cavity 4030 and away from a rear cavity 4040, and the first gas cavity 4060 is connected to the front cavity 4030. In some alternative embodiments, the first gas cavity 4060 may be formed together by the housing 4010, that is, the housing 4010 and the housing 4050 may be an integrally formed housing structure. The “outside of the housing” described elsewhere in the present disclosure may be understood to mean the outside of the housing structure relative to the front or rear cavities described in the present disclosure. For example, when the housing 4010 and the housing 4050 are integrally formed, the first gas cavity 4060 may be regarded as external of the housing 4010, and the pipeline structure connects an accommodation cavity in the housing 4010 to the outside of the housing 4010, i.e., the first gas cavity 4060.

In some embodiments, a gas-liquid interface may be formed between the gas within the first gas cavity 4060 and the liquid of the front cavity 4030. In some embodiments, a membrane structure may be provided between the gas within the first gas cavity 4060 and the liquid of the front cavity 4030 for isolating the gas and the liquid. In some embodiments, the compressibility of the gas may be reduced by increasing the number of gas cavities connected to the liquid to increase the equivalent stiffness of a resonance system corresponding to each pipeline structure. In this case, each pipeline structure may provide a higher frequency resonance peak compared with the first gas cavity 4060 not provided.

In some embodiments, the first gas cavity may also be connected to the rear cavity when the rear cavity is filled with liquid. In this case, a membrane structure for isolating the gas and the liquid may be provided or may not be provided between the gas in the first gas cavity and the liquid in the rear cavity.

Figure 41:
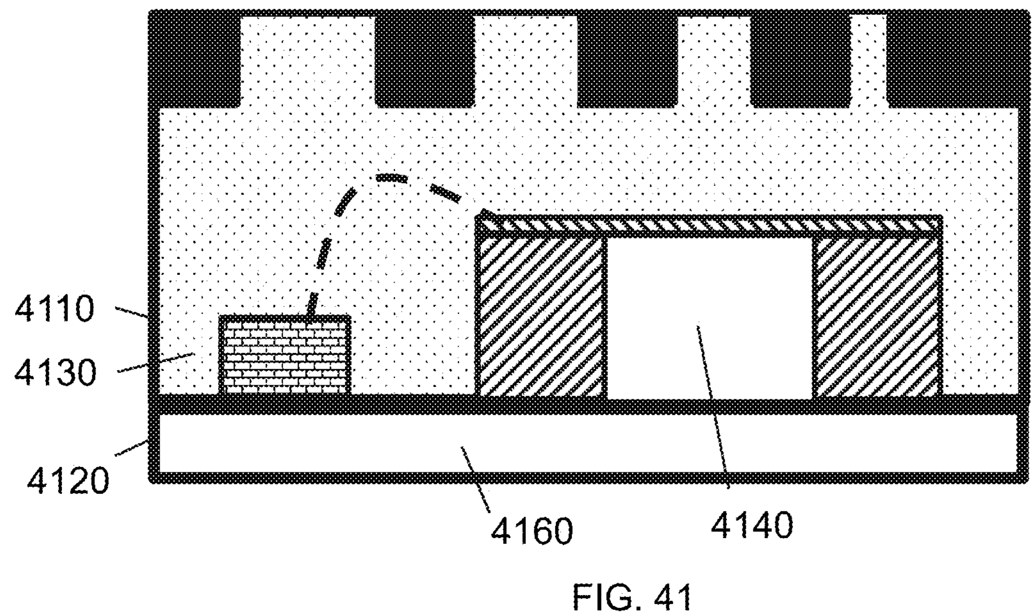
FIG. 41 is a schematic diagram illustrating a structure of a sensing device according to some embodiments of the present disclosure.

FIG. 41 is a schematic diagram illustrating a structure of a sensing device according to some embodiments of the present disclosure. The overall structure of a sensing device shown in FIG. 41 is substantially the same as that of the sensing device illustrated in FIG. 25, and the main difference is that the sensing device also includes a second gas cavity 4160. The structures of a transduction unit and a pipeline structure shown in FIG. 41 are similar to these of the transduction unit and the pipeline structure shown in FIG. 25, etc., and are not repeated herein. As shown in FIG. 41, the second gas cavity 4160 is enclosed by another housing 4120 on a side of the housing 4110 away from the pipeline structure, a front cavity 4130 is filled with liquid, the second gas cavity 4160 is close to a rear cavity 4140 and away from the front cavity 4130, and the second gas cavity 4160 is connected to the rear cavity 4140. The second gas cavity 4160 is connected to the rear cavity 4140 to increase the volume of the rear cavity of the sensing device, reducing the equivalent stiffness of the vibration-pickup structure and shifting the first resonance frequency to the lower frequency direction, thereby improving the frequency response of the sensing device in the lower frequency band. In some embodiments, the second gas cavity 4160 may be of any shape, such as a cube, etc. In some alternative embodiments, the second gas cavity 4160 may be formed together by the housing 4110, meaning that the housing 4110 and the housing 4120 may be an integral casing housing structure.

Figure 42:
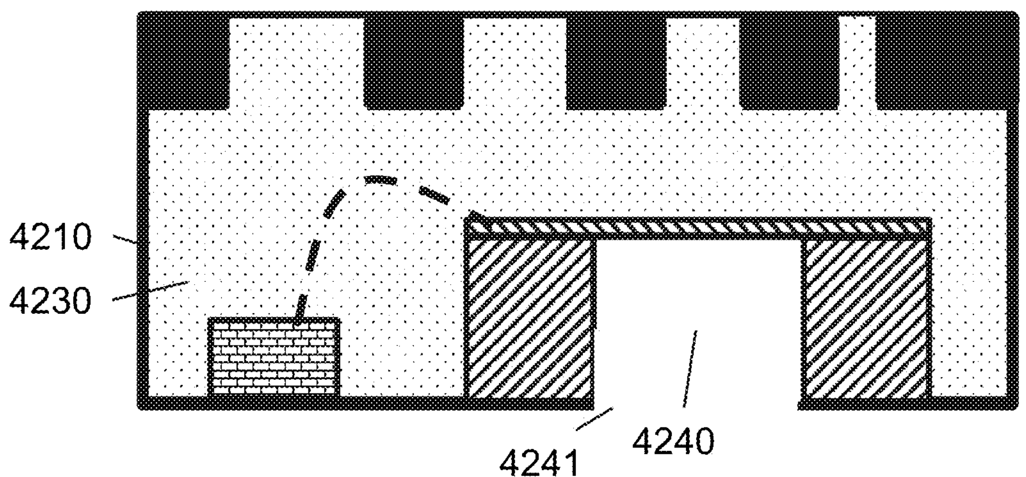
FIG. 42 is a schematic diagram illustrating a structure of a sensing device according to some embodiments of the present disclosure.

FIG. 42 is a schematic diagram illustrating a structure of a sensing device according to some embodiments of the present disclosure. The overall structure of a sensing device shown in FIG. 42 is substantially the same as that of the sensing device illustrated in FIG. 25, and the main difference is that the housing is also provided with an air hole. The structures of a transduction unit and a pipeline structure shown in FIG. 42 are similar to these of the transduction unit and the pipeline structure shown in FIG. 25, etc., and are not repeated here. As shown in FIG. 42, a front cavity 4230 is filled with liquid, and an air hole 4241 is set at a position of the housing 4210 corresponding to the rear cavity 4240, and the air hole 4241 connects the rear cavity 4240 to the outside.

In some embodiments, the front cavity 4230 is filled with liquid and one or more air holes 4241 are provided at the position of the housing 4210 corresponding to the rear cavity 4240. The air holes 4241 connect the rear cavity 4240 to the outside, which may be considered to increase the volume of the rear cavity of the sensing device, reducing the equivalent stiffness of the vibration-pickup structure and shifting the first resonance frequency toward the lower frequency, thereby improving the frequency response of the sensing device in the lower frequency band. In some embodiments, the air holes 4241 may be of any shape, such as circular, square, or triangular, etc.

Figure 43:
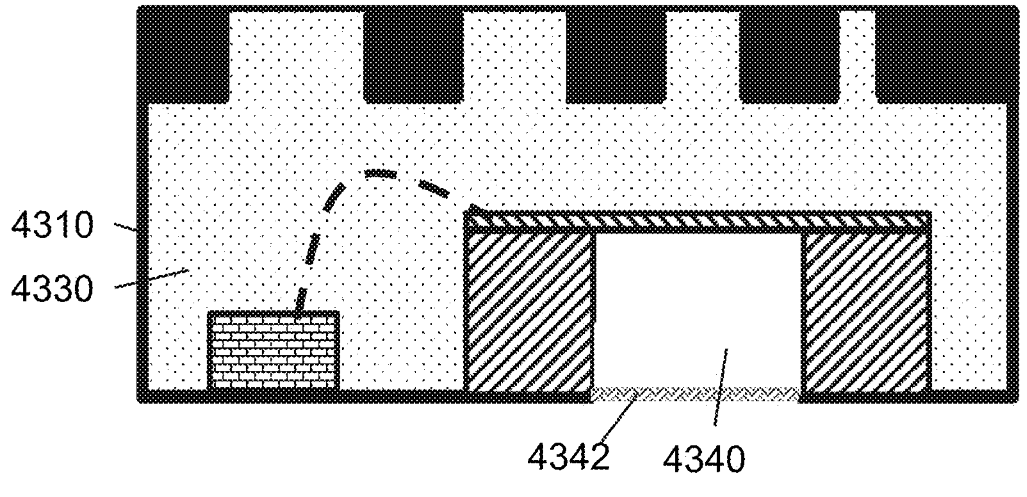
FIG. 43 is a schematic diagram illustrating a structure of a sensing device according to some embodiments of the present disclosure.

FIG. 43 is a schematic diagram illustrating a structure of a sensing device according to some embodiments of the present disclosure. An overall structure of a sensing device shown in FIG. 43 is substantially the same as that of the sensing device shown in FIG. 42, and the main difference is that the air hole is covered with a third membrane structure. The structures of a transduction unit and a pipeline structure shown in FIG. 43 are similar to these of the transduction unit and the pipeline structure shown in FIG. 25, etc., and are not repeated here. As shown in FIG. 43, a front cavity 4330 is filled with liquid and an air hole is disposed at a position of the housing 4310 corresponding to the rear cavity 4340, and the air hole is covered with a third membrane structure 4342.

In some embodiments, the third membrane structure 4342 may isolate the gas within the rear cavity 4340 from the external gas. In some embodiments, a side of the third membrane structure 4342 near the housing 4310 is connected to the housing 4310. In some embodiments, a circumferential side of the third membrane structure 4342 is connected to a wall of the air hole. In some embodiments, the circumferential side of the third membrane structure 4342 is connected to an inner wall of the rear cavity 4340. In some embodiments, the shape of the third membrane structure 4342 may include, but is not limited to, regular shapes such as circular, rectangular, oval, semi-circular, polygonal, or any irregular shape. In some embodiments, the material of the third membrane structure 4342 may include, but is not limited to, one or more of semiconductor material, metal material, metal alloy, organic material, etc. Compared to FIG. 42, the third membrane structure 4342 creates a stiffer constraint on the gas in the rear cavity 4340, increasing the equivalent stiffness of the vibration-pickup structure and shifting the first resonance frequency toward the higher frequency, thereby improving the frequency response of the sensing device at the higher frequency band. In some embodiments, the shape of the third membrane structure 4342 may be adapted to the shape of the air hole when the circumferential side of the third membrane structure 4342 is connected to the wall of the air hole.

It should be noted that the above description of the sensing device is only exemplary and does not limit the present disclosure to the cited embodiments. For example, the first gas cavity and the cavity filled with liquid may be connected by a connection channel. As another example, the third membrane structure may be a planar membrane structure or a three-dimensional membrane structure (e.g., an air bag).

It should be noted that different embodiments may produce different beneficial effects, and in different embodiments, the possible beneficial effects may be any one or a combination of the above, or any other beneficial effect that may be obtained.

The basic concept has been described above. Obviously, for those skilled in the art, the above detailed disclosure is only an example, and does not constitute a limitation to the present disclosure. Although not explicitly stated here, those skilled in the art may make various modifications, improvements, and amendments to the present disclosure. Such modifications, improvements, and amendments are intended to be suggested in this disclosure, so such modifications, improvements, and amendments still belong to the spirit and scope of the exemplary embodiments of this disclosure.

Moreover, certain terminology has been used to describe embodiments of the present disclosure. For example, "one embodiment", "an embodiment", and/or "some embodiments" refer to a certain feature, structure, or characteristic related to at least one embodiment of the present disclosure. Therefore, it should be emphasized and noted that two or more references to "an embodiment" "one embodiment" or "an alternative embodiment" in various places in this disclosure are not necessarily referring to the same embodiment. In addition, certain features, structures, or characteristics of one or more embodiments of the present disclosure may be properly combined.

Furthermore, unless explicitly stated in the claims, the order of processing elements and sequences described in the present disclosure, the use of numbers and letters, or the use of other names are not intended to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, while the system components described above may be implemented as hardware devices, they may also be implemented as a software-only solution, such as installing the described system on an existing processing device or mobile device.

Similarly, it should be appreciated that in the foregoing description of embodiments of the present disclosure, various features are sometimes grouped together in a single embodiment, figure, or description thereof for the purpose of streamlining the disclosure and aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, numbers describing the quantity of components and attributes are used. It should be understood that such numbers used in the description of the embodiments use the modifiers "about", "approximately" or "substantially" in some examples. Unless stated otherwise, "about", "approximately" or "substantially" means that a variation of ±20% is allowed for the stated number. Accordingly, in some embodiments, the numerical parameters set forth in the disclosure and claims are approximations that may vary depending upon the desired characteristics of individual embodiments. In some embodiments, numerical parameters should consider the specified significant digits and adopt the general digit retention method. Notwithstanding that the numerical fields and parameters used in some embodiments of the present disclosure to confirm the breadth of their ranges are approximations, in specific embodiments, such numerical values are set as precisely as practicable.

The entire contents of each patent, patent disclosure, patent disclosure publication, and other material, such as an article, a book, a specification, a publication, document, etc., cited in this disclosure are hereby incorporated into this disclosure by reference. Application history documents that are inconsistent with or conflict with the content of this disclosure are excluded, as are documents (currently or hereafter appended to this disclosure) that limit the broadest scope of the claims of this disclosure. It should be noted that if there is any inconsistency or conflict between the descriptions, definitions, and/or terms used in the attached materials of this disclosure and the contents of this disclosure, the descriptions, definitions, and/or terms used in this disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, the embodiments of the present disclosure are not limited to the embodiments explicitly introduced and described in the present disclosure.

What is claimed is:

1. A sensing device, comprising:

a housing, an accommodation cavity being provided inside the housing;

a transduction unit, including a vibration-pickup structure used to pick up vibration of the housing to generate an electrical signal, wherein the transduction unit divides the accommodation cavity into a front cavity and a rear cavity located on opposite sides of the vibration-pickup structure, at least one of the front cavity or the rear cavity is filled with liquid, and the liquid is in contact with the vibration-pickup structure; and one or more pipeline structures, each pipeline structure being configured to connect the accommodation cavity to an outside of the housing, the liquid being at least partially located in the one or more pipeline structures.

2. The sensing device of claim 1, wherein a resonance system corresponding to the one or more pipeline structures causes the sensing device to generate at least one resonance peak and at least one resonance valley.

3. The sensing device of claim 2, wherein the vibration pick-up structure has a first resonance frequency and at least one resonance frequency of the resonance system corresponding to the one or more pipeline structures is less than the first resonance frequency.

4. The sensing device of claim 1, wherein the one or more pipeline structures include multiple pipeline structures, the multiple pipeline structures having different cavity volumes.

5. The sensing device of claim 1, wherein a gas-liquid interface is formed between the liquid in the one or more pipeline structures and gas on the outside of the housing.

6. The sensing device of claim 1, further comprising a first membrane structure, wherein the first membrane structure is located between the liquid in the one or more pipeline structures and gas on the outside of the housing.

7. The sensing device of claim 1, wherein the vibration-pickup structure includes a piezoelectric membrane, and the transduction unit further includes a base part, the base part being a structural body with an opening, the piezoelectric membrane covering the opening of the base part, one end of the base part away from the piezoelectric membrane being connected to the housing.

8. The sensing device of claim 1, wherein the vibration-pickup structure includes multiple piezoelectric beams, and the transduction unit further includes a base part, the base part being a structural body with an opening, each piezoelectric beam being connected to the base part and extending toward a center of the opening, respectively.

9. The sensing device of claim 8, wherein the multiple piezoelectric beams have same structures and are symmetrically distributed along a geometric center of the opening.

10. The sensing device of claim 8, comprising a blocking structure, wherein the blocking structure fills or covers gaps between the multiple piezoelectric beams.

11. The sensing device of claim 8, wherein a gap between two adjacent piezoelectric beams in the multiple piezoelectric beams is not greater than 20 μm.

12. The sensing device of claim 1, wherein the transduction unit further includes a base part, the base part being a structural body with an opening;

the vibration pick-up structure includes multiple piezoelectric beams and a second membrane structure, the multiple piezoelectric beams being disposed at intervals at the opening; the second membrane structure covering the opening of the base part, one end of the base part away from the second membrane structure being connected to the housing.

13. The sensing device of claim 12, wherein vibrations of the multiple piezoelectric beams generate resonance peaks of different frequencies.

14. The sensing device of claim 1, wherein the transduction unit includes a capacitive transducer, the capacitive transducer including at least a perforated backplate and a diaphragm.

15. The sensing device of claim 14, wherein the capacitive transducer further includes a gasket, the gasket being disposed between the backplate and the diaphragm to dispose the backplate and the diaphragm at intervals.

16. The sensing device of claim 15, wherein the liquid is capable of permeating into a space between the perforated backplate and the diaphragm through a hole in the perforated backplate.

17. The sensing device of claim 16, wherein an air domain exists between the perforated backplate and the diaphragm.

18. The sensing device of claim 1, wherein the housing further includes a first gas cavity, one of the front cavity and the rear cavity being filled with the liquid, the first gas cavity being connected to the cavity that is filled with the liquid.

19. The sensing device of claim 1, wherein the housing further includes a second gas cavity, one of the front cavity and the rear cavity being filled with the liquid, the second gas cavity being connected to the cavity that is not filled with the liquid.

20. The sensing device of claim 1, wherein one of the front cavity and the rear cavity is filled with the liquid, and a housing corresponding to the cavity that is not filled with the liquid is provided with an air hole, wherein the air hole is covered with a third membrane structure.

* * * * *